US009349256B2

(12) United States Patent
Hill

(10) Patent No.: US 9,349,256 B2
(45) Date of Patent: May 24, 2016

(54) SYSTEM AND METHOD FOR PROVIDING REMOTE GAMING FEATURING LIVE GAMING DATA

(71) Applicant: Otho Dale Hill, Las Vegas, NV (US)

(72) Inventor: Otho Dale Hill, Las Vegas, NV (US)

( * ) Notice: Subject to any disclaimer, the term of this patent is extended or adjusted under 35 U.S.C. 154(b) by 0 days.

(21) Appl. No.: 14/495,731

(22) Filed: Sep. 24, 2014

(65) Prior Publication Data

US 2015/0087371 A1 Mar. 26, 2015

Related U.S. Application Data

(60) Provisional application No. 61/881,819, filed on Sep. 24, 2013.

(51) Int. Cl.
*G06F 17/00* (2006.01)
*G07F 17/32* (2006.01)

(52) U.S. Cl.
CPC ........ *G07F 17/3293* (2013.01); *G07F 17/3216* (2013.01); *G07F 17/3241* (2013.01); *G07F 17/3244* (2013.01)

(58) Field of Classification Search
USPC ................................ 463/9–13, 16–19, 40–42
See application file for complete search history.

(56) References Cited

U.S. PATENT DOCUMENTS

| | | | | |
|---|---|---|---|---|
| 7,758,425 | B2 | 7/2010 | Poh et al. | |
| 8,808,077 | B1 * | 8/2014 | Chun | 463/11 |
| 8,905,834 | B2 * | 12/2014 | Wells | 463/17 |
| 8,920,228 | B2 * | 12/2014 | Oikawa | 463/7 |
| 2001/0000118 | A1 | 4/2001 | Sines et al. | |
| 2006/0068871 | A1 * | 3/2006 | Crawford et al. | 463/13 |
| 2010/0130280 | A1 | 5/2010 | Arezina et al. | |
| 2011/0300917 | A1 | 12/2011 | Hill | |
| 2013/0029737 | A1 * | 1/2013 | Baker | 463/13 |

FOREIGN PATENT DOCUMENTS

WO 2008/091809 A2 7/2008

OTHER PUBLICATIONS

International Search Report and Written Opinion (PCT/US2014/057275); Date of Mailing: Dec. 24, 2014.

* cited by examiner

*Primary Examiner* — Ronald Laneau

(57) ABSTRACT

Systems and methods for collecting gaming data from the play of a live table game and using the collected data to conduct and facilitate the remote play of the live table game and independent wagering games, including providing selectable features which enable remote players to, among other things, obtain unique access to the collected gaming data and customize the collected gaming data for use in remote play.

20 Claims, 48 Drawing Sheets

Mini_Baccarat CG Table Top and RPUI (PRIOR ART)

FIG. 4S
405a
TABLE LIMITS
Enter Your Own Limits
$____ Min | $____ Maximum Bets
$ 25.00 Min | $ 10,000 Maximum
$ 100.00 Min | $ 25,000 Maximum
$ 1000.00 Min | $100,000 Maximum
405b
GAME RULES
Face Cards & 10s | Score = Zero
Mini-Bacc | Cards Dealt Face-Down
Midi-Bacc | Cards Dealt Face-Down
Big-Bacc | Cards Dealt Face-Down
Eight (8) Decks _ 416 Cards
Deck Penetration | 97%
Comm on Winning BANK Hands (5%)
405c
PLAYER SETTINGS
Virtual Games | RNG Game Data
Real-Time Games | B&M Game Data
On-Demand Games | B&M Game Data
Real-Time VTC of Game Play & Data
Session Limits | Lock / Unlock
PLAY: Slow- Medium- Fast- RealTime
405d
OTHER GAMES
Poker
Backjack
Roulette
Pai Gow, etc.
Free Play Online Casinos
Slots
405e
TOURNAMENT PLAY
Hosted by Licensed B&M Casino
Hosted by Licensed OCO
Broadcast Simultaneosly, to RP's
During Real-Time or On-Demand
Virtual Online Casino Tournaments
405f
HOST OCO
B&M Online Casino Operator
Online Casino Software Developer
Game Content Provider
Server Location /Gaming Jurisdiction
Online Casino Software Developer
Debit/Credit Transaction Provider
405g
SUPPORT
www.fairplaygaming.com/support
www.fpg-problemgambling.com
CHAT - 24/7
1-997-123-4000 24/7
CONTACT US
www.fairplaygaming.com/contact
www.fpg-dispuetresolution.com
www.OCO-Regulators.gov
CHAT - 24/7
1-997-123-4500 24/7

Video Selections

1. Log In - Welcome Video
2. Hotel-Casino Venue / Aminities
3. Dealer Station | The Shuffle
4. Overhead View of Game Table
5. High Bets Play PLAYER & BANK Hands
6. Ascending Active Seat Display Sequence
7. Surrounding Casino Enviornment
8. VTC Special Effects
9. VTC Public
10. VTC Private
11. VTC/CCTV Combined

FIG. 5F

SYSTEM AND METHOD FOR PROVIDING REMOTE GAMING FEATURING LIVE GAMING DATA

CROSS-REFERENCES TO RELATED APPLICATIONS

The present application claims priority to U.S. Provisional Application Ser. No. 61/881,819, filed on Sep. 24, 2013, entitled "System And Method For Improving The Integrity of Online Casino Card Games And Providing The Remote Players With A More Realistic, Entertaining And Secure Online Gaming Experience" the contents of which are incorporated herein by reference in their entirety.

BACKGROUND OF THE INVENTION

The invention generally relates to systems and methods for providing, conducting and facilitating the play of wagering games through mobile devices or remote platforms.

When playing a live table game in a real "Land-based" casino ("LBC") or "Brick-and-Mortar" casino ("B&M") (i.e., a gaming establishment or casino which is not fully online or virtual), the group of playing cards or "game deck" used in the deal of the game to the casinos' card game players may be comprised of, without limitation, any number of standard fifty-two card decks of cards. Typically, this should also be true when a remote player is playing a casino card game hosted online. However, when playing an online casino card game the composition of the game deck is typically unknown.

Online gaming has attempted to expand the casino experience outside of the casino and bring it to the player wherever the player happens to be located. Many different websites and downloadable applications are available to facilitate play of many varieties of casino table games, including but not limited to blackjack, poker, baccarat, roulette, craps, dice, etc. Gaming at such websites may involve one or more software programs enabling the remote game player to enter wagers and game play actions required to play the game (e.g., ante, small blind, big blind, bring-in, post, straddle, sleeper, call, raise, check-raise, all-in, double down, split, double-after-split, PLAYER, BANK and TIE bets, pay commission, side bets/surrender/insurance, stand/stay/stick, hit/draw, fold, show/turn a card, etc.)

The integrity of many online gaming sites is suspect because many important factors relating to credibility are unknown or less than transparent, such as the source of the online gaming software, the location of any authorized government regulators responsible for the licensing and regulating of the online casino operator's online casino card games, the location of the online game servers, the house advantage or disadvantage, the game rules specific to the play of the online game, and the contact information related to resolving any disputes regarding the play of the game.

Online gaming is still of interest, however, at least because many players would like to play without having to travel to a casino, and wagering games such as Baccarat, Blackjack, Roulette, and various poker-based table games, which are popular games offered in casinos, have a limited capacity for players to participate in any particular game due to a limited number of player positions or a limitation on physical space within the casino environment.

Thus, it can be seen that there is a need in the art for a system and method that, among other things, provides a new online gaming platform with expanded options to players interested in participating in wagering games; from a remote location. There is also a need to provide remote players with information that will foster trust in the integrity of the games offered as well as a means that will provide a more realistic, entertaining, exciting and secure online experience for the remote players, among other things.

SUMMARY OF THE INVENTION

The invention is generally directed to systems and methods for securely collecting sensory and game play data generated during the play of a live casino table game, including gaming symbols which are generated as the result of or in connection with the live table game, and transmitting that game play data for additional use and to facilitate the play of one or more wagering games remotely, which may be played contemporaneously with the instance of the live table game or thereafter.

In one aspect, a method, systems, and apparatuses provides a computer generated remote player user interface ("RPUI") for computer generated casino games, such as Baccarat games like Mini-Baccarat, Midi-Baccarat or Big Baccarat, that integrate still and animated photos, videos and graphics intended to convey a realistic representation of the actual procedures used in a real casino to deal a game to live players playing the game at a real Baccarat table hosted by the casino, wherein the realistic representation is facilitated by obtaining data relating to the game and atmosphere at the casino, such as audio and video data captured through one or more data capture devices at the casino, such as cameras and microphones, for subsequent real-time, delayed or on-demand broadcast to one or more remote players (also referred to as "RPs" herein) who may wager and participate in the game as if they were present at the live game table hosted by the casino in accordance with the invention. The data capture devices may include card reading scanners or cameras, video cameras, microphones and other devices which may be installed in a gaming table or at a casino, such as security, game monitoring devices or surveillance systems and cameras, for capturing sensory and gaming data that can be transmitted to recreate the casino environment in facilitating the remote play of a wagering game for real-time or on-demand broadcast to one or more remote players who may wager and participate in the game as if they were present at the live game table hosted by the casino. In some embodiments, the sensory and gaming data may be incorporated into remote games as accurate portrayals of events occurring at the live game or partial or full animations of accurate events with or without photos.

In one aspect, sensory data and/or gaming data captured from a live game in a real-world environment are recorded for delayed playback or streamed live in real-time, and a remote player is able to access the game online and participate in the game as if the remote player had been present at the original, live game in the real-world environment. In one aspect, the remote player may play in the online game at the position/seat occupied by one or more of the original, real-world players in the original, real-world game. In one aspect, in games where a player is dealt his or her own hand of cards, the remote player will receive cards as they were dealt to the original, real-world player that occupied the same position/seat in the original, real-world game. In one aspect, the remote player may able to make strategic decisions during game play that differ from those of the original, real-world player, wherein such strategic decisions may affect the outcome of the game for that player. In one aspect, the real-world environment is a gaming area at a casino.

Some embodiments of the invention are directed to a system for providing remote game play, comprising: a gaming data collection device for collecting gaming data from the play of a live table game, wherein the collected gaming data includes the order and identity of each playing card in a group of randomly-ordered physical playing cards the cards being randomly-ordered for use in the play of the live table game; one or more communication devices for receiving one or more user selections, the one or more user selections including a selection of the collected gaming data, and transmitting collected gaming data responsive to receiving the one or more user selections; and one or more processing devices for facilitating i) the transmission of the collected gaming data responsive to receiving the selection thereof, iii) the display of the collected gaming data on a display device and ii) the use of the collected gaming data in the play of one or both of the live table game and an independent game through the display device, wherein the processing device facilitates the display on the display device of one or both of a first user selectable feature and a second user selectable feature, wherein the identity of one or more cards is displayed on the display device prior to the identity of the one or more cards being revealed during the play of the live table game responsive to the one or more communication devices receiving a selection of the first selectable feature through the display device, and wherein the order of the playing cards included in the collected gaming data is changed responsive to the one or more communication devices receiving the selection of the second selectable feature through the display device.

In some embodiments, the order of at least a portion of the playing cards included in the collected gaming data are randomized using a random number generator responsive to the one or more communication devices receiving the selection of the second selectable feature through the display device. In some embodiments, the order of the playing cards included in the collected gaming data is changed by causing a contiguous proximal portion of the group to be moved to distal position relative to the remainder of the group responsive to the one or more communication devices receiving the selection of the second selectable feature through the display device.

Some embodiments of the invention are directed to a method for providing remote game play, comprising the steps of: collecting gaming data from the play of a live table game through a gaming data collection device, wherein the collected gaming data includes the order and identity of each playing card in a group of randomly-ordered physical playing cards the cards being randomly-ordered for use in the play of the live table game; receiving one or more user selections through one or more communication devices, the one or more user selections including a selection of the collected gaming data, and transmitting collected gaming data responsive to receiving the one or more user selections; and one or more processing devices facilitating the steps of i) transmitting the collected gaming data responsive to receiving the selection thereof, iii) displaying the collected gaming data on a display device and ii) using the collected gaming data in the play of one or both of the live table game and an independent game through the display device, wherein the processing device facilitates the display on the display device of one or both of a first user selectable feature and a second user selectable feature, wherein the identity of one or more cards is displayed on the display device prior to the identity of the one or more cards being revealed during the play of the live table game responsive to the one or more communication devices receiving a selection of the first selectable feature through the display device, and wherein the order of the playing cards included in the collected gaming data is changed responsive to the one or more communication devices receiving the selection of the second selectable feature through the display device.

The step of changing the order of the playing cards may further comprise randomizing the order using a random number generator.

The step of changing the order of the playing cards may further comprise causing a contiguous proximal portion of the group to be moved to distal position relative to the remainder of the group.

The aforementioned method may further include the step of displaying an indicator on the display device identifying the size of the contiguous proximal portion of the group to be moved responsive to receiving the selection of the second selectable feature, and/or displaying a representation of the one or more playing cards being partially lifted to reveal the identity of the playing card responsive to receiving the selection of the first selectable feature. The gaming data further comprises multimedia data collected from the play of the live table game, wherein the multimedia data includes video and audio data.

Some embodiments of the invention may be directed to a system for providing remote game play, comprising: one or more gaming data collection devices for collecting gaming data from the play of a live table game at a gaming table, wherein the collected gaming data includes video and audio recorded during the play of the live table game, and the order and identity of each playing card in a group of randomly-ordered physical playing cards the cards being randomly-ordered for use in the play of the live table game; one or more communication devices for receiving one or more user selections, the one or more user selections including a selection of the collected gaming data, and transmitting collected gaming data responsive to receiving the one or more user selections; and one or more processing devices for facilitating i) the transmission of the collected gaming data responsive to receiving the selection thereof, iii) the recreation of the collected gaming data on a remote device including a display device and an audio playback device and ii) the use of the collected gaming data in the play of the live table game through the remote device, wherein the one or more processing devices facilitate the display of a user selectable feature on the remote device, wherein the identity of one or more cards is displayed on the display device prior to the identity of the one or more cards being revealed during the play of the live table game responsive to the one or more communication devices receiving a selection of the user selectable feature through the display device.

The one or more communication devices include one or more communication devices for receiving video and audio data from the remote device and one or more communication devices for broadcasting the video and audio data received from the remote device during the play of the live table game. The system may further include a control panel for selecting the location of the video and audio data recording during the live table game, and the control panel may be mounted to a gaming table.

BRIEF DESCRIPTION OF THE DRAWINGS

FIG. 4Ja is an illustration of typical playing card with "Card Value", Faced-Up, used to deal a virtual or real-time Midi-Baccarat or Big-Baccarat game to RP's wagering online in accordance with the invention.

FIG. 4Jb is an illustration of an animated computer generated graphic image relative to the method of "Option 1", in accordance with the invention for the RP to face-up a face-down PLAYER or BANK hand dealt to a RP playing a virtual or real-time Midi-Baccarat or Big-Baccarat game online in accordance with the invention.

FIG. 5F is an illustration the systems "Video Selections—Drop-Down-Menu" available to RP's playing a Midi or Big Baccarat game during real-time; by activating the Bar Menu's "Video" 505 button; in accordance with the invention.

DETAILED DESCRIPTION OF SOME EMBODIMENTS OF THE INVENTION

Figure 1:
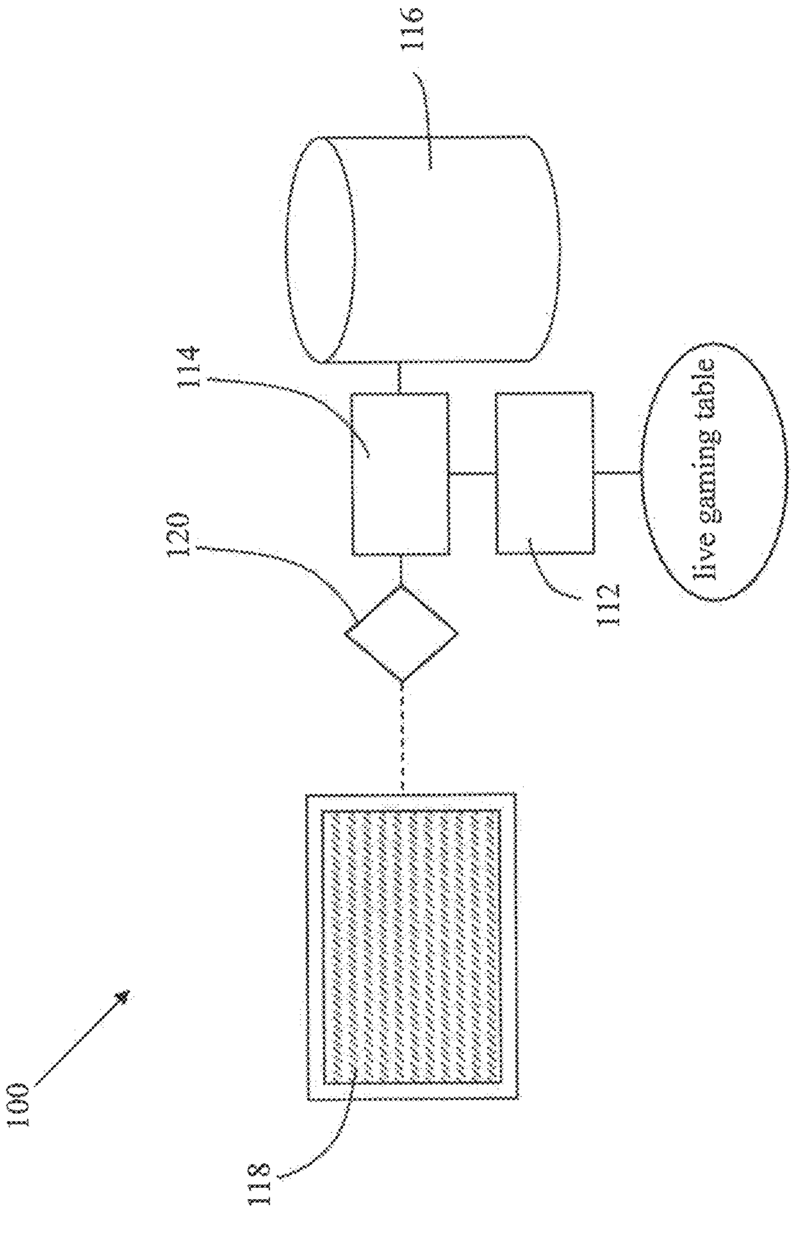
FIG. 1 is a schematic diagram of the components of an embodiment of the invention.

The invention includes systems and methods for providing, conducting and facilitating play of multiple wagering games at an electronic platform through the use of randomly generated game play data received from one or more live wagering games. It is contemplated that the multiple wagering games may possess characteristics, such as the wagering opportunities and/or game play methodology, which are either the same or which differ from the characteristics of the live wagering games.

The invention may be applied to any live table game, such as baccarat, blackjack, roulette, craps, poker, pai gow, sic bo, bingo, card games, or any other type of game having a live or electronic dealer and one or more players seated at a gaming table or electronic gaming platform.

As discussed herein, the invention may collect data from any gaming operation in which randomly generated gaming data can be obtained, which may be facilitated by devices that monitor aspects of the game elements and/or game play. For example, the gaming data collected may include the constituency of a randomly-ordered or generated group of playing cards placed in a dealing shoe, both before (such as a pre-scanned randomized decks) or during/after the cards are dealt, the particular physical or virtual cards dealt to one or more players at a gaming table, or the results of gaming elements such as dice or roulette wheels, for example. Gaming data may further include numbers or alpha-numeric combinations, playing card values and suits, dice values, roulette values and colors, slot machine symbols, or any other form of randomly ordered gaming symbols. Gaming data may derive from physical game pieces, such as physical playing cards, physical dice, physical bingo or keno balls, and so forth, or as electronic game pieces, such as electronic playing cards, electronic dice, electronic bingo balls or keno balls, or the like.

The collected gaming data is then stored for subsequent use or transmitted to enable additional play of wagering games. For example, the gaming data may be used to facilitate participation in a live wagering game from a remote location. Players may remotely participate and wager on a game, place backbets or side wagers, as it occurs. The gaming data may also be collected and used to facilitate play of a wagering game at the same or later time. For example, a plurality of decks of cards may be shuffled to be in a randomly ordered state prior to being placed in a card dealing shoe. The randomly ordered state of the plurality of cards may be ascertained through a card reading scanner during the shuffling process or upon delivery so that the locations of each card are known. This gaming data may then be used to facilitate play of other games in addition to the live table game for which it is intended, either before or after a player in the live table game places a cut card in the plurality of randomly ordered cards to cut the deck. The dealer can scan the bottom card and/or a top card or first card dealt, depending on whether the deck is cut and the underlying game the game deck is being used for, so that the change in state of the cards is known. The dealer can scan the bottom card of the pre-scanned cut deck, place the bottom portion of the pre-scanned cut deck on top of the top portion of the pre-scanned cut deck, whereas the system software receiving and storing the inventory of the pre-scanned game deck, including the manufacturers number assigned to the game deck, the rank, value and suit of each card comprising the game deck, and the location, or delivery sequence of each card comprising the game deck, so that the first card dealt, or removed from the game deck, is known thereby identifying the change or reconstitution of the game deck caused by cutting the pre-scanned game deck.

Gaming data may also be collected as cards are distributed. For example, card information may be obtained from either a card dealing shoe with a card reading system or through any card reading scanning device or camera, and subsequently transmitted to extend the games to remote players, particularly in the case of community games such as baccarat or roulette, or to play another game unrelated to the live game.

The remote location from which players may play may be any platform capable of receiving and transmitting data, including "thin-client" platforms or platforms which do not process gaming data and "smart" platforms or platforms which process gaming data. The platform can be stationary or a portable electronic device such as a smart phone. Thus, players are thus not confined to the gaming table or even the casino floor.

Referring to FIG. 1, a system 100 for implementing some embodiments of the invention include a gaming data receiving device 112, a data communication device 114 and a data storage device 116, some or all of which may be included in, or in communication with, a second, one or more, data communication devices 118 located remotely with respect to the data communication device 114.

Gaming data receiving device 112 may be one or more devices, including a playing card reading device or scanner positioned at a gaming table or within an automated shuffler or playing card dealing shoe and configured for receiving the gaming play data randomly generated during play of the live table game, either through manual input or automatic input of game play information, such as the gaming symbols on the cards dealt. Gaming data received by gaming data receiving device 112 is then transmitted to one or more communication devices 118 via communication device 114 and/or stored by data storage device 116.

For example, electronic scanning, recognition and detecting devices known in the art may be used for a variety of gaming data receiving functions, such as for example, reading cards, determining the location of a roulette ball, or ascertaining the results of a dice game, which can then be transmitted. Gaming data may derive from a variety of sources, such as devices for delivering cards during play of a game on a gaming table, audio devices adjacent to the table, security cameras capturing live feeds of the game play, and may be compiled as one or more streams of gaming data. Gaming data may also be automatically input using a camera mounted over a live table game to obtain card information, or through one or more card reading devices, such as an optical reader mounted in a gaming table, card delivery shoe, or card shuffler, which is capable of decoding the gaming symbols shown on physical playing cards. The Hill family of card-dispensing shoe patents (U.S. Pat. Nos. 5,722,893, 6,039,650, 6,299,536, 6,582,301, 7,699,694, 8,088,010 and 8,152,641) discloses features and aspects of a system designed to capture gaming data and are incorporated in this patent application by reference.

In some embodiments, entire decks of cards may be read during the shuffling or delivery procedure to a card dealing shoe, such as those used in the game of Baccarat. In such embodiments, the origin of the decks of cards may be identified, such as the casino from which they derive, the time/day the deck was shuffled or otherwise placed in a random order which may comprise a code assigned by a shuffler or shoe device, or used in the play of a game, and then used in the provision of games to players playing remotely, which may be inside or outside of the casino.

Alternatively, in electronic gaming platforms in which physical cards are replaced by virtual cards, the gaming data may derive from the random number generator used to generate random virtual cards.

Data communication device 114 receives and transmits gaming data which is randomly generated as a result of playing the live table game. The system may further include one or more processing devices, such as processing device 120, to facilitate further play using the gaming data. It should be understood that each of the communication devices 118 may differ from one another, such as, in the case of smartphones, tablets or laptops, and may further include display devices for presenting a player interface. The player interface may be configured to show virtual representations of the gaming data, such as virtual cards that are the same as the detected cards, virtual players and dealer, and/or present live video showing the derivation of the gaming data, that is, the play of the game from which the gaming data originated, which may consist of a recorded video or live multimedia feed of the table game being played. The video or live multimedia feed may be provided for any reason, such as to enhance the remote play or support the integrity of the gaming data, through any means, such as a video conferencing, voice over internet protocol, data transmission method, data compression, multipoint or point to point video conferencing or the transmission and play of a recorded file over a global communication network.

In one example, the game of baccarat may be played live and broadcast to one or more communication devices 118 also receiving gaming data from the same game. Remote players may participate in the game and independently place wagers and side wagers, such as tie wagers, progressive side wagers, and receive payouts irrespective of the outcome of the live table game.

As discussed herein, some embodiments of the invention obtain card information prior to the cards being dealt as well as upon being dealt. This information may be used to support a variety of features, such as permitting some or all remote players to obtain card information, such as the rank and suit, prior to the card being turned over or otherwise shown to some or all players in the live game from which the gaming data is derived. This feature therefore allows for remote players to "peek" at the cards (and possibly be made aware of the outcome of wagers placed or the status of the initial hands) before some or all of those involved in the live game, without impacting the game integrity (for example, in some games such as Baccarat the wagers are placed prior to the deal and cannot be changed). For example, remote players having achieved a particular status, such as through repeated play or a loyalty program, or by amount wagered in a current game or over time, may be provided with a selectable feature which enables peeking at the cards prior to the cards being revealed to others, including players at the live game and other remote players. The selectable feature for enabling peeking may appear on a screen or otherwise made available only upon the satisfaction of certain preset criteria, which may be the player achieving a particular status or wagering at least a minimum amount.

An exemplary method of operating the invention with a system such as system 100 may involve the step of communicating gaming data collected from one or more live wagering games and the corresponding wagering games available for remote play. The corresponding remote wagering games which use the gaming data may involve the same or different game rules and methods as compared with the game rules and methods of the live table game from which the gaming data derived. The outcome of wagers received from players in the wagering games played remotely are resolvable by comparing the remote game results with a preset criteria for determining the outcome of the wagering game, which may be facilitated by a program and one or more data processors.

System 100 may receive gaming data directly from the live table game or from data storage device 116 having stored data from a live table game. Upon receiving the gaming data, system 100 may actuate a wagering game. Players may select the location from which the gaming data originated. For example, players may select to play gaming data that originated from a specific casino or geographical region. Stored gaming data may be accessed so that historic gaming data may be selected. System 100 may be configured so that gaming data is not used more than once. A broadcast of the game from which the gaming data derived may be provided to illustrate the integrity of the gaming data to the players either automatically or upon request. Once the gaming data is selected the players may engage in a wagering game which involves the gaming data. For example, if the gaming data relates to the randomly ordered cards included in a plurality of decks of cards shuffled for use in a live game played in Las Vegas, then the wagering game will be provided to remote players using the same identity of cards in the same order.

For purposes of the description of embodiments herein, it should be understood that a "pre-scanned game deck" refers to the total group or inventory of the cards that will be used in the play of a casino game which have been shuffled and scanned by at least one playing card scanner known in the art. The output of the playing card scanner, (i.e. the number of cards, each card's card value, card suit, card rank and the position, or delivery sequence, of each card comprising the freshly shuffled pre-scanned game deck), is uploaded and stored on a CPU, or game server, that is coupled to the online casino software system.

When the game is being played by real people actually engaged in the play of a casino card game, hosted by a land-based casino, the game dealer, (after shuffling the game deck), will present one of the actual game players with a "cut card" to cut the game deck. The cut card is placed in between two cards of the game deck and the contiguous portion of cards, typically in front of the cut card will be moved distally relative to the game deck such that the portion of cards will now come later in the order.

The system of the current invention captures sensory, (video and audio), gaming data, such as game play information, wagering information and card identity information captured by devices such as electronic wagering devices, RFID gaming chips, and a card delivery shoe with card scanning or other card scanning/reading device, used to capture the card value, rank and suit, and the delivery sequence of each card removed from the shoe that passes over the scanning device either in the shoe or embedded in the game table. The captured data may be broadcast or streamed live, by wired or wireless means, to one or more remote game players during real-time, and/or recorded and stored in one or more of the system's online casino game databases for delayed or on-demand playback, over the Internet, which refers to a specific global internetworks of networks. However, it should be understood that other networks can be used instead of the Internet, such as in intranet, an extranet, a virtual private network ("VPN"), a cell network, a non-TCP/IP-based network, any LAN or WAN or the like, such that the broadcast and remote play may occur within the casino from which the captured data derives through a kiosk or mobile platform. The video or live multimedia feed may be provided for any reason, such as to enhance the remote play or support the integrity of the gaming data, through any means, such as a video conferencing, voice over internet protocols, data transmission method, data compression, multipoint or point to point video teleconferencing or the transmission and play of a recorded file over a global communication network.

The invention may also capture sensory data relating to the sights, sounds, and other sensory elements of the general environment of the real-world casino using any conventional sensory capture devices. In one aspect, sensory data from the real-world casino environment may be captured using CCTV cameras, Video Teleconferencing ("VTC") cameras, microphones, infrared sensors, motion sensors, RFID devices, or any other conventional devices or technology capable of capturing sensory input and converting it into digital data. Such technology may be placed in any appropriate location, for example, positioned above the gaming area or gaming table, embedded within the surface of the gaming table, or built into furniture or decor. Such technology may also be connected to recording devices (e.g., a digital video recording device able to continuously record and store data as it is captured. An intelligent gaming table's capture devices transmit captured data to back-end systems for processing, storage, and/or re-transmission. A dealer control panel at the gaming table or back-end systems may also be able to control the "VTC" camera(s) and/or CCTV camera(s) (e.g., panning, tilting, and/or zooming video cameras, controlling microphone activation and volume). Transmission of data captured from a game tables capture devices to back-end systems is preferably implemented using secure technologies and encryption.

In one aspect, sensory data and/or gameplay data from the real-world casino environment may be securely transmitted from the capture devices to one or more networked servers for storage via any conventional technology, including but not limited to closed-circuit television ("CCTV") and wired or wireless TCP/IP. In one aspect, any such transmission is secured using conventional strategies, including but not limited to encryption, authentication and authorization, and any other security measures that may apply to the data, the point of data capture, the transmission medium, the point of data reception, and/or the one or more networked servers. A networked server includes at least a processor, memory (e.g., RAM), a storage medium (e.g., a hard disk, optical drive, or static storage), and a network connection (e.g., TCP/IP). A casino may use existing surveillance systems to capture, transmit, and store the data.

Some important gaming data of the real-world environment to capture, for at least card games, may include: the pre-existing sequence of cards that comprise a particular shoe (which may include the number of the standard fifty-two (52) card deck, ("S52CD") that each of the cards comprising the card inventory belongs to; and the number, sequence, identity, and order of the cards comprising a game deck; the identity and order of the cards that are dealt out; the number, sequence, identity, and order of the cards remaining in a particular shoe when it is removed from a card-dispensing shoe after having triggered the casino's deck penetration rule; the identity of the player, seat/position, game hand, or dealer receiving each card that is dealt out; the number of cards dealt to each player, seat/position, game hand, or dealer; and the identity of any cards discarded, as well as the identity of the player, seat/position, game hand, or dealer by whom or from which the cards were discarded. For other games, such as roulette or craps, although there is no player-specific information, there may still be important gameplay data to capture (e.g., for roulette, the motion of the ball and the wheel and the pocket in which the ball lands; for craps, the selection and toss of the dice, the faces of the dice that land facing up, and the call of the play of the game). This information may be needed, not only for game play, but also to ensure the integrity of the game. Finally, for any game that involves wagers by the players, bets may also be captured (including those of other real-world players) in order to enhance the feeling of immersion in the real-world casino environment; however, since the remote player will be setting their own wagers, this may not be essential to capture in all games. U.S. Pat. Nos. 6,582,301 and 7,699,694, and U.S. Pat. App. Pub. No. 2003/0195025 (Hill, O. D.), which are incorporated herein, describe various exemplary systems that captures players' bets.

A database may store casino-specific, location-specific, and general game-specific information; however, it may also store game-specific information as each game round is played. Gaming data specific to each game played may include: the name, gaming jurisdiction, and geographic location of the host casino, type of game being played, the game table number, the identity of the dealer and the identities of the live players, the date and time a particular shoe was placed in the card-dispensing shoe, and a serial number for each particular shoe dealt at the game table on that date; the time the first card was removed from a particular shoe to initiate the commencement of the first game round dealt from a particular shoe; as each card is removed from the card-dispensing shoe to be "burned" or dealt to a player, seat/position, game hand, or dealer, any data captured by the scanner or intelligent game table (e.g., card value, card rank, card suit and delivery sequence of each card delivered to a player, seat/position, game hand, or dealer including the game hand totals and game hand results, wins and losses); the time the round ended, the number of game rounds dealt, the number of game hands dealt in each round, the time when the last cards for the last round was dealt from a particular shoe, and the total time elapsed from the start-time of the first round dealt from a particular shoe to the end-time of the last round dealt from a particular shoe before the remaining inventory of the particular shoe was removed from the card-dispensing shoe. The start and end time for each game hand or round enabling the gaming data to be edited to speed up the play of the remote game when played on demand.

In one aspect, the pre-existing sequence of cards that comprise a particular shoe may be determined either by scanning the cards that comprise a particular shoe after it has been shuffled and is ready to be dealt, or it may be pre-determined (e.g., by a RNG) and then the cards may be sorted to conform to the pre-determined sequence. The pre-existing sequence of cards that comprise a particular shoe may be used to verify the order of cards as they are dealt in the original, real-world game and generate the order of cards as they are dealt in the online game. When the pre-existing sequence of cards has been obtained through scanning, such scanning may have been performed in several different ways. In one aspect, such scanning is performed before the decks of cards arrive at the casino, (e.g., while the decks of cards are still at a manufacturing or printing or packaging or distribution facility); in this aspect, information regarding the pre-existing sequence of cards in a given deck may be included with the deck of cards by using any conventional technology (e.g., an RFID chip, bar code, or magnetic strip incorporated into the packaging or inserted with the packaged deck of cards). This information may be read using an appropriate reading device, either at the casino or at another appropriate location; in one aspect, the information is read by card-dispensing shoe as each new deck is loaded into the particular shoe. In one aspect, such scanning may be performed in a secure area at the casino; in this aspect, information regarding the pre-existing sequence of cards in a given deck may be included with the deck of cards as previously described, may be transmitted over a network to be stored in database or may be transmitted directly to the gaming table where the cards are to be loaded into a card-dispensing shoe (e.g., to an intelligent game table, or to a card-dispensing shoe). If the information is stored in a database it may again be transmitted over a network to the gaming table where the cards are to be loaded into a card-dispensing shoe. In one aspect, such scanning may be performed at the gaming table itself, either by a card-dispensing shoe or by a shuffling machine that is capable of scanning an entire shoe of cards after having shuffled the cards. In one aspect, such scanning may be performed by a card-dispensing shoe, which may be able to read the entire shoe of cards prior to dispensing any cards, and transmit the known inventory of the scanned to each remote player's client computer who has selected a particular game table for real-time and/or on-demand play; or which may simply scan each card as it is dispensed from the shoe for real-time transmission to the remote player's client computer. It should be understood that a game deck shuffled by the dealer and placed in a device with card scanning or reading capability may involve the scanning of each individual card one-by-one and transmitted in real-time for use in a game being played by the remote players.

As disclosed herein CCTV camera(s), and/or Video Teleconferencing Network camera(s) that are coupled to the system of the current invention can capture the sensory data and/or gaming data of any casino table game played in a real casino by real people at a gaming table for real-time, delayed or on-demand broadcast over an intranet, an extranet, a virtual private network ("VPN"), a cell network, a Video Teleconferencing network, a non-TCP/IP-based network, a Television Broadcast; and/or any LAN, WAN, or the like including the Internet for play by one or more remote players, including using a CPU's terminal or display that is physically located within casino hosting the live play of a casino table game, to play, backbet, wager and/or interact with the real-time play of a casino table game, captured and broadcast during real-time from the physical site or location of the host casino. For example, remote players may use the communication connection provided for sensory and gaming data to be privy to or engage in the banter between players, interact with the dealer and/or players at the table from a remote location, including providing instructions to the dealer for performing functions such as cutting the game deck. Also, the remote player may be enabled to engage in tournament play without being physically present and as discussed herein, the remote player may be provided with the opportunity to peek, that is, view the identity of one or more cards, prior to the cards being revealed to the players seated at the gaming table so long as this knowledge does not impact the integrity of the game. Also, the remote player may be enabled to engage in tournament play without being physically present and as discussed herein, the remote player may be provided with the opportunity to peek, that is, view the identity of one or more cards, prior to the cards being revealed to the players seated at the gaming table so long as this knowledge does not impact the integrity of the game.

An advantage of coupling a casino table game with a VTC network which provides for bilateral communication of multimedia data between the gaming location and the remote player, is that the remote player's identity and legal requirements such as age and location can be more readily verified. The captured data may be stored in one or more databases of qualified remote players, along, without limitation, with other information specific to the identification of the image captured and stored by the VTC when coupled to any online casino site hosting one or more casino table games the remote player(s) has selected for play. The host online casino site may utilize Biometrical Facial Recognition software that will compare the live image of each remote player engaged in the play of a live casino table game to a previously verified photo or image of the remote player stored in a database.

Prior to the delivery of the first card from the inventory of the game deck downloaded to the remote player's client computing device each of the remote players will have the option of accepting the downloaded game deck as is or each of the remote players may use the online casino's Remote Players User Interface, to selectively cut the game deck or reshuffle using a random number generator assigned or mapped to each of the cards in the game deck. As such, the remote player has the option of using a game deck from a real game played in a casino which will nonetheless be uniquely ordered for use on the remote player's client computing device when the play of the game begins.

In the event that one or more remote players choose to accept the downloaded game deck's inventory, as is, the inventory of the game deck, during the play of the game, will be common to all remote players who have accepted the inventory of the game deck, used to play a particular type of card game, that was actually dealt at a particular game table, located preferably in a casino to real people by a real dealer.

The following description and figures provide non-limiting, exemplary embodiments and illustrations of the invention and some of its features. While the systems and methods in these exemplary embodiments are discussed in connection with providing for remote play of Baccarat, it should be readily apparent and understood that the systems and methods of the invention can be used to provide for the remote play of other games as well, such as dice, roulette, poker or poker-based games.

Figure 2:
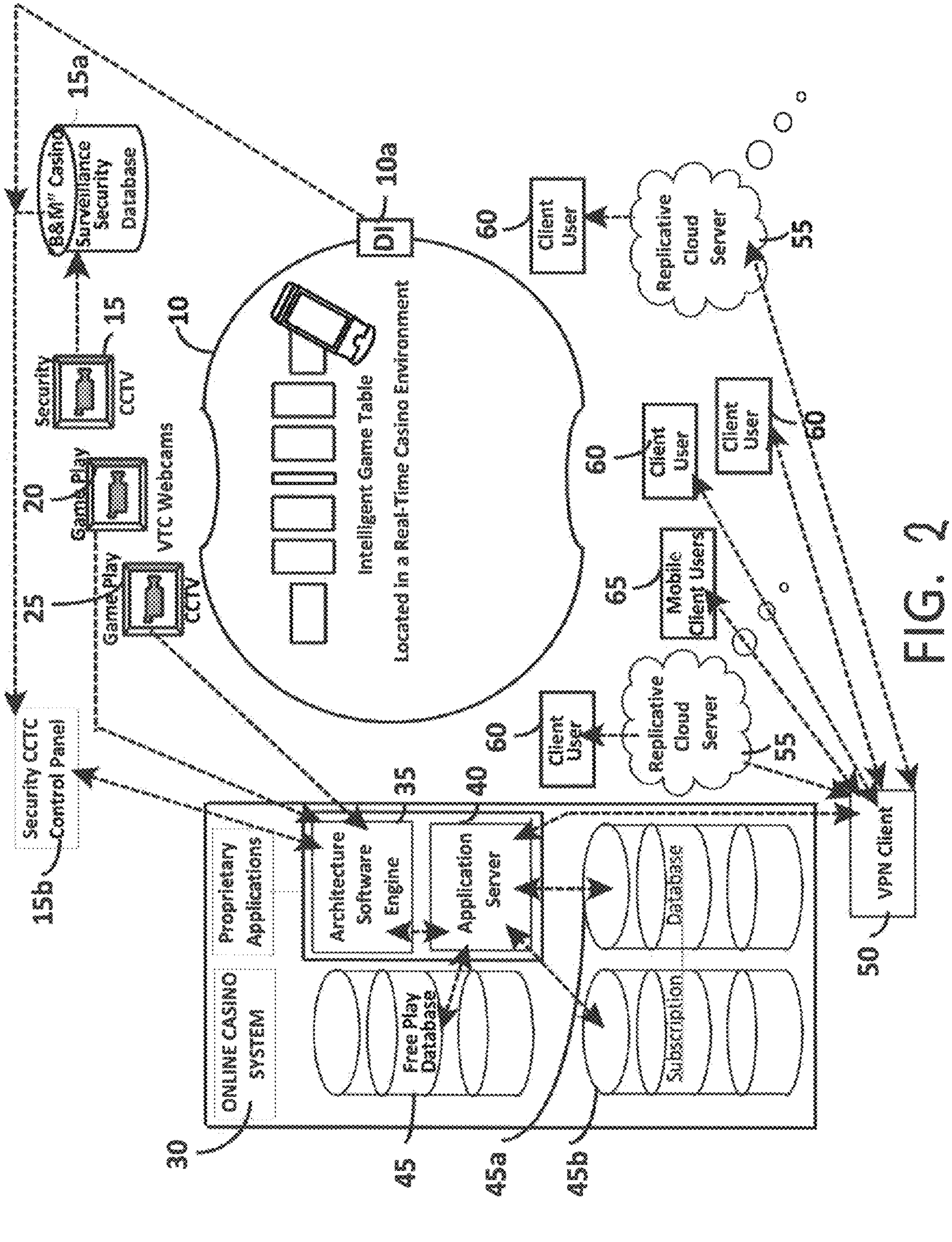
FIG. 2 is a schematic of an Online Computer System providing interactive online casino gaming within an environment incorporating sensory data and/or gaming data captured from a live, real-world casino table game for real-time or on-demand broadcast to remote players by wired or wireless means.
Figure 3:
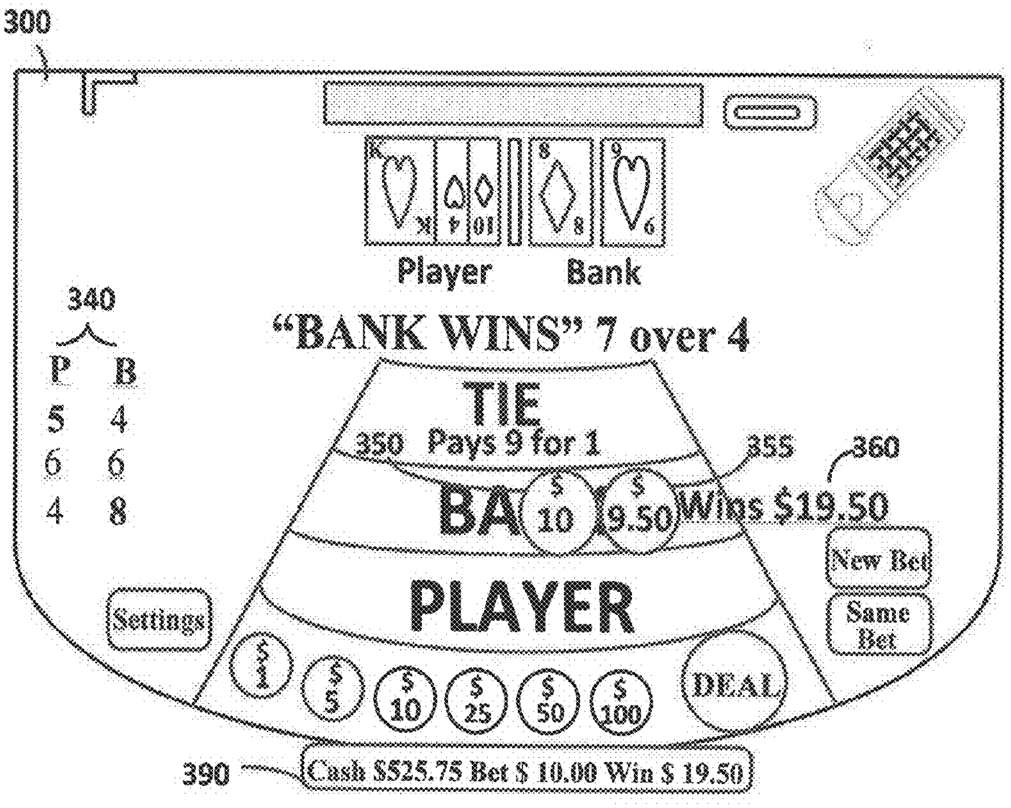
FIG. 3 is a computer screen, or other electronic display, displaying one view of a PRIOR ART computer generated Mini-Baccarat Game Table Top, layout, card dispensing shoe, and a remote players user interface.

FIG. 2 is a schematic of an exemplary system constructed in accordance with the invention and configured for providing interactive online casino gaming within an environment incorporating sensory data and/or gameplay data captured from a live, real-world casino game for real-time or on-demand broadcast to remote players by wired or wireless means.

An Intelligent Game Table 10, ("IGT"), located within a gaming establishment is coupled to one or more Data Interface (DI) devices 10*a* which allows, without limitation, the output of the systems CDS w/Scanner, or other card recognition device, ("CRD"), and/or one or more imbedded Automatic Bet Recognition Device(s), ("ABRD"), and/or audio collection devices to capture the amount wagered by each of the live game players during the play of each game round; and/or to capture the ambient sounds of the real-time play of the game played at the Intelligent Game Table 10; and/or the surrounding casino environment, for real-time, delayed or on-demand broadcast to an unlimited number of remote players.

One or more Casino Security Closed-Circuit Television (CCTV) cameras 15 may be positioned adjacent to table 10 (and may be in communication with and controlled by, the Casino's surveillance room's "Security CCTV Control Panel" 15*b*). CCTV Cameras 15 can be used to capture the play of the game and transmit a real-time multimedia video signal to the host "B&M" Casino Surveillance Security Database, ("CSSD") 15*a*; and to transmit a real-time multimedia video signal to one or more video terminals or displays, (not shown), coupled to the host "B&M" Casinos ("Security CCTV") 15 camera(s). It should be understood that the components described herein may be contained partially or fully in the surveillance room or through a separate system may be located outside of the surveillance room.

Security Closed-Circuit Television (CCTV) camera 15 differs from broadcast television in that the signal is not openly transmitted, though it may employ point to point (P2P), point to multipoint, or meshed wireless links. These images or data are captured by a Digital Video Recorder (DVR), (not shown), or in the case of Internet Protocol (IP) cameras directly to a server, either on-site or offsite. CCTV 15 would be typical of the camera that a casino would use to satisfy regulators and provide a private feed that would in turn be recorded, captured and stored into a Casino Surveillance Security Database 15*a*. ("CSSD") 15*a* could also fulfill Video Content Analysis (VCA) capabilities of automatically analyzing video to detect and determine temporal events not based on a single image (i.e. pausing or editing video feeds to alter the outcome). This capability can also be used in other applications as discussed herein. Data that is collected from the DI 10*a* and data from the Casino Surveillance Security Database 15*a* are pulled into the Security CCTV Control Panel 15*b*. These in turn are fed into TV tuner Digital Video recorders (DVR) located within the Security CCTV Control Panel to mix, blend and enhance ambient game sounds with the certified CCTV feeds.

One or more game play CCTV camera(s) 25 and/or a Video Tele-Conferencing (VTC) web-based camera 20 Video Tele-Conferencing which uses audio and video telecommunications to bring people located at different geographical locations may be in communication with table 10. This can be as simple as a conversation between people in private offices (point-to-point) or involve several (multipoint) sites at multiple locations. Typical use of the various technologies described above include calling or conferencing on a one-on-one, one-to-many or many-to-many basis for personal, business, educational and entertainment use or services. Use of the VTC webcam would allow real-time observation, and/or one or more remote players to engage, without limitation, in the real-time play, of any Intelligent Game Table game play sessions transmitted in real-time from the physical casino gaming environment. These real time inputs would facilitate multiple uses and applications of the Online Casino System 30.

Online Casino System 30 of this embodiment may be located within the internet cloud or could be hosted through a web based hosting service. Within the Online Casino System there is a software engine 35 and application server 40 along with database storage units 45, 45*a* and 45*b*. Within the proprietary application there is the Architecture Software Engine 35 for performing functions such as hosting user authentication, virtual online gaming overlay, and interactive game play features. Intelligent Game Table 10 game play sessions are transmitted in real-time from the physical casino gaming environment and processed by Engine 35 before being stored and cataloged for application use or viewing by client users 60. These data feeds from the physical casino gaming environment are utilized at the application software layer in the application server 40. Application server 40 may be configured for functions such as hosting cloud platform, VPN client control, web interface, and provide a digital storefront, for in-app purchases, services and access to premium events etc.

Database storage units 45 may include Free Play database which allows users to access the Online Casino System 30 through the internet and watch real time game play or participate in non-authenticated game play where they can play practice hands or experience the Online Gaming Systems 30 interactive game play that utilizes some of sensory game play data and/or gaming data previously captured and stored by the Online Casino System 30. The Application Server 40 would provide one or more means to allow authorized RP's to access the Subscription Databases 45*a* and 45*b* and enjoy the full gaming experience offered by the Online Gaming Systems 30 interactive RPUI.

The VPN Client 50 enables a computer user to send and receive data across internet cloud networks as if it is directly connected to the private network, while benefiting from the functionality, security and management policies of the network. VPN Client 50 enables users to access networks from home or when traveling, and offers a range of features from simple authentication via simple login to advanced full security protocols. Tunnel endpoints must be authenticated before secure VPN tunnels can be established. User-created remote-access VPNs may use passwords, biometrics, facial-recognition, two-factor authentication or other cryptographic methods to access the Online Casino System 30. Network-to-network tunnels often use passwords or digital certificates, and permanently store the key to allow the tunnel to establish automatically, without intervention from the user. The system may utilize secure VPN authentication protocols, such as Internet Protocol Security, Microsoft Point-to-Point Encryption, Secure Shell, and Transport Layer Security.

The Replicative Cloud Server 55 provides for sharing information between a primary internet cloud and other Replicative Cloud Servers so as to ensure consistency between redundant resources, such as software or hardware components, to improve reliability, fault-tolerance, or accessibility; whereas if one site should go down—users would transparently be balanced to the next nearest or most available data center. This permits a multi-primary approach in which a group of processes cooperate to parallelize some aspects of request processing and allows a primary sever to cache data.

Client Users 60 as referenced herein is a computer program that, as part of its operation, relies on sending a request to another computer program which may or may not be located on another computer. (For example, web browsers are clients that connect to web servers and retrieve web pages for display). Clients and servers may be computer programs run on the same machine and connect via inter-process communication techniques. Combined with Internet sockets, programs may connect to a service operating on a possibly remote system through the Internet protocol suite. Game play is handled by having each user's game client communicate with the server. The server is responsible for passing information on to the other users. For instance, when one user moves, the user's computer sends a message to the server. The server then sends messages to the other players to inform them of a change in the state of the game. Thus a primary service is to allow its users to download games and other software that they have in their virtual software libraries to their local computers as game cache files. Mobile users, i.e. laptops, tablets, smart phones and wireless handhelds are examples of devices 65.

Figure 4:
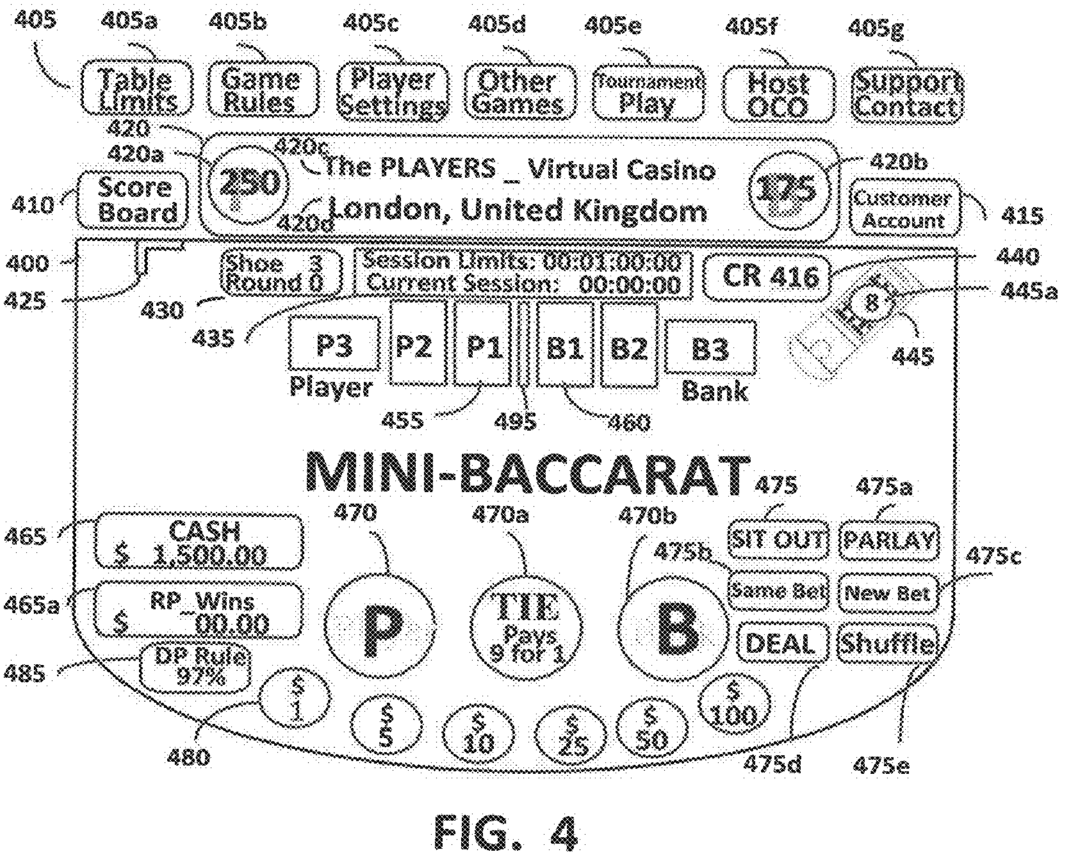
FIG. 4 is an illustration of a screen shot of a virtual Mini-Baccarat Game Table Top and ("RPUI"), depicting fundamental elements disclosed in exemplary embodiments of the invention.

As shown by FIG. 4, a computer generated virtual online casino Mini-Baccarat game table 400, is shown as part of a RPUI to support methods in accordance with the invention.

With minor modifications, the RPUI shown herein may be common to all types of online casino Baccarat games, (e.g., Mini, Midi or Big-Baccarat), whether using a RNG to generate the game data, gaming data, including real-time sensory data and/or data captured during the play of a real Baccarat game, played by real people, during real time, at a real casino Baccarat table, located in a real "B&M" Casino that is preferably legally licensed and regulated.

Game table 400 includes various features for facilitating the online play of Baccarat games in accordance with the invention. A Bar Menu 405 is, without limitation, comprised of seven (7) buttons that provide a means for the remote players to access one or more drop down menus that will provide the RP's with a wide range of information relevant to any legally licensed and regulated casino, associated with or acting as a "Online Casino Software Developer, ("OCSD"), Online Casino Operator, ("OCO"), hosting an online casino website, using wired or wireless means to, to transmit the play of a virtual online casino game to qualified RPs over an intranet, an extranet, a virtual private network ("VPN"), a cell network, a Video Teleconferencing network, ("VTC"), a non-TCP/IP-based network, any LAN, WAN, or the like including the WWW.

Example bar menu buttons include, (i.e. a Table Limits 405*a*, Game Rules 405*b*, Player Settings 405*c*, Other Games 405*d*, Tournament Play 405*e*, Host OCO 405*f* and, without limitation, a Contact/Support 405*g* Button.) These Bar Menu buttons may be configured to accommodate all types of online casino Baccarat games, (Mini, Midi and/or Big-Baccarat Table Games), whether these game are computer generated virtual Mini-Baccarat games, or the play of Midi or Big Baccarat games, played at a real Baccarat table, located in a real B&M casino, by real live people during real-time; whereas the play of these games may be captured by one or more capture devices for real-time, delayed or on-demand broadcast, by wired or wireless means, to RP's accessing the play of the game, by means of the Internet, a television broadcast or other electronic means. (FIG. 4S and FIG. 5F will provide more detailed information related to system features available to the RP's by means of above Bar Menu buttons.

The system software of some exemplary embodiments will capture, record and display the results for each game round dealt from a group of cards used in a Baccarat game, that is, a "particular shoe" 445*a*, of cards dealt from the virtual representation thereof and referred to as shoe 445. Preferably the system software will store the scoreboard, (FIG. 4A 410*a* and FIG. 4B 410*a*), generated by the system's software Baccarat game modules, for each "particular shoe" that a remote player has placed at least one wager for one game round, within the remote players player rating history, (RP's PRH), that is available to the RP's by clicking on the "Customer Account" button 415. The remote player will have the option to print out one or all of his/her Scoreboards, for each "particular shoe" stored within his/her RP's PRH report.

The Baccarat "Scoreboard", (FIG. 4A 410*a*), can be called by pressing the Scoreboard Button 410 any time prior to or during the RP's play session. The Scoreboard provides a means for the players to plan the placement of their bets using information that provides no mathematical advantage or disadvantage to the player or to the casino operator. However, it does help to immerse the player in the play of the game, making the game more interesting and entertaining, which results in the Baccarat player playing longer and perhaps more often.

The Scoreboard Button 410 acts as a toggle key. Clicking on the Scoreboard Button 410 will call and display the system's Scoreboard (FIG. 4B 410*a*). When the Scoreboard is on display; clicking on the Scoreboard Button 410, or the Dismiss Button (FIG. 4A 410*u*) will dismiss the Scoreboard (FIG. 4B 410*a*).

The system software generates a display field 420 to display the name 420*c* of the virtual online casino and the city and country 420*d* where the online casino game servers are located. Also displayed within the display field 420 as a field displaying the number of online RP's 420*a* wagering on the PLAYER hand for the current or upcoming game round. There is also a field displaying the number of RP's 420*b* wagering on the BANK hand for the current or upcoming game round. Also, this same information can be displayed on an "Administrators Terminal or Display" (not shown) coupled to host OCO's system monitoring, without limitation, the play of one or more of its online casino card games. The system software may be programmed to calculate, record and display the total amount of all PLAYER, BANK and TIE wagers made by the game players playing a particular casino Baccarat game and the amount of the games WIN or LOSS at a particular game table during real-time; and/or a particular time on any day of the week, month or year, on the host OCO's Administrators Terminal or Display coupled to the system.

The virtual game table top includes a discard rack 425 to receive any computer generated game cards, (not shown), that are dealt from the virtual card dispensing shoe 445, ("VCDS"), that are "burned", and or the cards comprising the game hands during a game round that has been completed.

The online casino Baccarat software tracks and displays 430 the number of "particular shoes", the RP has participated in during his/her current "play session", and the number of game rounds played from the "particular shoe" currently in use. The number of the "particular shoe", and game round may be unique to each remote game player.

The RP's may activate the Player Setting Button 405*c* to call a Session Menu, not shown, that allows each RP's to enter into the system any limits he or she wishes to place to restrict the total time he/she may wager on the host OCO site during any online gambling session; or limit the time he/she is allowed to play each day, week, month or year. The self-imposed Session Limits, preferably, would not apply to any "Free Play" or "Tournament Play" online casino game sessions played by the RP.

At the time a RP enters his/her "Session Limits" into the system he/she must also enter a date preventing the RP from changing his/her self-imposed "Session Limits" prior to a "Session Limits Reset Date", ("SLRD"), that the RP enters into his/her Customer Account. Preferably, the RP will not be able to personally change his/her ("SLRD") before the self-imposed date without contacting a service representative assigned by the host "OCO" to monitor potential "Problem Gamblers". The advantage of the "Session Limits" feature is to prevent the RP from becoming a "Problem Gambler"; and/or to assist "Problem Gamblers", when identified, in controlling their online gaming habits.

At any time, the remote player may use a mouse, or other input device to, to activate the Customer Account button 415 to call a pop-up screen displaying, without limitation, the remote players financial data relative to the play of the game which may include "Cash on Hand", "Available Credit", "Win or Loss" for the current game session and the remote players Name, Address, Location and other personal information including, but not limited to, the RP's date of birth and gender.

The online casino software is also programmed to track the number of cards that are removed from a "game deck" and use that information to calculate the percentage of the game deck that has been removed from the virtual game deck carried by the virtual games CDS 445; whereas the system software will display the percentage of the cards comprising the virtual game deck that will be dealt to the RP's, (the Deck Penetration Rule, ("DPR"), 485) before shuffling the depleted "game deck". Preferably, the "DPR" should be 97% (or 404 Cards) for a typical Baccarat game deck comprised of eight (8) standard 52 card decks; whereas when the system software identifies that the "DPR" has been achieved there will be fourteen (14) virtual cards remaining in the virtual CDS 445. Once the "DPR" has been achieved the system software will complete the current game round and then reshuffle the depleted virtual game deck 445*a*.

The average number of cards comprising a Baccarat game hand is 5.5 cards; and/or a total of eleven (11) cards for both the PLAYER and BANK hands. Therefore, the remaining fourteen (14) cards are more than enough to complete any Baccarat game round in progress at the time the "DPR" is achieved. Alternatively, the "Cards Remaining" display field 440 will show the actual number of the cards remaining in the virtual CDS 445 during real-time.

In some embodiments, the "OCSD" includes one or more analytical game evaluation modules within the online casino's Baccarat game software, which would automatically ignore the "DPR" and shuffle the virtual game deck in the event the system's analytical software determines that a RP might be using an independent analytical software program to determine when the inventory of a depleted game deck presents a statistical advantage, most favorable to the RP, and the RP responds by making a significant increase in his/her bets on the PLAYER or BANK hand, the TIE bet and/or other proposition bets that may be offered by the OCO's online casino Baccarat game.

Alternatively, the OCSD's analytical software module may include software that can compare the type of bets, PLAYER, BANK or TIE, relative to the first card dealt to the PLAYER hand each game round, (the 1st Card Advantage), and/or analytical software that determines when a game player engaged in the play of a casino card game may, by mental, electronic or illicit means has precise knowledge that the cards remaining in the depleted inventory of a game deck is favorable to the game player, whereas the RP using that knowledge he/she may overcome the "house advantage"; therefore the system software may automatically reset the "DPR", using for example, the "Floating Deck Penetration" feature of U.S. Pat. No. 7,699,694 HILL incorporated herein, to reset the "DPR", i.e. to 50%, when a freshly shuffled deck is placed into the virtual CDS 445, to offset any advantage the game player may have acquired to enable his/her to overcome the "house advantage".

During the play of a Baccarat game round the system in accordance with the invention will give the remote player, by means of the drop-down Settings Menu, (not shown), which will appear when the remote players clicks on the Player Settings Button 405*c*, to instruct the online casino Baccarat program to deal the PLAYER and BANK hands Face-Up or Face-Down. If the Baccarat game is to be dealt Face-Up the online casino software will automatically display each card in the order that they were dealt from the shoe and place them Face-Up in the areas designated for each card comprising the PLAYER hand 455 and/or the BANK hand 460.

A software routine activates a color coded display 495 field at the end of each game round to visually, (in addition to the system's audio announcement of the outcome of the game round), alert the RP to the outcome of each completed game round. The color coded display 495 field will preferably turn White when the 1st card from the "particular shoe" 445*a* is removed from the CDS 445 for delivery to the PLAYER hand. When the Baccarat game round is completed; the color coded display 495 field will preferably illuminate GREEN when the Player hand wins the game round; and preferably BLUE when the BANK hand wins the game round; and preferably YELLOW when the score for the PLAYER and BANK hands TIE; and preferably the color coded display 495 field will remain illuminated, (displaying the color designated to identify the outcome of the last game round), until the first card of the next game round is removed from the CDS 445 for delivery to the PLAYER hand whereas the display will illuminate White.

The 1st Card and the 3rd Card delivered from a virtual or real CDS w/Scanner, during each Baccarat game round, are always delivered to the PLAYER hand. If the cards are dealt face-up, as they are when playing Mini Baccarat, the 1st Card will be positioned Face-Up over P1, and the 3rd Card will be positioned Face-Up over P2, whereas both P1 and P2 are located in the area 455 imprinted on the game table layout that is designated for the PLAYER hand. If the game rules requires a 3rd Card to be dealt to the PLAYER hand; it is positioned Face-Up over P3. Preferably, the online casino software will include "backend" software, knowing the value assigned to each card dealt from a Baccarat game deck, that will identify "The 1st Card Advantage" or Disadvantage that the PLAYER or BANK will have during the game round when the value of the 1st Card dealt to the PLAYER hand is known.

The 2nd Card and the 4th Card delivered from a virtual or real CDS w/Scanner, during each Baccarat game round, are always delivered to the BANK hand. If the cards are dealt face up as they are when playing Mini Baccarat, the 2nd Card will be positioned Face-Up over B1, and the 4th Card will be positioned Face-Up over B2, whereas both B1 and B2 are located in the area 460 imprinted on the game table layout that is designated for the BANK hand. If the game rules require a 3rd Card to be dealt to the BANK hand then it is positioned Face-Up over P3.

Using a randomly shuffled group of cards or Baccarat game deck that comprises eight standard fifty-two-card decks of playing cards, a Baccarat player theoretically is expected to win 44.62% of wagers bet on the Player Hands, 45.85% of wagers bet on the Bank Hands, and 9.53% of wagers bet on the Tie Hands. The Player hand has an advantage when the first card dealt to it has a card value of 6, 7, 8, or 9. When the first card dealt to the Player hand has a game card value of 1 (the Ace), 2, 3, 4, 5, or 10, (Jacks, Queens and Kings each have a game card value of 10), the Bank hand has an advantage. In each game round there is an overall probability of approximately 9.50% that the Player and Bank hands will tie. The probability of a Tie hand is greatest when the first card dealt to the Player hand is a 7, and a Tie hand is least probable when the first card dealt to the Player hand is a 10 valued card, etc.

It will be thus appreciated that if a Baccarat game player somehow gains knowledge of the value of the first game card to be dealt from the shoe before that card is removed from the shoe and delivered to the Player hand, that player can have a significant game advantage. For example, if it is known the first card will be a 6, 7, 8, 9, a high bet would be placed for the Player hand. If it is known the first card will be an ace, 2, 3, 4, 5, or 10-value, a high bet would be place for the Bank hand. If it is known the first card will be a 7, a high bet would be placed on the Player hand and/or a Tie bet may be made. Since very substantial wagering often occurs in Baccarat, secret knowledge of the first game card to be dealt is a powerful tool indeed.

Thus, there is a need to provide a host online casino software developer with a software routine, for online casino Baccarat games, that can provide a real-time mechanism for identifying and recording, preferably with 100% accuracy, the card value, card rank, card suit, and sequence in which each card removed from the system's shoe was delivered to the Player or Bank hands. Further, such software routine should provide a mechanism to track the wager type (Tie, Player, and/or Bank), and amount per wager made by each remote Baccarat player. Such system would enable the casino to identify in real time most cheating methods, and to calculate the probability that a Baccarat game player has prior knowledge of the top card of the deck before that card was removed from the shoe. The software routine could also provide 100% accurate rating information for remote Baccarat game players. Such information would allow a casino to more precisely calculate its Earning Potential and Complimentary Equivalency for each remote game player, and use that information to target RP's that may provide a high Earning Potential to a B&M casino, associated with the host OCO, should the RP accept an invitation from the B&M casino to visit and play in the B&M casino.

The designated area for the placement of wagers on the PLAYER hand 470 is identified by the circled letter "P", and the designated area for the placement of wagers on the TIE bet 470*a* are identified by the circled word "TIE"; and the designated area for the placement of wagers on the BANK hand 470*b* are identified by the circled letter "B".

The total amount of the remote player's cash bankroll, excluding any wagers in play, which is available for wagering is displayed in the CASH display field 465. The total amount of all winning bets, minus any commissions on winning BANK wagers, and the type of winning wager, "PLAYER, BANK or TIE BETS", are displayed in the RP Win field 465*a*. The amount won, minus any commissions, is added to the CASH display field 465; and if the RP's original bet is also removed from the winning PLAYER, BANK or TIE BET fields; the amount wagered will be restored to the CASH display field 465.

The RP will press the Deal Button 475*d* to initiate the delivery of the virtual game cards from the virtual CDS 445 to the game hands for the upcoming game round; whereas preferably the remote player will have made a wager on the PLAYER or BANK hand or a TIE bet prior to the commencement of the game round. However, if the host OCO is to follow the practices offered by real bricks-and-mortar casinos to their Baccarat players, (they will allow the game round to be dealt without a wager), who may request, and expect, a "free hand" to be dealt occasionally. To activate the Deal Button 475*d* when no wager has been made for the upcoming game round the RP will first press the "Sit Out" Button 475 followed by the Deal Button 475*d*.

Any bets made by the remote player prior to the commencement of the upcoming game round will be removed from play when the New Bet Button 475*c* is pressed. The original amount wagered on a winning PLAYER, BANK or TIE hand will remain on the winning betting field, (PLAYER 470, TIE 470*a*, or BANK 470*b*), and any amounts won, minus any commissions, will be added to the RP's CASH display field 465 if the Parlay Button 475*a* was not activated at the time the original bet was made; and/or if the RP has not activated the New Bet Button 475*c* prior to the removal of a first card from the virtual CDS 445 for delivery to the PLAYER hand.

The Parlay Button 475*a* when activated calls a drop down menu (not shown) that allows the remote player to instruct the system to parlay a winning wager one or more times, or until the winning parlay bets exceed the game table's "Maximum Bet" limit. In the event the parlay feature is activated and the original PLAYER, BANK or TIE wager reaches the "Maximum Bet" limit the next game round(s) the system will add any winning wagers, that exceed the "Maximum Bet" limit, to the CASH display field 465; and wager the game tables "Maximum Bet" for the upcoming game round; and continue to do so until the selected PLAYER or BANK hand parlay bet loses. During a game round the RP can press the Same Bet Button 475*b* to cancel the Parlay feature; whereas if the RP's selected betting field wins, the amount of the RP's wager for the next game round will be identical to the winning rounds original bet; and the bet for the upcoming game round will remain as a wager on the same betting field that produced the winning wager. At the end of each game round the RP can cancel the parlay feature and by pressing the New Bet Button 475*c*. The Deck Penetration Rule for the current card game being played by the remote player is always on display for each "particular shoe", or game deck, in the DP Rule display 485.

The remote player may use his computers "mouse", or other input device, to drag any one of the gaming chips 480 imprinted with a specific numeric value for placement as a wager on the (P)layer 470, (T)i.e. Bet 470*a* or (B)ank 470*b* hands. Each time the RP places a wager it will be deducted from amount displayed in the CASH display field 465. Any amount won by the RP at the completion of a game round will be displayed in the RP_Wins 465*a* field.

The system software will automatically change the value of the gaming chips 480 to accommodate any Minimum or Maximum Bet limits each RP may enter into the system by means of pressing the Bar Menus 405 Table Limits Button to call a drop down menu, (not shown), to allow each RP to enter his/her own Minimum and Maximum Bet limits for his/her current playing session; whereas those limits must be within a Minimum and Maximum Bet range pre-programmed into the online casino software by the OCSD.

When the RP is playing a virtual online casino card game, using game play data generated by the online casino's system RNG, or gaming data captured by one or more capture devices coupled to an Intelligent Game Table, that is unique to the remote player's client computer the RP may, at will, press the Shuffle Button 475*e* and the system RNG will present a freshly shuffled reconstituted game deck, based on the complete inventory of the "game deck", known by the system software to be in use at the virtual game table when the RP activates the Shuffle 475*e* button whereas the original inventory of the RNG shuffled virtual game deck and/or the original inventory of the "scanned" deck in use at a real "B&M" Casinos "IGT" at the time the inventory of the "pre-scanned" real game deck was uploaded to the RP client computer, and or the system's game server; and/or the inventory of a shuffled game deck placed into a CDS w/Scanner, coupled to the "B&M" Casino's "IGT" and the online casino system of the invention; whereas the output of the "B&M" Casino's CDS w/Scanner is uploaded to the RP's client computer and/or the systems game server for real-time, delayed or on-demand broadcast to one or more RP; whereas providing a unique means for the RP to instruct the system software to reshuffle the original inventory of the virtual game deck; and or the original inventory of a game deck captured in a real "B&M" Casino by one or more of the online gaming systems capture device meet the RP's need to interact with the play of the online casino game and to exercise some control over the play of the game selected for his/her play session.

Figure 4A:
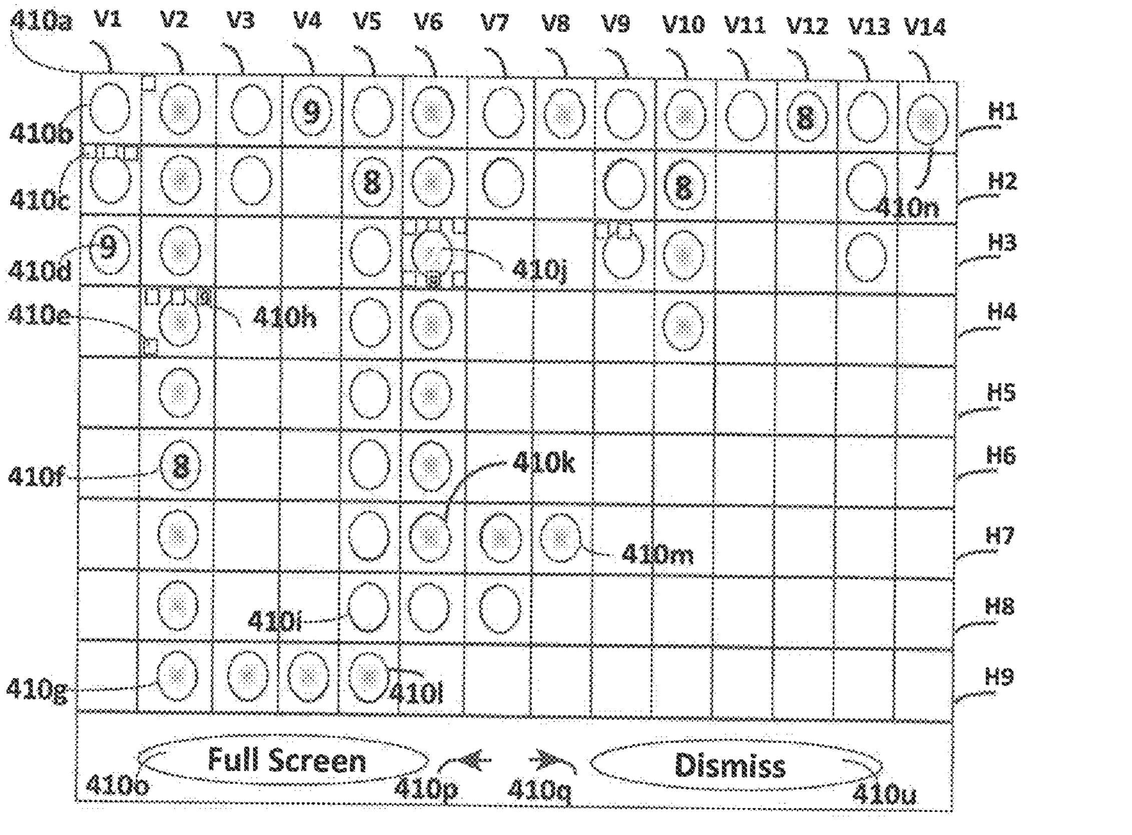
FIG. 4A is an illustration of a computer generated Scoreboard designed, in accordance with the invention, for the game of Baccarat.
Figure 4B:
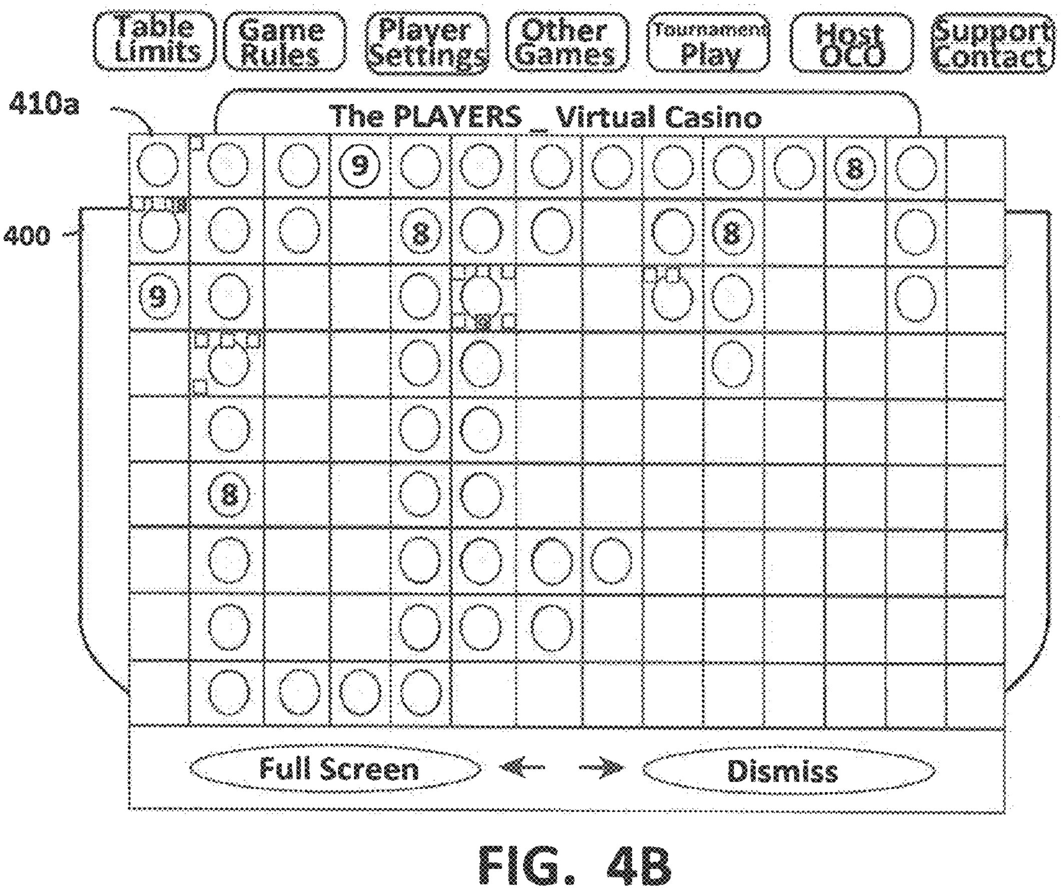
FIG. 4B is an illustration of a screen shot of a computer generated Baccarat game Scoreboard that overlays a virtual online casino Baccarat game table, in accordance with the invention.

FIG. 4A is an illustration of screen shot of a color coded computer Scoreboard 410*a* for online casino Baccarat games as disclosed in exemplary embodiments of the invention. The PLAYER hand wins the first game round dealt from a freshly shuffled, and/or, "cut" game deck placed in a CDS; whereas the system software displays a color coded, now blank, circle 410*b*, preferably BLUE, in the 1$^{st}$ horizontal column H1 of the Scoreboard representing that the first winning hand dealt from the CDS was the PLAYER hand. Thereafter, until the PLAYER hand loses a game round, the results will be displayed in the subsequent display fields comprising vertical column V1 of the Scoreboard. If the PLAYER hand wins the 2$^{nd}$ game round a 2$^{nd}$ BLUE circle will be displayed in the 2$^{nd}$ field of vertical column V1. If the 3$^{rd}$ game round ends in a TIE a small, now blank, box 410*c*, preferably Yellow, will be displayed within, the top left corner, of the 2$^{nd}$ field of vertical column V1. One (1) winning Player hand and three (3) TIE hands are recorded in the 2$^{nd}$ field of vertical column V1. After the 3$^{rd}$ TIE hand is recorded the PLAYER hand wins game round 6; whereas a 3$^{rd}$ BLUE circle is displayed in the 3$^{rd}$ display field of vertical column V1. The PLAYER won the game round with a "two-card natural 9" 410*d*; whereas the number nine 9 is displayed in the center of the BLUE circle. In Baccarat when the original two cards dealt to a PLAYER or BANK hand has a score of eight (8) or (9), it is called a "Natural Eight" or "Natural Nine", and the game round is over.

The BANK hand wins the $7^{th}$ game round. Each time a PLAYER or BANK hand loses a game round, ending his/her run and/or possession of the CDS if the game played is a Big-Baccarat game hosted by a real B&M casino) the winning PLAYER or BANK hand is displayed/recorded in the first open field of vertical column V2.

When the "PLAYER" run ends and the BANK hand wins the game round the system software displays a color coded, now shaded, circle, preferably PINK, in the first open field of vertical column V2. Thereafter, until the BANK hand loses a game round, the results will be sequentially displayed, in the subsequent display fields of the Scoreboard's vertical column V2.

The BANK hand's run consists of seventeen (17) game rounds; including twelve winning BANK hands, (one a "Natural Eight" 410*f*) and five (5) TIE hands, (including a run four (4) TIE hands 410*e*, with one "Natural Nine" 410*h*).

The BANK hand wins the fourteenth, ($14^{th}$) game round 410*g* recorded in the last field of the Scoreboard's vertical column V2. The current BANK run will continue another three rounds before the BANK hand loses. All display fields to the right of vertical column V2 are clear. Therefore the additional BANK wins will be displayed to the right of the last BANK win 410*g* recorded in vertical column V2 . . . in the last display field of vertical columns V3, V4 and V5 in horizontal column H9.

A remarkable PLAYER run is displayed/recorded in vertical column V5. It consists of ten, (10), consecutive winning PLAYER hands, including one hand winning with a "Natural Eight". The eighth winning PLAYER hand 410*i* is recorded in vertical column V5, horizontal column H8. The winning BANK run initially recorded in vertical column V2, filled all nine (9) of the display fields of V2, and then continuing to be recorded . . . in the last display field of vertical columns V3, V4 and V5 in horizontal column H9 prevents the ninth PLAYER win from being recorded in vertical column V5. All display fields to the right of vertical column V5 are clear. Therefore, the additional PLAYER wins will be displayed/recorded to the right of the last PLAYER win 410*i* recorded in vertical column V5 . . . continuing the display/recording of the PLAYER run in vertical columns V6 and V7 display fields positioned in horizontal column H8.

Another BANK run is displayed/recorded in vertical column V6. It consists of sixteen game rounds; including nine (9) winning BANK hands and seven (7) TIE hands 410*j* . . . one TIE hand is a "Natural Eight. The design of the Scoreboard allows a maximum of six (6) YELLOW Tie boxes to be displayed in one display field. If there are more than six (6) consecutive TIE hands during a PLAYER or BANK run they will be displayed by displaying the number of the TIE hand, preferably in YELLOW, in the center of the display 410*j* recording a PLAYER or BANK win.

The seventh winning BANK hand 410*k* is recorded in vertical column V6, and horizontal column H7. The PLAYER run previously recorded in vertical column V5 and horizontal column H8, utilizes the display fields of vertical columns V6 and V7, within horizontal column H8. The winning BANK hand 410*k* is the last to be recorded for the current BANK run initiated in vertical column V6 . . . the two remaining winning BANK hands recorded for the current BANK run must be recorded in vertical columns V7 and V8 410*m* within horizontal column H7.

Preferably, vertical column V14 will record the last run 410*n* for the RP's to view; whereas the maximum number of vertical columns (14) and horizontal columns (9) will be available for viewing by the RP.

Approximately, seventy-five (75) Baccarat game rounds can be dealt from a typical eight-deck shoe when the Deck Penetration Rule is 97%. The exemplary PLAYER and BANK runs of the current Scoreboard 410*a* do occur, but rarely. In the event the PLAYER and BANK runs dealt from a particular shoe exceeds the number of vertical columns (14) V14 displayed on the Scoreboard 410*a*; the 1st column V1 will recede to the left, out of the remote player's sight. Therefore, depending on the number of runs that occur for each particular shoe, the ("RPUI") allows the RP's to use the arrow 410*p* to drag the Scoreboard to the left, or the arrow 410*q* to drag the Scoreboard to the right to view additional display fields in the event one plays a particular shoe that may result in (i.e. 50 runs) being displayed/recorded on the Scoreboard 410*a*.

The system software is programmed to allow the RP to use the Full Screen Button 410*o* to view, without limitation, the Scoreboard 410*a* during the play of the game; and or to call the Scoreboard for the just completed particular shoe while a new shoe is being shuffled. The Scoreboard 410*a* can be dismissed by pressing the Dismiss Button 410*u*.

FIG. 4B is an illustration of a screen shot of a computer generated Scoreboard 410*a* for the game of Baccarat, overlaying a virtual Baccarat game table top 400 when called, depicting fundamental elements disclosed in exemplary embodiments of the invention.

Figure 4C:
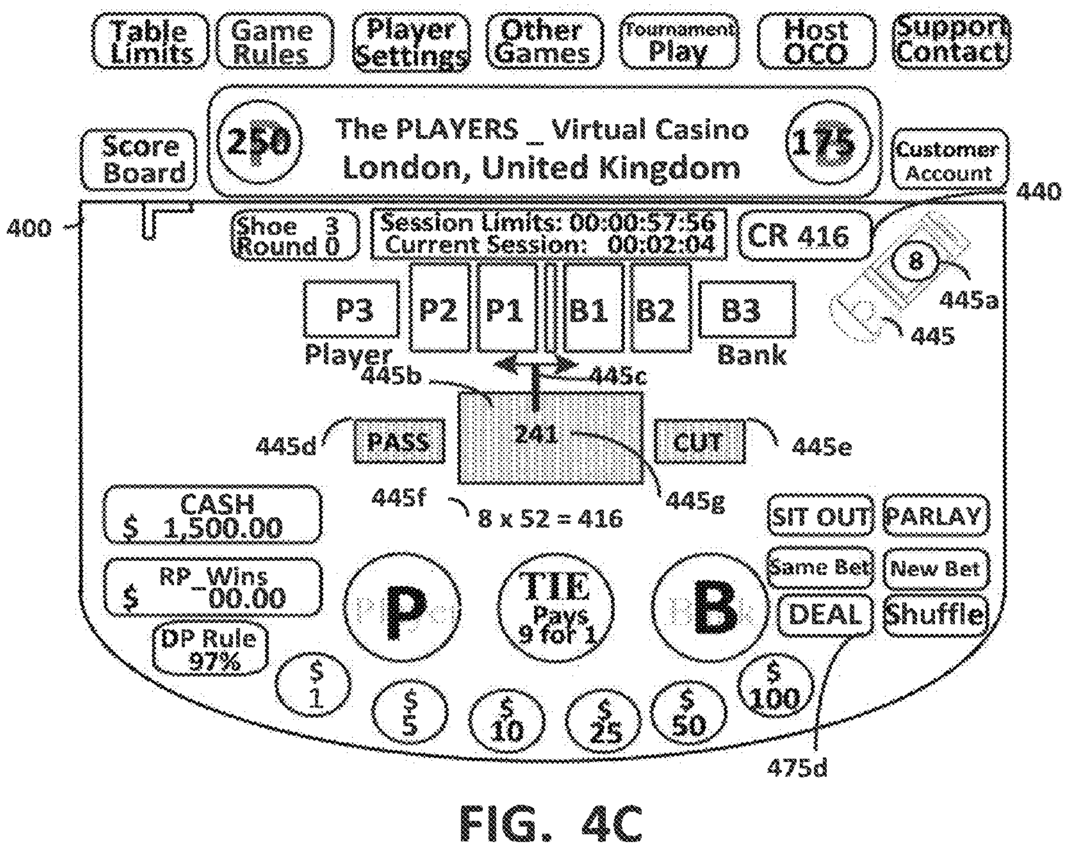
FIG. 4C is an illustration of a screen shot of virtual Mini-Baccarat game, depicting fundamental elements disclosed in exemplary embodiments of the invention that provide a means for a Remote Player to "cut" a virtual game deck.

FIG. 4C is an illustration of a screen shot of virtual Mini-Baccarat game table 400, depicting fundamental elements disclosed in exemplary embodiments of the invention that provide a means for a Remote Player to "cut" the game deck.

The illustrated virtual game table top 400 of FIG. 4*c* may also represent an overhead view of a real Mini or Midi-Baccarat table, located in a real B&M casino, whereas real people are engaged the play of a real Baccarat game; and the play of the game is being captured by one or more sensory and/or game data devices and recorded for broadcast, by wired or wireless means, during real-time, delayed, or on-demand to one or more remote players engaged in the play the game using a OCO's online casino website using the system of the invention; and whereas the RPUI of the invention will overlay the captured video image of the game table top 400 and layout. A software routine is provided that will allow each RP the opportunity to "cut" the game deck when playing a virtual or on-demand casino card game online.

The system's RNG can be used to allow any game deck used in any online casino card game to be cut by the remote players. (i.e. 1) a game deck generated by the system's RNG; or 2) a Pre-Scanned, Pre-Shuffled, and Pre-Cut game deck uploaded to RP's CPU.) The RP can accept the inventory of the game deck as is, or he/she may cut it.

The concept behind a Random Number generator (RNG) for casino games is a simple operation; every aspect of the game routine is assigned a number value. The RNG then produces a completely random number, calculates it to match the appropriate values for the game being played, and the game will then display a card or symbol respectively. For example, in a game of blackjack, a regular deck of playing cards has 52 cards. A number value between 1 and 52 is assigned for each of the 52 cards, (or different multiples should you choose to use more than one deck), the software or hardware RNG chooses random numbers, and random cards come out of the deck with every separate deal.

In this presentation we start with delineated aspects first as mathematic representations which run in the background and are unseen by the player and secondly as graphical representations that run in the foreground visible to the player.

The software routine that runs in the background has a written coded sequence that has a main routine with software calls or sub-routines for each of the variables to be added. The system of the invention includes a stored library of ordered decks (where the computer can "see" each of the cards in the order that they are currently stored in that deck image) that have enhanced digital representations for a single ("S52CD") deck to any number of ("S52CD") decks that comprise a "game deck". In some embodiments, a main routine with multiple sub routines that are initiated by the program, programmer or in some cases by the actions of the RP are included in the system software. The main routine might call for a pull of an image from this image database or library, requesting a stored deck image of eight ("S52CD") decks or one file with 416 cards. A secondary routine might then call for a file to be reordered and presented to the game board. A tertiary routine might be written to offer the user the choice to accept, deny, deal or pass the cut of the cards. This choice often called the cut, would be to divide a deck of cards into portions, in order to arrange their presentation or to change the order of cards to be dealt to the other players. Should the player choose to accept the deal of the cards the RNG could then reorder the deck with a predetermined variable or utilize the RNG itself. Other routines could be written into the software and could be utilized by the menu driven choices of the program itself. All of these actions are transparent to the player and all the player might see for this portion of his/her involvement would be a welcome splash screen, followed by a set of options for what game they wish to play and lastly what action they would like to do in their selection of the deal.

A graphical representation can be provided to the player should he or she select the option of cutting the deck prior to the deck being dealt. A cut card has no value or makings and usually is a plain red or yellow card used to separate the cards comprising the game deck to further randomize the card order presented to the players. A non-descript representation of a deck of cards could be presented to the player and utilizing his mouse he could move his cursor onto the deck representation and while depressing his left mouse key or keyboard (on many keyboards, number 6 key of the numeric keypad moves the mouse pointer left, number 4 key moves the mouse pointer right, number 2 key moves it down, number 8 key moves the mouse pointer up, number 5 and + key serve as right click while the number 0 key works as left mouse click) could raise, lower or preposition the cursor onto the deck. Once positioned the player could release or press the right mouse button. This action would be programmed to cause that position on the deck representation to turn that position red or another color as if to appear that the cut card had been inserted there. Another option that might be offered instead of a right mouse click could be a "double" left click which could be made to release to a single mouse click on the deck.

Once that step is completed another player transparent subroutine would take the order of the cards that were imaged and reposition the order reflecting the new cut card activity. As an example, once the deck is selected the visual library image would be presented or offered to the program. Once a cut card has been selected and inserted, the ordered library image becomes separated at the cut site and forms two select arrangements of the ordered library image, above the cut card; segment (A) and below the cut card, segment (B). Then the deck image is reconstituted still in the order of the two halves and by moving the portion of the deck that was below the cut card or segment (B) on top of the original top portion of the deck or segment (A). This action would then place the cut card on the bottom of the deck and indicate that the cut of the shuffled deck shuffle has been accomplished.

At such time that the online casino's software identifies that the game deck in use, (without limitation, preferably at a virtual or pre-recorded on-demand casino Baccarat game table), has been shuffled, prior to the system or a remote player initiating the play of the game (by the system software automatically, or by the RP activating the "Deal Button" 475*d*), a graphic image of the "freshly shuffled" game deck 445*b* will be displayed along with a "Pass Button" 445*d*, and a "Cut Button" 445*e* and a "Game Deck Inventory Display" ("GDID") field 445*f*.

If the RP chooses to not cut the game deck 445*d*, then he or she will click on the PASS Button 445*d* and the "Cut Images" (445*b*, 445*c*, 445*d*, 445*e*, 445*f* and 445*g*) will disappear; whereas they will be instantly replaced by a graphic image of a "hand" moving and placing the hand held game deck, (not shown) within the CDS 445. Preferably a graphic (not shown) will appear and remove the "Cut Card"445*c* and use it to cover the bottom card of the game deck. The automatic or manual activation of the dealing of the first game round will begin. If the RP chooses to cut the game deck 445*d*; he/she will use his/her CPU input device to activate the CUT Button 445*e*. The "Cut Card" 445*c* will be displayed inserted within the game deck 445*b*, (which may be visualized on a display as being held by the computer generated hand(s) graphic, for example), and positioned on its side on the game table top 400. The RP may then use his/her CPU's mouse or other input device to drag the "Cut Card" 445*c*, Left or Right; and as the "Cut Card" is being moved left or right the system will identify its position over the inventory of the game deck by displaying a number 445*g*, (i.e. 241), representing that the "Cut Card" will be inserted between cards 240 and 241, (241 cards from the top of the game deck and 175 cards from the bottom of the game deck), when released by the RP; whereas the top portion of the "cut" game deck will contain 241 cards when repositioned to the bottom of the "cut" and "restacked" game deck. When the "Cut Card" card is released by the RP, the "Cut Images" 445*d*, 445*e*, 445*f* and 445*g* will no longer be displayed.

Instantly, preferably, a 2$^{nd}$ animated dealer "hand" graphic, (not shown), will appear and push the "Cut Card"445*c* into the hand held game deck; and remove that portion of the "cut" deck that is positioned below the "cut" card and restack it on top of the top portion of the "cut" game deck. During that process the system software uses the "cut" card, and/or other means, to see that none of the cards positioned on the bottom of any portion of the "cut" deck is exposed to any RP.

The Game Deck Inventory Display" ("GDID") field 445*f* is displayed to make the composition of the game deck 445*b* transparent to the RP's. (i.e., the game deck is comprised of eight (8) standard 52 card decks; whereas the total number of cards comprising the game deck 445*a* when placed in the virtual CDS 445 is 416.)

Figure 4D:
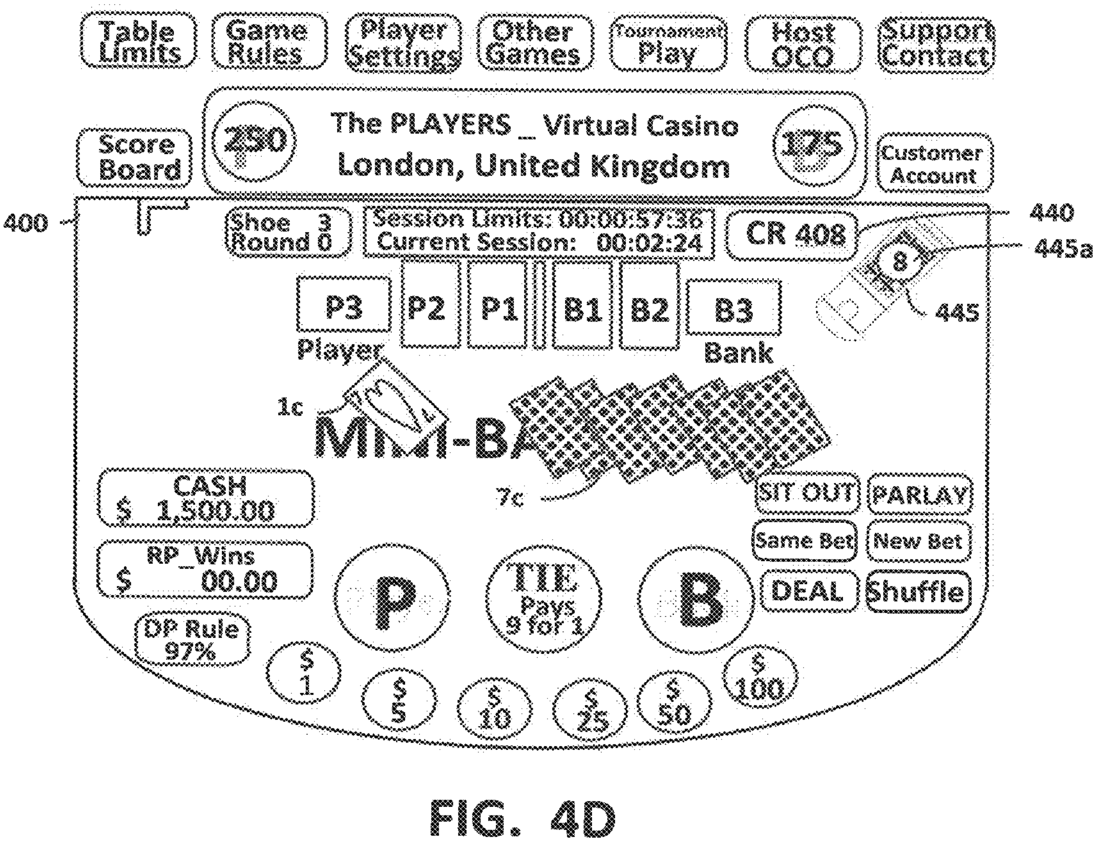
FIG. 4D is an illustration of a screen shot of virtual Mini-Baccarat game, depicting a first action taken by the system, after the game deck has been positioned in the system's virtual Card Dispensing Shoe in accordance with the invention.

FIG. 4D is an illustration of a screen shot of virtual Mini-Baccarat game table 400, depicting fundamental elements disclosed in exemplary embodiments of the invention which includes a first action taken by the system, after the game deck has been positioned in the system's virtual Card Dispensing Shoe.

The system includes one or more software routines, programmed into the systems ("RPUI") that graphically attempts to duplicate one or more steps taken by a live dealer dealing a real Baccarat game to live people engaged in the play of a Baccarat game, hosted by a real B&M casino; whereas the objective is to make the RP's online gaming experience more realistic and entertaining.

When a freshly shuffled game deck 445*a*, comprised of eight standard 52-card decks, or four-hundred and sixteen cards, is placed into the CDS the system software duplicates the first action taken by a live dealer dealing a Baccarat game in a real B&M casino.

The system software, according to traditional Baccarat game rules and/or B&M casino procedures pre-programmed into the system, removes the top card of the game deck 445*a* carried by the CDS 445 and places it Face-Up 1*c* on the game table top's 400 layout. The faced-up card 1*c* Baccarat game value is seven (7). Therefore, according to traditional Baccarat game rules and/or procedures, the system software removes an additional seven (7) cards 7*c*, Face-Down, from the CDS 445 and places the seven (7) cards 7*c*, Face-Down, on the game table tops layout; and then proceeds to place card 1*c*, Face-Down, with Face-Down cards 7*c* and then places the eight (8) cards, Face-Down, into the discard rack 425.

To the benefit of the RP's; the system software is also programmed to display in the Cards Remaining Display 440 the number of cards remaining (408) in the game deck 445*a* displayed in the virtual CDS 445.

Figure 4E:
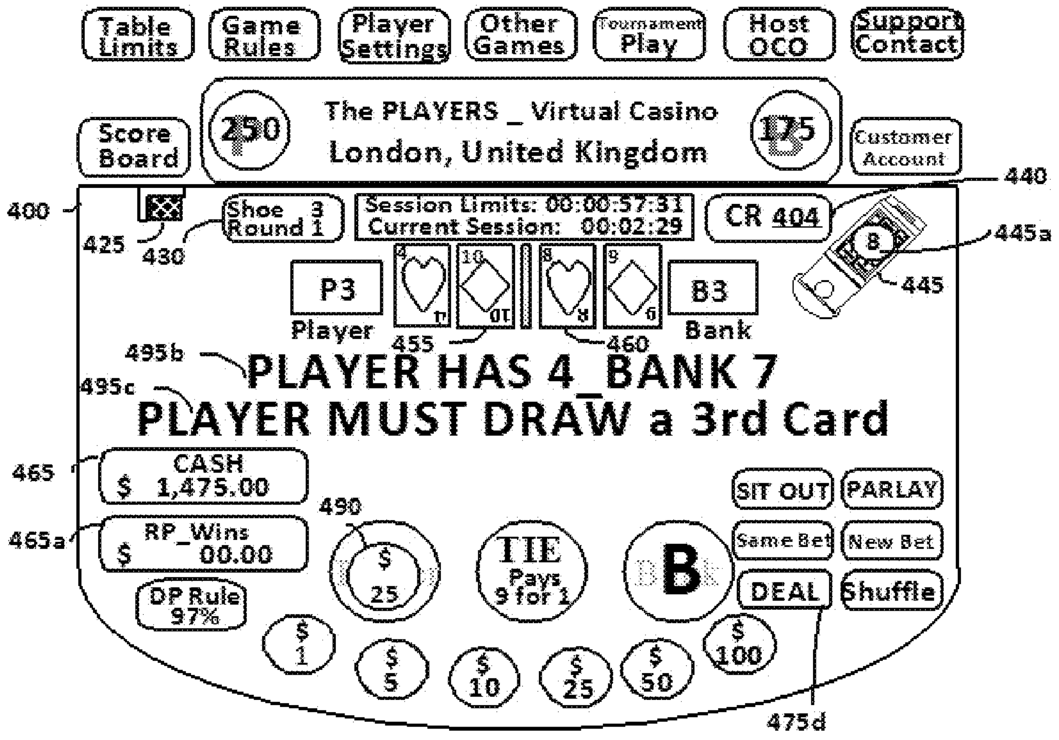
FIG. 4E is an illustration of a screen shot of virtual Mini-Baccarat game, depicting fundamental elements relative to the play of a Baccarat game round as disclosed in exemplary embodiments of the invention.

FIG. 4E is an illustration of a screen shot of virtual Mini-Baccarat game table 400, depicting fundamental elements relative to the play of a Baccarat game round as disclosed in exemplary embodiments of the invention.

After the RP has made a wager 490; the RP activates the DEAL Button 475*d* and the system software then proceeds to deal the PLAYER hand 455 and BANK hand 460, face-up, from the virtual game deck 445*a* displayed in the virtual CDS 445, identified by the system as Shoe 3 Round 1 430. (Shoe 3 is the 3rd particular shoe that a particular RP has made one or more wagers on the PLAYER, BANK or TIE bets during his/her current play session.)

The 1st and 3rd cards removed from the CDS 445 are delivered, Face-Up, to the PLAYER hand 455; and the 2nd and 4th cards removed from the CDS are delivered, Face-Up, to the BANK hand 460.

At this point in the current game the total number of cards removed from virtual game deck 445*a*, is twelve (12). (The eight (8) burn cards placed in the Discard Rack 425, face down, and the four (4) cards initially dealt to the PLAYER and BANK hands, face up, in Round 1). The Cards Remaining Display 440 informs the RP that there are 404 cards remaining in the virtual game deck 445*a*.

The online gaming system is programmed to announce and/or display the scores of the PLAYER and BANK hands 495*b*; and then announces and/or displays the next action to be taken 495*c* on the PLAYER hand according to the game rules pre-programmed into the system software.

The CASH Bankroll Display 465 displays a running total of the amount of cash available to the RP for wagering, less the amount of any wagers 490 which are held in trust by the system until the wager is removed by the RP, or there is a final settlement of the current game round and all wagers are removed from the PLAYER, BANK and TIE Bet betting fields. If the RP places a winning wager for the current game round, the amount won, less any commissions payable to the host OCO, is displayed in the RP's Win field 465*a*.

Figure 4F:
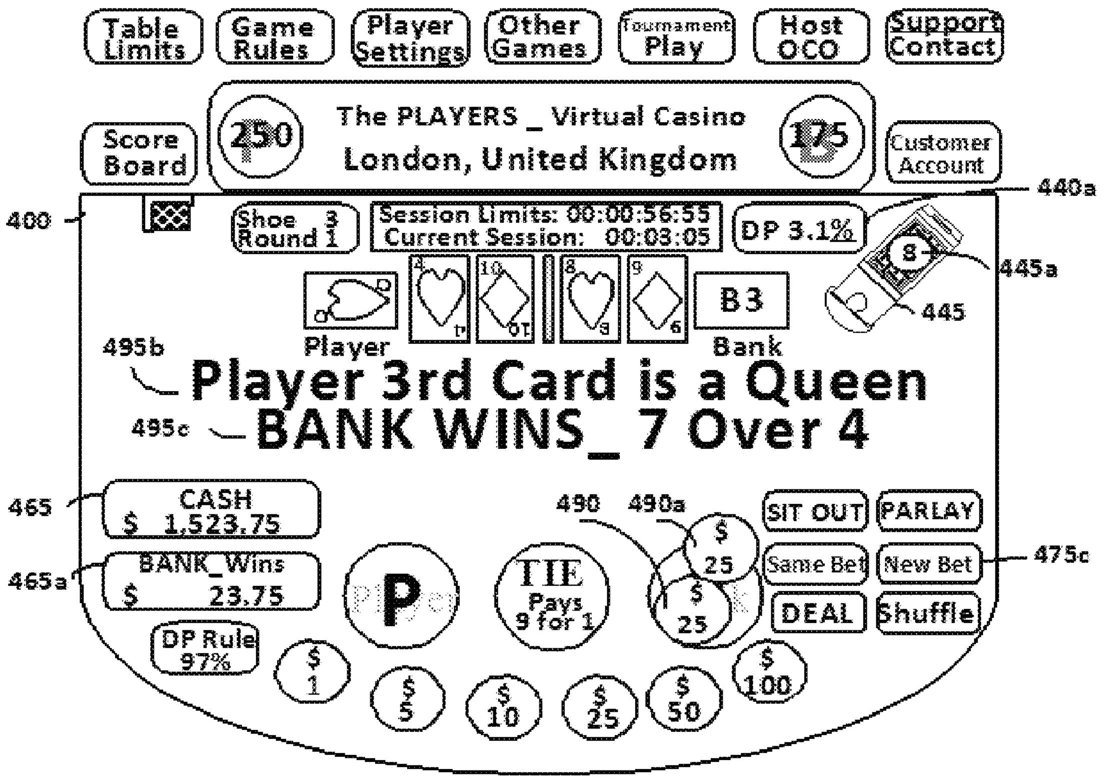
FIG. 4F is an illustration of a screen shot of virtual Mini-Baccarat game, depicting fundamental elements related to the Baccarat game rules disclosed in exemplary embodiments of the invention

FIG. 4F is an illustration of a screen shot of virtual Mini-Baccarat game table 400, depicting fundamental elements related to the Baccarat game rules disclosed in exemplary embodiments of the invention in which a round (round 1) of Shoe 3 continues. The online gaming system automatically deals the required 3rd card, a Queen, for the PLAYER hand which is displayed horizontally in the area designated for the PLAYER hand; and announces and/or displays 495*b* that the 3rd Card dealt to the PLAYER hand is a Queen; and therefore, according to Baccarat game rules the BANK hand must stand. The system then displays and/or announces the results of the game round; "BANK Wins_7 over 4" 495*c*.

The RP wagered $25.00 490 on the winning BANK hand and was paid $25.00 490*a*. The system collected a 0.05% commission, ($1.25), from the winning BANK wager; whereas the system displays the actual amount won, $23.75, by the RP placing the winning BANK wager, in the RP's Win field 465*a*. The remote player presses the New Bet Button 475*c*; whereas the systems clears all bets from the BANK betting field, (not shown), and adds the amount the RP actually won, $23.75, on the current game round to the amount displayed in the RP's CASH Bankroll 465 Display. The system software also adds, removes from trust, the full amount of the RP wagered, $25, on the BANK hand to the RP's CASH Bankroll Display 465; now displaying the RP's available Cash Bankroll as $1,523.75. The Deck Penetration Display 440*a* displays the percentage of cards, (comprising the original inventory of 416 card game deck), that have been removed from the virtual CDS 445 at the end of Round 1.

Figure 4G:
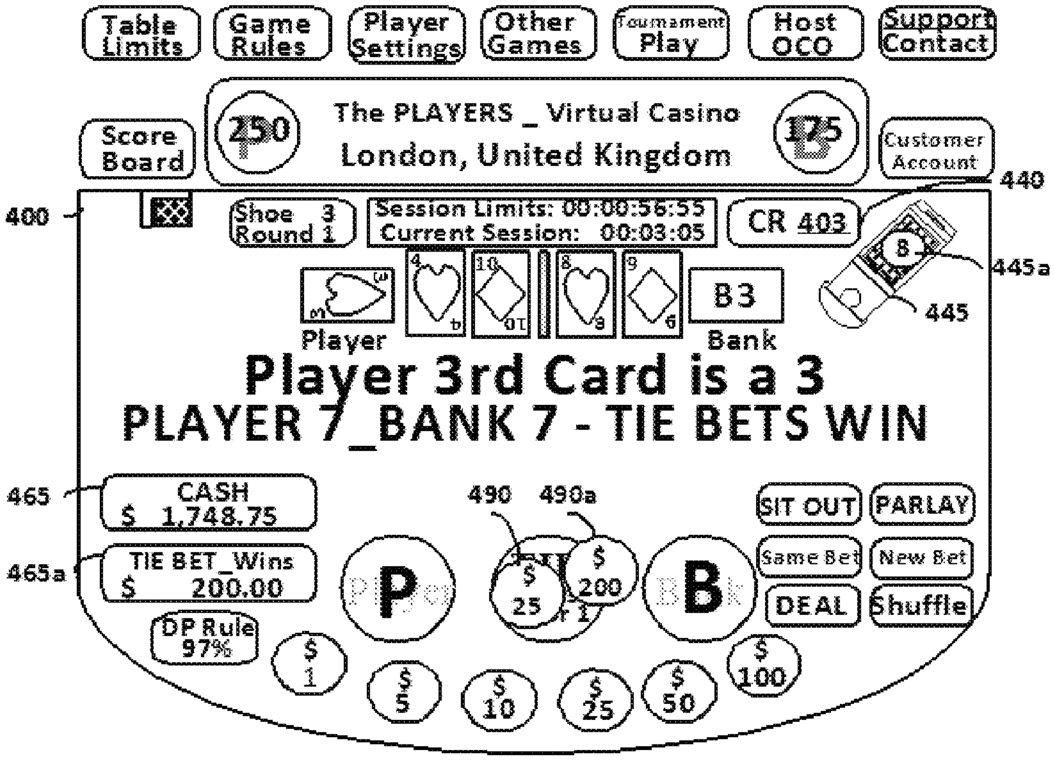
FIG. 4G is an illustration of a screen shot of virtual Mini-Baccarat game, depicting fundamental elements related to the settlement of a Baccarat game round as disclosed in exemplary embodiments of the invention

FIG. 4G is another illustration of a screen shot of virtual Mini-Baccarat game table 400, depicting fundamental elements related to the settlement of a Baccarat game round as disclosed in exemplary embodiments of the invention. The 3rd Card displayed for the PLAYER hand is now a three (3), whereas the scores of the game hands for the current round end in a TIE. The RP wagered $25.00 490 on the TIE bet. A winning TIE bet pays (9 for 1); and the RP's winning TIE bet is paid $200.00 490*a* as shown in the RP's Win field 465*a*. The remote player presses the New Bet Button 475*c*; whereas the systems clears all bets from the TIE betting field, (not shown), and restores the amount wagered on the TIE bet, $25.00, to the RP's CASH Display field 465. The Cards Remaining Display 440 displays the number of cards 403 remaining in the now depleted game deck 445*a* displayed in the virtual CDS 445 at the end of Round 1.

Figure 4H:
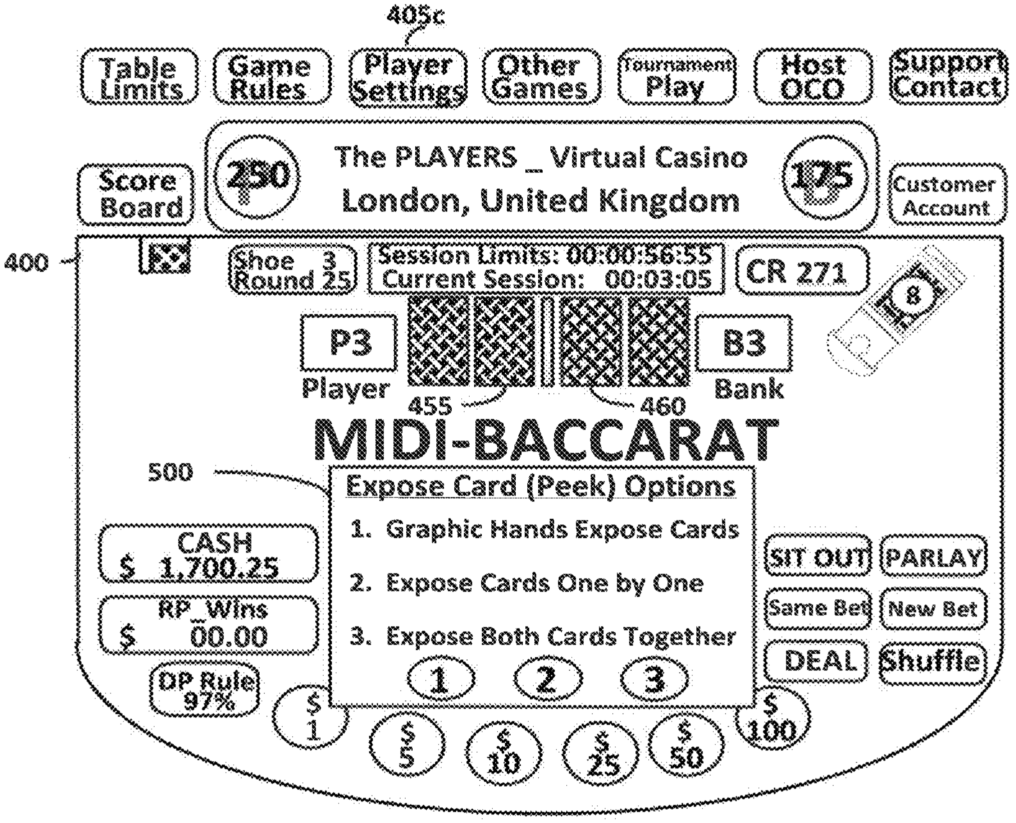
FIG. 4H is an illustration of a screen shot of virtual Midi-Baccarat game, depicting fundamental elements related to the options the system's ("RPUI") provides for the RP to Face-Up the PLAYER and BANK hands as disclosed in exemplary embodiments of the invention

FIG. 4H is an illustration of a screen shot of virtual Midi-Baccarat game table 400, depicting fundamental elements related to the options the system's ("RPUI") provides for the RP to Face-Up the PLAYER and BANK hands as disclosed in exemplary embodiments of the invention. The current screen shows, without limitation, one or more options available to the RP's, when playing a virtual online casino Midi-Baccarat game; whereas, traditionally, when playing a Midi-Baccarat, hosted by a real B&M casino, it is dealt by a solitary Baccarat dealer. For example; when playing Midi-Baccarat at a real game table located in a real "B&M" Casino; the game deck is typically comprised of eight (8) ("S52CD") s. During the play of a Baccarat game round, the cards are delivered one-by-one, Face-Down, from a CDS by the game dealer, who places the cards comprising the PLAYER and BANK hands, Face-Down, in an area imprinted on the game table's 400 layout designated for the PLAYER Hand 455 and the BANK hand 460; or the game dealer may only place the PLAYER hand, Face-Down, in the area designated for the PLAYER hand 455; and tuck the BANK hand, Face-Down, beneath the inside edge of the mouth of the CDS, (not shown), closest to the dealer. The live Midi-Baccarat game dealer may Face-Up the Face-Down PLAYER hand positioned in it designated area 455 and the Face-Down BANK hand positioned in its designated area 460 and then the game dealer may Face-Up the PLAYER and BANK hands and call the score of the PLAYER hand. The game dealer will repeat the same process for the BANK hand. If the Baccarat game's 3rd Card Rule requires the PLAYER or BANK hand, in turn, to draw a 3rd Card, the dealer will do so and announce the PLAYER and BANK hands final score and then proceed with the settlement of the wagers for the current game round. Preferably the Midi-Baccarat game dealer will remove the cards comprising the PLAYER and BANK hands, one-by-one from a "CDS" and position the cards Face-Down in their designated areas imprinted on the game table top 400 layout. The game dealer will then toss the PLAYER hand to one of the Baccarat game PLAYERS Face-Down. The customer receiving the Face-Down PLAYER hand will "Peek" at and/or expose the PLAYER hand and then slide it back to the live game dealer who will place it Face-Up in the area designated for the PLAYER hand 455. The dealer will then pick up the faced-down BANK hand from the area designated for the BANK hand 460, (or remove it Face-Down from beneath the mouth of the CDS), and slide it Face-Down to, preferably, a Midi-Baccarat game player who has placed a bet on the BANK hand. The customer receiving the Face-Down BANK will "Peek" at and/or expose the BANK hand and slide it, Face-Up, back to the live game dealer who will then place it Face-Up in the area designated for the BANK hand 460. The dealer will then announce the scores of the two Faced-Up PLAYER and BANK Hands.

In the event, according to Baccarat game rules, a 3$^{rd}$ Card must be delivered to the PLAYER hand; the live game dealer will remove the 3$^{rd}$ Card from the CDS and slide it directly, Face-Down, to the customer selected to play, (expose), the PLAYER hand. Once the 3$^{rd}$ Card for the PLAYER hand is faced-up; the dealer will announce the scores of the PLAYER and BANK hands. If the 3$^{rd}$ Card rule requires the BANK hand to draw a 3$^{rd}$ Card, preferably, the dealer will draw a card from the CDS and deliver it, Face-Up, to the BANK hand. The dealer will then announce the final scores of the PLAYER and BANK hands. The play of the game round is now complete.

FIG. 4H The current screen shot provides a first example of how the software generating the ("RPUI") of the current invention can provide one or more means for each remote player, playing a Midi or Big-Baccarat game online, can and will be able to interact with the play of the game and enjoy features of the game previously limited to Midi and Big-Baccarat players actively engaged in the play of a real Midi or Big-Baccarat game played by real people in a real "B&M" casino during real-time.

Without limitation, the system's ("RPUI") provides the RP's with one or more options that he/she may select to peek at and expose the PLAYER or BANK hand that the RP has placed a wager on for the upcoming Baccarat game round when playing a virtual Midi or Big-Baccarat game online; and/or when playing a Midi or Big Baccarat game, played by real people, at a real Baccarat game table located in a real, legally licensed and regulated "B&M" Casino; where the Online Gaming System (FIG. 1 30) capture devices, in accordance with the current invention, are used by the host "B&M" Casino and/or an associated "OCO" to capture the sensory game play data and/or game and/or gaming data from the play of the live Baccarat game hosted by the "B&M" Casino for real-time, delayed or on-demand broadcast, by wired or wireless means; and whereas the ("RPUI"), in accordance with the current invention, is included in the system's online casino Baccarat game modules, thereby providing one or more methods for the RPs to expose the graphic images of the Face-Down cards delivered to one or both of the PLAYER and BANK hand during the play of each game round.

For example, the RP may activate the Player Setting 405*c* Button to call the drop-down-menu that offers each RP the option to select one of three (3) options 500 that the system software provides the RP game player(s) to "Peek" at, (expose) any cards dealt to the PLAYER or BANK hands Face-Down during the play of each game round.

Preferably each RP will only be able to "Peek" at, (expose), the Face-Down cards of the PLAYER or BANK hand that the RP has placed a wager for the upcoming game round. In the event the RP places a wager on the TIE Bet, and does not place a wager on either the PLAYER or BANK hands, preferably, the system will allow the RP to expose the PLAYER hand during the play of the game round in which the RP has only placed a "TIE Bet", for the upcoming game round. The system software will automatically expose the PLAYER or BANK hand, according to typical Baccarat game rules.

Figure 4I:
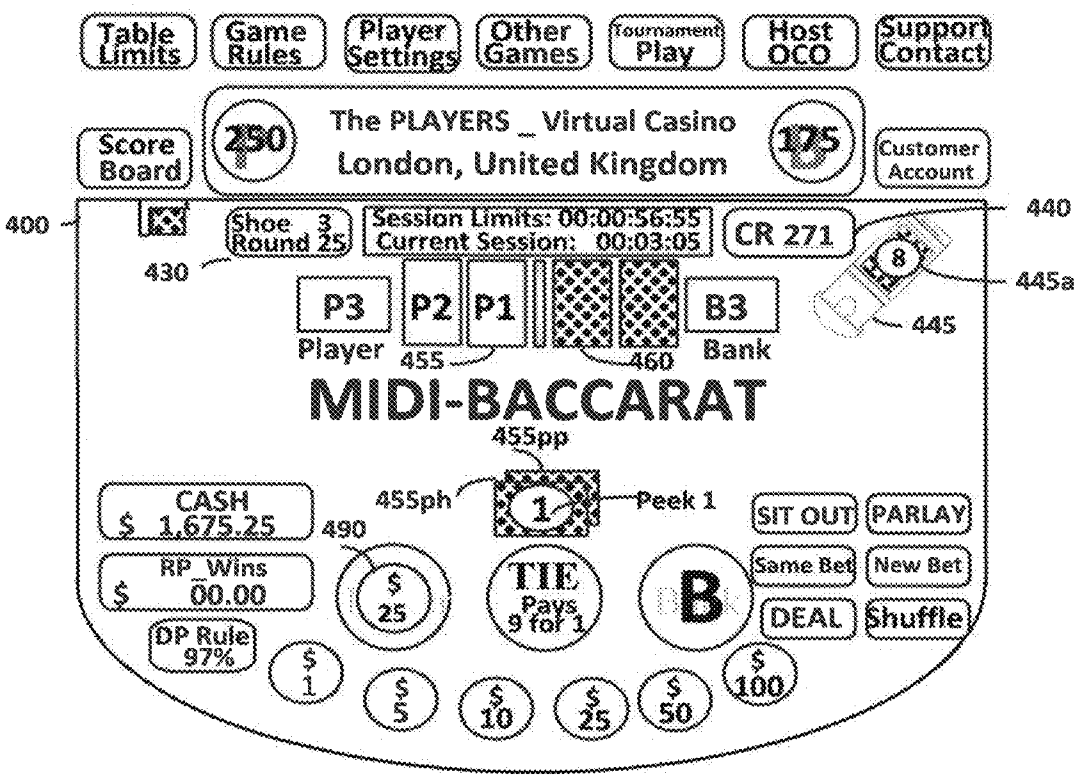
FIG. 4I is an illustration of a screen shot of virtual Midi-Baccarat game, depicting fundamental elements related to the delivery of the PLAYER hand to the "Peek Position" as disclosed in exemplary embodiments of the invention

If the RP has placed a wager on the PLAYER hand, for the upcoming game round, a system software routine will automatically deliver and display the PLAYER hand, Face-Down in the "Peek Position" (FIG. 4I 455*pp*), on the RP's CPU device's monitor; and the monitors of all other RPs, coupled to the system, who have also selected the identical online Baccarat game and/or game table for his/her current play session and placed a wager on the PLAYER hand for the upcoming game round; whereas the system software routine will, simultaneously, deliver and display the BANK hand face-down on the RP's CPU device's monitor, in the designated area 460 for the placement of the BANK hand. If the RP has only placed a wager on TIE BET for the upcoming game round, the system software, preferably, will be programmed to deliver the PLAYER hand as if the RP's, who have only placed a TIE BET for the upcoming game round, have also placed a wager on the PLAYER hand.

If the RP has placed a wagered on the BANK hand for the upcoming game round, a system software routine will automatically deliver and display the BANK hand, Face-Down in the "Peek Position" (FIG. 4M 460*bh*), on the RP's CPU device's monitor; and the monitors of all other RPs, coupled to the system, who have also selected the identical online Baccarat game and/or game table for his/her current play session and placed a wager on the BANK hand for the upcoming game round; whereas the system software routine will, simultaneously, deliver and display the PLAYER hand, Face-Up, in the designated area 455 for the PLAYER hand.

Figure 6:
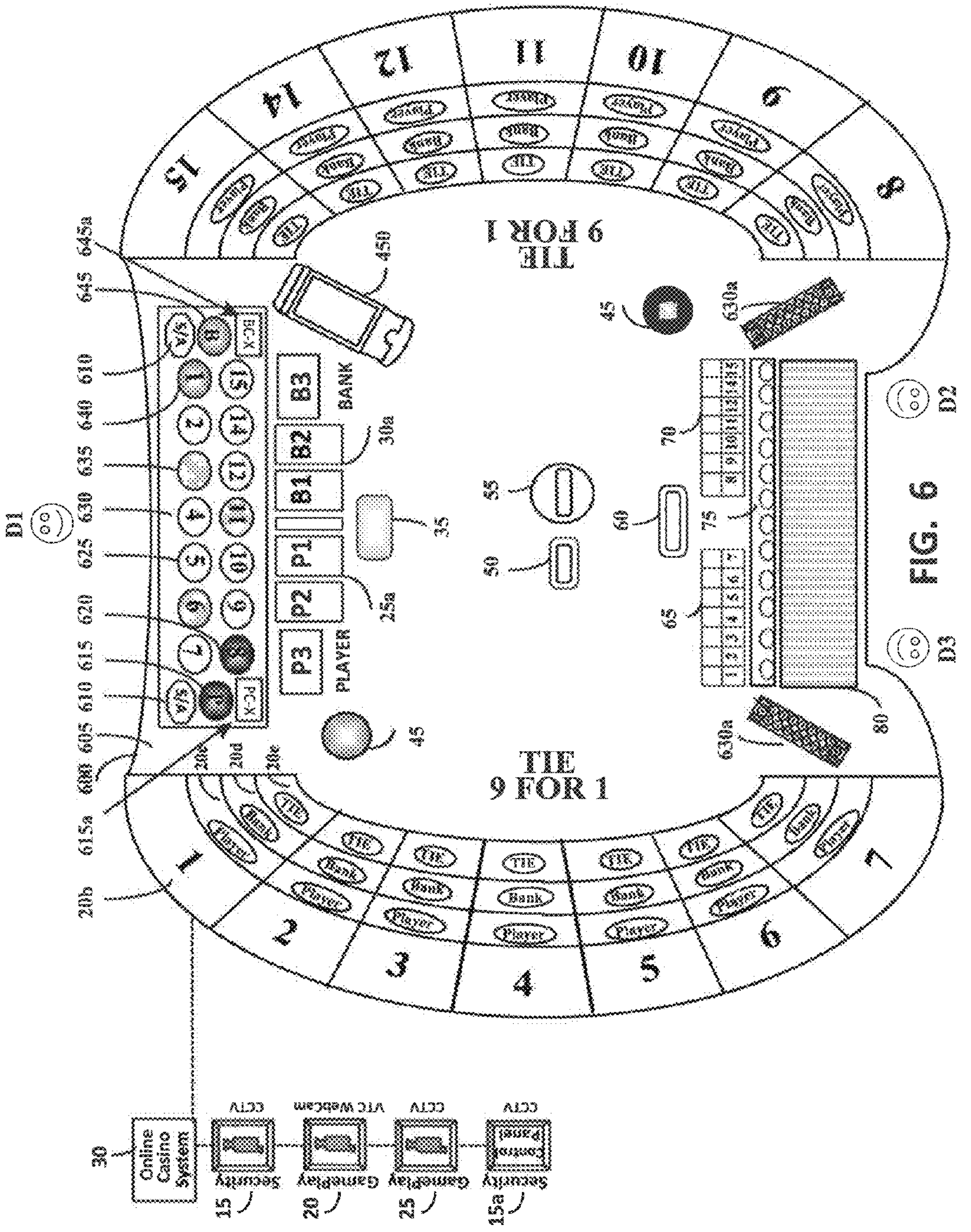
FIG. 6 is a top view of an Intelligent Big-Baccarat Game Table housing an embedded keyboard, and other capture devices, designed to support various aspects related to the capturing and monitoring the real-time play of a Midi-Baccarat or Big-Baccarat game in accordance with the invention.
Figure 6A:
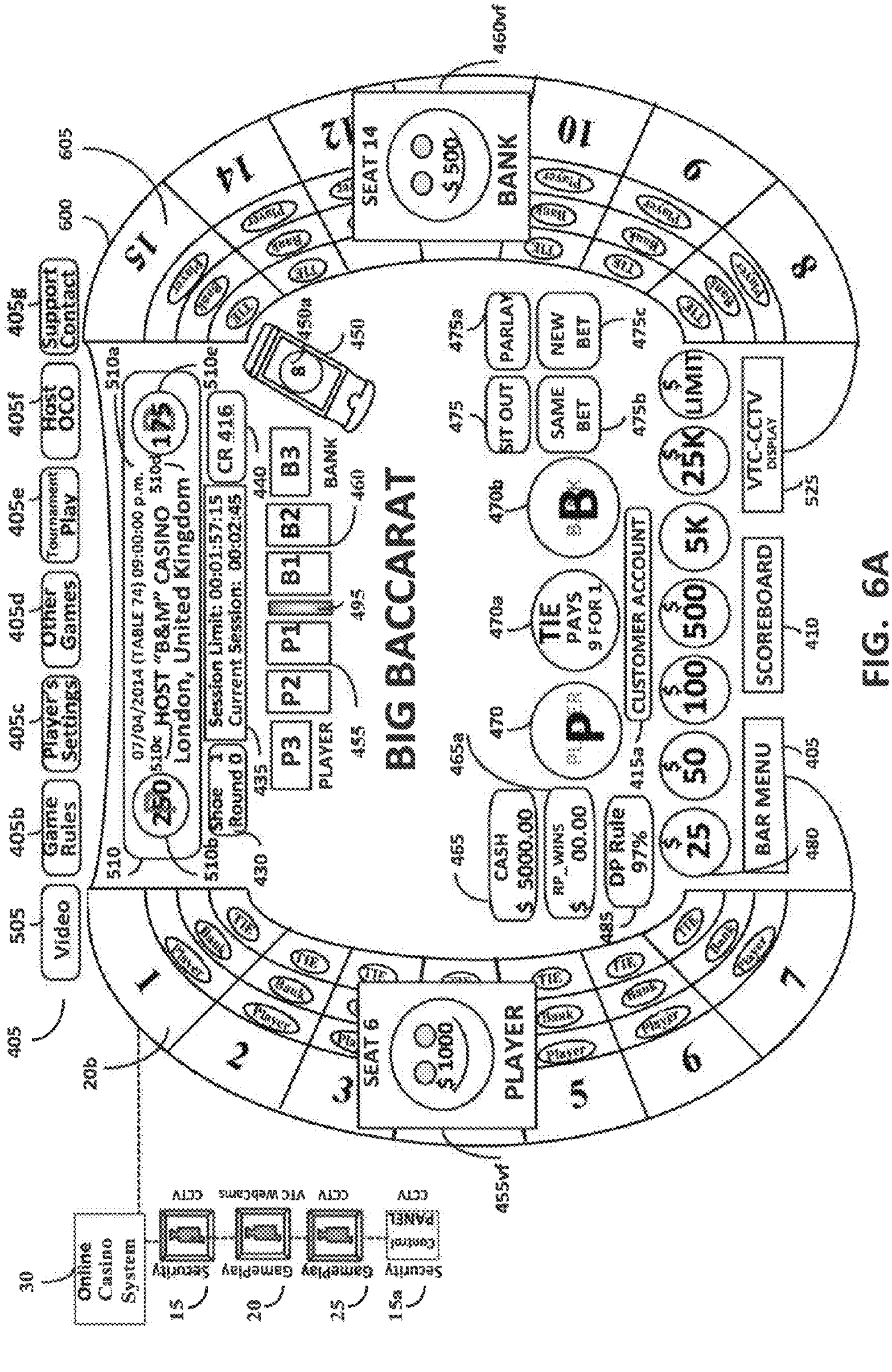
FIG. 6A is an illustration of a top view of the Intelligent Big-Baccarat Game Table (FIG. 6), with the systems enhanced ("RPUI") overlaying the captured image of the Big-Baccarat Game Table, as viewed by one or more remote game players who has selected the host OCO's website to engage in the real-time play of Big-Baccarat game captured for real-time, delayed or on-demand broadcast, by wired or wireless means, to a limited or unlimited number of remote players for play and/or wagering online in accordance with the invention.

As shown in FIG. 6A, when the play of a Baccarat game played, preferably at a real "IGT", located in a real "B&M" Casino, by real people and the sensory game play data; and or game and/or gaming data is captured by the system of the invention for real-time, delayed or on-demand broadcast to one or more RP's; during the play of the live Baccarat game the game dealer(s), preferably the Caller D1 will use the Seat CCTV Activation Keyboard's, ("SCCTV") 610 to inform the online gaming systems Baccarat software that the PLAYER hand for the current game round in progress at the live game has been exposed; the game dealer will press the ("SCCTV") PLAYER Expose Key 615*a* two-times, in rapid succession, to inform the online gaming systems Baccarat software that the original two-card PLAYER hand for the current game round in progress at the live game table has been exposed; and in the event the PLAYER hand must draw a 3$^{rd}$ Card, when the 3$^{rd}$ Card is exposed, the game dealer D1 will once again press the (SCCTV) PLAYER Expose Key 615*a* two-times, in rapid succession, to inform the system software that the PLAYER hand's 3$^{rd}$ Card, if any, has been exposed; and the game dealer will press the ("SCCTV") BANK Expose Key 640*a* two-times, in rapid succession, to inform the online gaming systems Baccarat software that the original two-card BANK hand for the current game round in progress at the live game table has been exposed; and in the event the BANK hand must draw a 3$^{rd}$ Card, when the 3$^{rd}$ Card is exposed, the game dealer D1 will once again press the (SCCTV) BANK Expose Key 640*a* two-times, in rapid succession, to inform the system software that the BANK hand's 3$^{rd}$ Card, if any, has been exposed. [The systems CDS w/Scanner 450 will be programmed to record the time of day when the 1st Card, delivered to the PLAYER hand, was removed from the CDS w/Scanner 450; and the system software will also be programmed to record the time of day when the final card dealt to the PLAYER or BANK hand during each game round, input into the system by means of the above mentioned PLAYER Expose Key 615*a* and/or the BANK Expose Key 640*a*, is exposed. The system will calculate the time that elapses between the time the 1st Card was removed from the CDS w/Scanner 450 and the time when the last card delivered to a PLAYER or BANK hand, ending the game round, is exposed. The system software will use that information to calculate the time the RP playing the PLAYER or BANK hand will have to expose his/her Baccarat game hand whereas in the event that the RP has not exposed his/her Baccarat game hand within the time the system calculates that elapsed between the time the 1st Card was removed from the CDS w/Scanner 450 and the time when the last card delivered to a PLAYER or BANK hand, ending the current game round, is exposed, then the system will automatically expose any unexposed cards comprising the RP's PLAYER and/or BANK hands.

FIG. 4I through FIG. 4R present images of cards that are dealt face-down to RP's who may use the interactive ("RPUI"), in accordance with the invention, to play, (expose), face-up the face-down cards delivered from the virtual game deck 445*a*, carried by the virtual CDS w/Scanner 445, to the RP PLAYER or BANK hand on which he/she has placed a wager for the current game round.

The play of a virtual online casino Midi-Baccarat game is in progress; i.e. Shoe 3 Round 25 430. The original two cards comprising the PLAYER hand have been delivered, "Face-Down", to the "Peek Position" 445*pp*; and the original two cards comprising the BANK hand have been delivered "Face-Down" to the BANK hands designated position 460. The number of Cards Remaining in the game deck, (271), is displayed in the "Cards Remaining Display" 440.

The RP, having placed a wager 490 on the PLAYER hand, previously used the Player Setting Button (FIG. 4 405*c*) to call the Player Settings screen (FIG. 4R 405*c*) to select his/her preferred PEEK Option, (Peek Option 1), to expose, Face-Up, any PLAYER or BANK hands dealt to the RP, Face-Down during the RP's current online gaming session. PEEK Option 1 will be the systems default peek option.

Each PLAYER or BANK hand, when displayed in the "Peek Position" 445*pp*, preferably have the number of the RP's preferred PEEK Option, (1, 2, or 3) displayed within the Peek Option field Peek 1 on the back of each card delivered to the PLAYER or BANK hand face down. When the RP uses an input device, i.e. a mouse, or other CPU input device, to hover over the Peek Option field Peek 1, a "mouse over screen" (FIG. 4H 500) displaying one or more PEEK Options will appear. The RP may use the subject "mouse over screen" to select a PEEK Option other than the default peek option; and/or the default peek option may be restored in the event that another peek option is currently being used by the RP.

The online gaming systems ("RPUI") will include one or more unique software routines that will create animated graphics, (not shown), depicting, without limitation, one of the most popular methods (FIG. 4Jb), (i.e. Default Option 1), that real people, (playing the game of Baccarat at a real Midi or Big-Baccarat game table located, preferably, in a legally licensed and regulated Bricks-and-Mortar casino), use to expose a PLAYER or BANK hand presented to them, Face-Down, during the play of a Baccarat game round.

Initially the system software will deliver a graphic image of two cards, Face-Down, to the PLAYER or BANK hand that are randomly placed in a designated area of the game table top. A computer generated pair of human hands, ("CGHH"), will be displayed positioning the two cards, (flush), and one card on top of the other. The ("CGHH") will remain on display, surrounding the Face-Down cards, placing the ("CGHH") in a position to peek at the Face-Down cards. The cards will be in a horizontal position facing the remote game player.

"PEEK Option 1" . . . described step by step:

1. The PLAYER or BANK hand is positioned, Face-Down, in the "Peek Position" 445*pp*.
2. The "peek" may be activated automatically by the system; or manually by the RP using a CPU input device to "click" on Peek Option Field Peek 1.
3. When activated; a graphic image of a computer generated pair of hands, ("CCHH"), preferably a pair of hands that closely resemble a pair of real human hands, will appear, (palms down, fingers cupped and adjacent to each other, and the thumbs are extended forward), and surround the cards comprising the PLAYER or BANK hand and positioning the Baccarat hands top card directly on top of its bottom card.
4. Once the cards of the Baccarat hand are positioned one on top of the other; the cupped ("CGHH") will be positioned, palms down, and the little finger of each hand will be touching the edges of the cards upper corners; and each thumb will be positioned on the virtual game table top under, and slightly raising, the edges of the cards, closest to the RP, from the game table top.
5. The tips of each hands ring and middle fingers will be position on the game table top; and they will be touching the front edge of the Baccarat hand, positioned horizontally and face down, on the table top.
6. The tips of each hands index finger, no longer touching the middle finger, is positioned close to the center of the back of the face down top card of the Baccarat hand. The thumbs are placed on their sides; whereas one thumb is positioned at each of the raised cards corners, closest to the RP, approximately one-inch from the ends of the horizontal Baccarat hand.
7. The "CGHH" are now positioned to initiate the "peek" process. Whereas, the ring and middle fingers are pressed against the back edge of the Baccarat hand, and the index fingers are pressing down on the center of the cards; while the thumbs are being used to further raise the front edges of the Face-Down cards comprising the Baccarat hand upwards and back.
   As the cards are raised by the thumbs, the right thumb is covering the suit and card rank or card value of the top card, imprinted on the face of the card approximately one-eighth, (⅛"), from the edges of the horizontal playing cards right corner.
   As the cards are being raised by the thumbs the index fingers are being used to push simultaneously down on the center of the top card; and at the same time, they are pushing the edge of the top card upward and over the edge of the bottom card, about one-quarter of an inch, as the ring fingers are holding the game hand's bottom card in place.
8. Once the edge of the raised top card is pushed a little more than one-quarter-inch forward of the raised bottom card; the suit rank and value of both cards is concealed from the RP by the "right thumb". Push the top card forward another one-eight-inch, and if the top card is a Jack, Queen or King, (whereas the images on these cards are typically "boxed") the RP will be able to see the horizontal edge of the box and therefore knows the value of the top card is ten (10).

9. The system may toss the top card face up, on the table top, and continue to raise the front of the bottom card, upward and back with the thumbs, while the index fingers are pushing down on the center of the back of the bottom card to hold it in place as the front of the card is being raised by the thumbs. If the card being raised is not a "boxed" Jack, Queen or King; once it has been raised approximately one-half, (½"), the outer edge of one or more symbols, ("Pips"), imprinted on the face of the card to identify the suit of each card, having a numeric value, will appear. An experienced RP, seeing the edges of the "Pips" in the top row, (there may be one, two, or three rows of "Pips"; a top row, a center row and a bottom row on the face of each card viewed in its horizontal position), will know the approximate value of that particular card.

Should the RP wishes to obtain a more precise value of the card before exposing it, he/she will use his/her input device(s) to instruct the system's ("RPUI") to continue raising the card until the edges of the center row of "Pips", if any, are exposed to the RP. At that time the RP may expose the card being "peeked" at; or once fifty-percent, (50%), of any card, during the "Peek Process" has been exposed to the RP, the system will automatically expose the card Face-Upon the game table top.

Figure 4J:
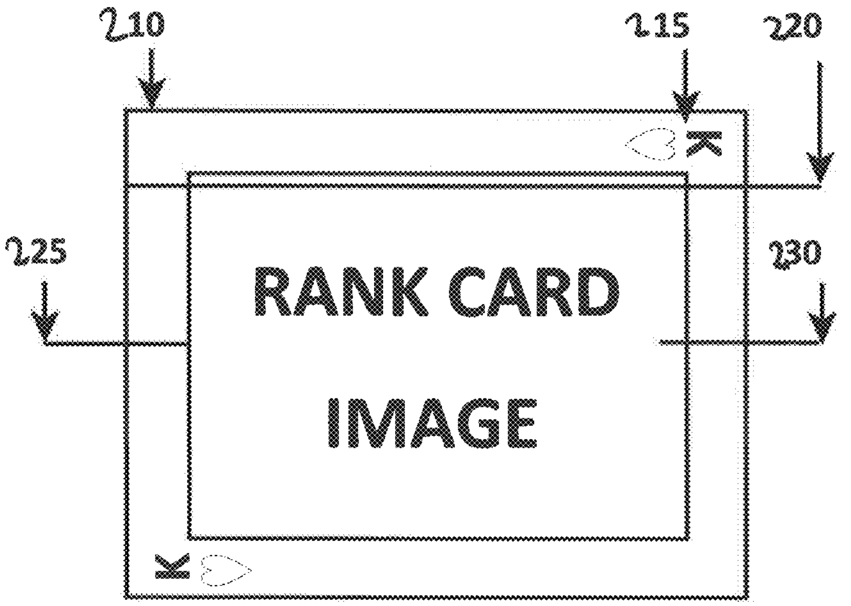
FIG. 4J is an illustration of typical playing card with designated "Rank", Faced-Up, used to deal a virtual or real-time Midi-Baccarat or Big-Baccarat game to RP's wagering online in accordance with the invention.
Figure 4J:
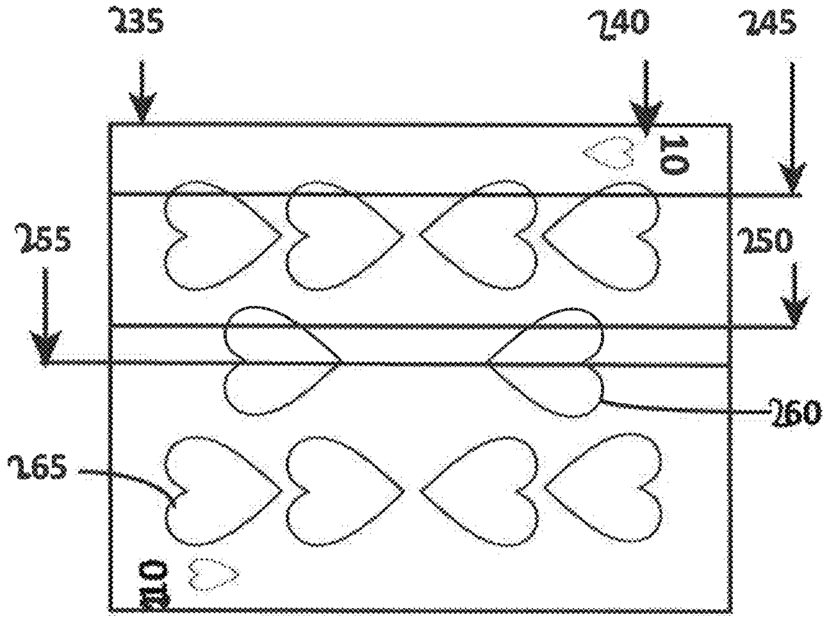
Figure 4J:
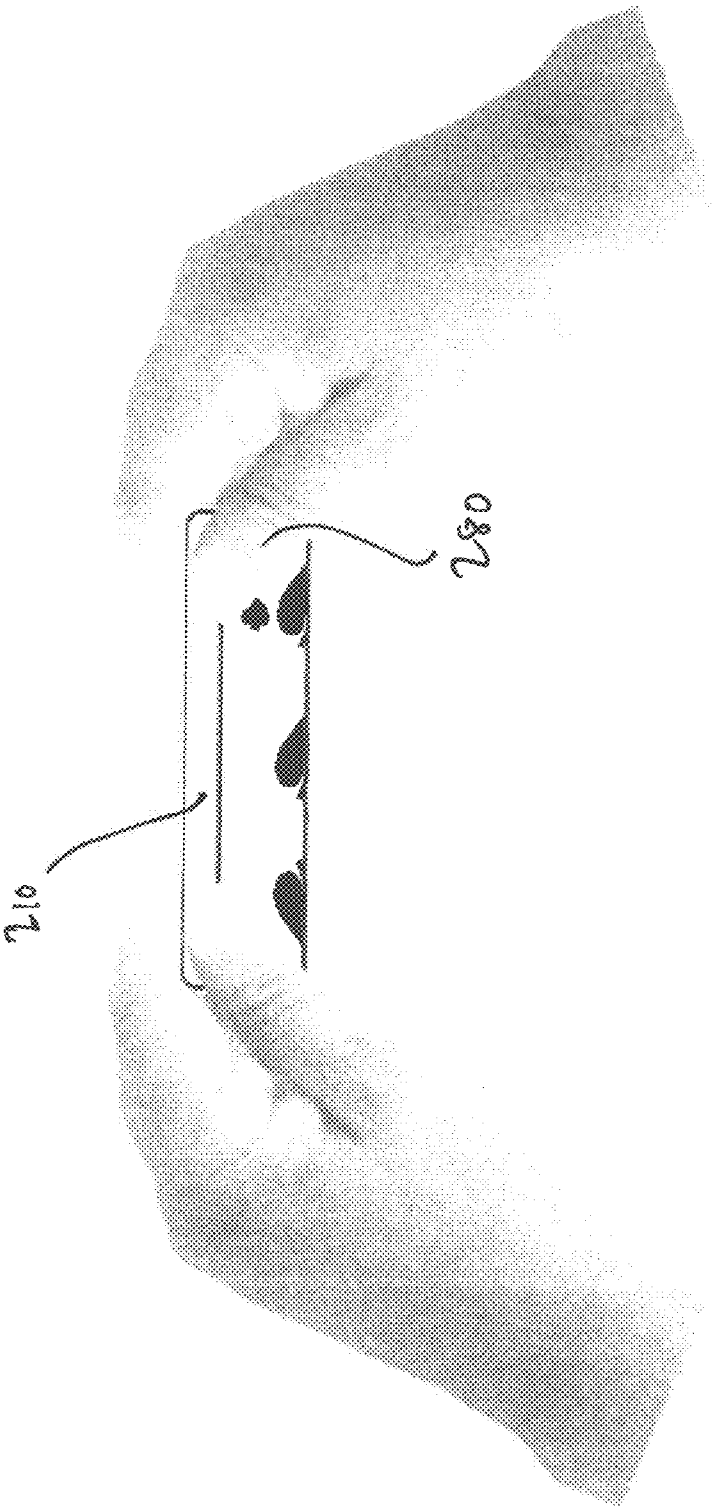

FIG. 4J is an illustration of typical "Rank" playing card 250, Faced-Up, used to play a real or virtual Midi or Big Baccarat game, depicting fundamental elements related to the systems "Expose Card (Peek) Option 1" as disclosed in exemplary embodiments of the invention.

When playing the game of Baccarat, typically, there are three (3) "Rank Cards"; the Jack, Queen and King. The Suit and Rank 215 of each "Faced-Up Rank Card" 210 is imprinted on the face of the card, on the outside edge of at least two of the card's corners that are positioned diagonally opposite each other. The appropriate "Rank Card Image" 230 is imprinted within a rectangular box 225 to provide other means of identifying the "Rank Cards". When playing Baccarat each "Rank Card" has a game value of ten (10). (When totaling a PLAYER or BANK hand's score, and the hand contain one or more "Rank Cards" the number one is dropped; whereas when calculating the score of a Baccarat game card or game hand . . . all "Rank Cards", are scored as "Zero", (0)).

If a RP, playing Baccarat online by wired or wireless means, has selected the system's ("RPUI") "Peek Option 1" to expose the PLAYER or BANK hand, during the "peek process", if the "Suit and Rank" 215, have been hidden, preferably, by a computer generated image of a "thumb", or other means, only that portion of the card above the horizontal exposure line 220 needs to be exposed, (the top edge of the rectangular image box 230), to enable the RP to know that the card being exposed is a "Rank Card" having a Baccarat score of "Zero".

FIG. 4Ja is an illustration of typical playing card, Faced-Up, having a "Numeric Value", that is used to deal a real or virtual Midi or Big-Baccarat game, depicting fundamental elements related to the systems "Expose Card (Peek) Option 1" as disclosed in exemplary embodiments of the invention.

When playing the game of Baccarat, typically there are three (3) "Rank Cards"; the Jack, Queen and King. The Ace, may be considered a "Rank Card" when playing one or more card games other than Baccarat, is considered to be a "Value Card" having a Baccarat game value of one (1). When playing Baccarat all other "Value Cards" 235, (the 2, 3, 4, 5, 6, 7, 8, 9 and 10) are imprinted with symbols, representing the suit and "Numeric Values" of each "Value Card".

The Suit and Numeric Value 240 of each Face-Up Value Card" 235 is imprinted on the face of the card, on the outside edge of at least two of the card's corners that are positioned diagonally opposite each other. The appropriate number of suit symbols, (a.k.a. "Pips") equal to the card's "Numeric Value", (excluding the "Pips" included in the Suit and Numeric Value 240 imprinted on the outside corners of each card) are printed on the face 265 of each "Value Card" 235.

If the RP, playing Baccarat online by wired or wireless means, has selected the system's ("RPUI") "Peek Option 1" to expose the PLAYER or BANK hand, during the "peek process", if the "Suit and Numeric Value 240, have been hidden from the RP's view, preferably, by a computer generated image of a "thumb", or other means, only that portion of the top row of "Pips" above the horizontal exposure line 245 needs to be exposed to enable the RP to know that the card being exposed is a "Value Card" having a score value of ten (10) or nine (9); and only that portion of the center row of two (2) "Pips" above the horizontal exposure line 250 needs to be exposed to enable the RP to know that the card being exposed is a "Value Card" having a score value of ten (10).

Once the system software controlling the "Expose Card (Peek) Option 1 or Option 3, automatically or manually by the RP, recognizes that the horizontal exposure line 255 has been reached; the system will automatically expose any "Rank Card" 210 or "Value Card" 235 Face-Upon the game table top.

A ten (10) valued card has two (2) "Pips" 260 printed in the center of the top and bottom 265 rows of "Pips", each comprised of four (4) "Pips"; whereas a nine (9) valued card has one (1) "Pip", (not shown) printed in the center, and between, the top and bottom row of "Pips" 265, each comprised of four (4) "Pips".

An advantage of the method described immediately above is that it will allow a RP, by means of the system's ("RPUI"), to reasonably duplicate the actions that a live Baccarat player, playing at a real Midi or Big-Baccarat game table, hosted by a real B&M casino operator, takes when presented with the PLAYER or BANK hand. This method of "sweating" a Baccarat PLAYER or BANK hand is favored by a significant majority of real-time Baccarat players. Baccarat is the most popular casino table game in the Orient.

FIG. 4Jb is an exemplary illustration of the default "Peek Option 1", disclosed in the invention, depicting computer generated animated graphics and/or "special effects", (two dimensional ("2D") and/or three dimensional ("3D"), and one or more supporting software routines that will allow the RP, by means of the system's ("RPUI"), to essentially duplicate a real-world procedure used by real Baccarat game players, playing in a real "B&M" casino to expose the PLAYER or BANK hand, dealt Face-Down to a game player playing Midi or Big Baccarat.

Whereas, the system software will, responding to the input the RP enters into the system by means of the ("RPUI") during the play of a PLAYER or BANK hand during a game round. Hidden, beneath the thumb 280 is an image of the card value and suit of the raised top card; and the card value of the bottom, from the remote Baccarat player's view. A portion of the top row of "Pips", representing the card suit, is imprinted of the face of the bottom card 230, is visible to a remote Baccarat player, who seeing the three-pips, knows that the value of the bottom card 230 is either a Six, Seven or Eight valued card. Whereas, not knowing the precise value of the card, using the systems Peek Option 1, will by allowing the RP to interact with and exercise some control over the play of the game, will add much needed mystic and excitement to the play of virtual Mini, Midi and Big Baccarat games, and or the captured sensory game play; and/or game data captured from the play of a live Baccarat game played by real people, in a real "B&M" Casino, for real-time, delayed or on-demand broadcast to an unlimited number of RP's in accordance with the methods of the invention.

Figure 4K:
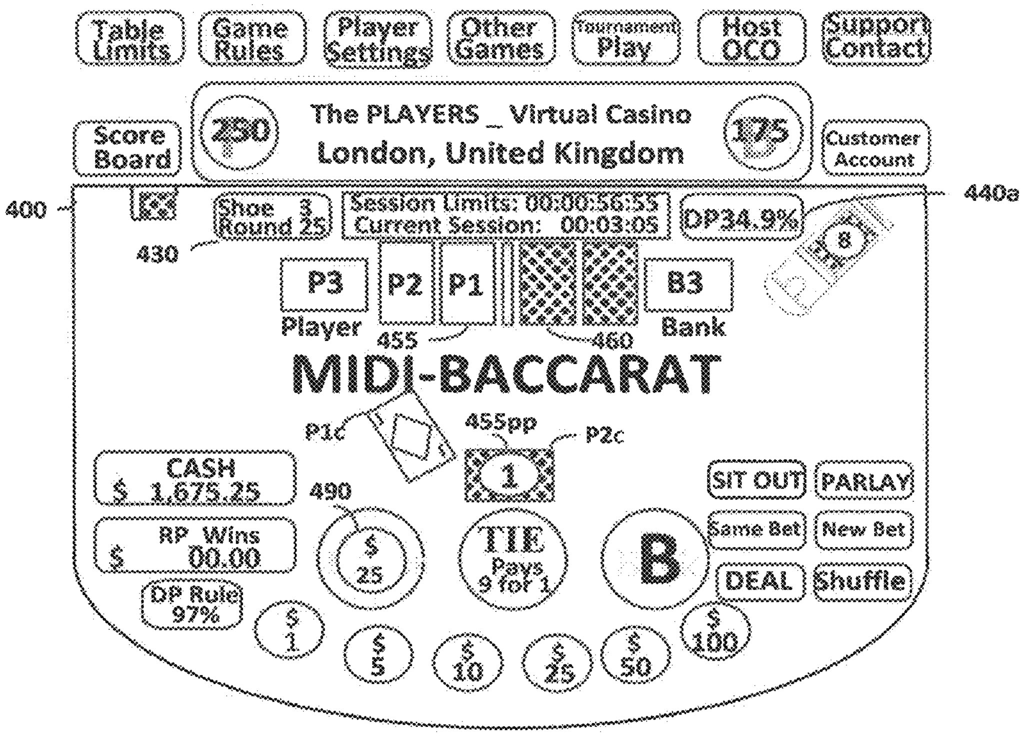
FIG. 4K is an illustration of a screen shot of a virtual Midi-Baccarat game, depicting fundamental elements related to the systems "Peek Option 1", for the PLAYER hand, as disclosed in exemplary embodiments of the invention.

FIG. 4K is an illustration of a screen shot of a virtual Midi-Baccarat game table 400, depicting fundamental elements related to the systems "Peek Option 1", for the PLAYER and BANK hands, as disclosed in exemplary embodiments of the invention.

Shoe 3 Round 25 430 is the current game round in progress; and the Deck Penetration display 440*a* informs the RP that 34.9%, (preferably %35% if rounded), of the cards, comprising the eight (8) ("S52CD") game deck, have been "burned" or dealt to the game players from Shoe 3.

During the play of a game round, the delivery of the Midi or Big-Baccarat PLAYER and BANK hands by the online gaming system, to the PLAYER Hand will be delivered, Face-Down, to the "Peek Position" 445*pp*; whereas the 1$^{st}$ Card delivered from the CDS, preferably, will always be the top card, P1c and the 3$^{rd}$ Card delivered from the CDS, preferably, will always be the bottom card P2c of the PLAYER hand (FIG. 4I 455*ph*) delivered to the "Peek Position" 445*pp*; and the BANK hand will always be delivered, Face-Down, to the area designated for the placement of the BANK hand 460, and the 2nd Card delivered from the CDS to the BANK hand will be placed, Face-Down" in field B1, and the 4$^{th}$ Card delivered from the CDS will be placed, Face-Down, in field B2.

Preferably, the system's online casino Baccarat software will have an analytical software module that will track the value of the first card dealt to the PLAYER hand each game round, thereby enabling the analytical software module to calculate the "1$^{st}$ Card Advantage" for the PLAYER or BANK hand for each game round dealt from each "particular shoe". Further, the systems analytical software module will track and record the amount each remote game player wagered on the PLAYER or BANK hand during the play of each Baccarat game round played by the RP, to determine if the RP wagers are consistently highest on the PLAYER or BANK hand; when the system identifies the value of the first card dealt to the PLAYER hand is known to provide either the PLAYER or BANK hand with a winning advantage for each game round played. Whereas, in the event the analytical software determines that one or more remote players winning wagers, placed on the PLAYER or BANK hand, are consistently highest, when the "1$^{st}$ Card Advantage" consistently favors the PLAYER or BANK hand the RP wagers on during the play of each game round.

Figure 4L:
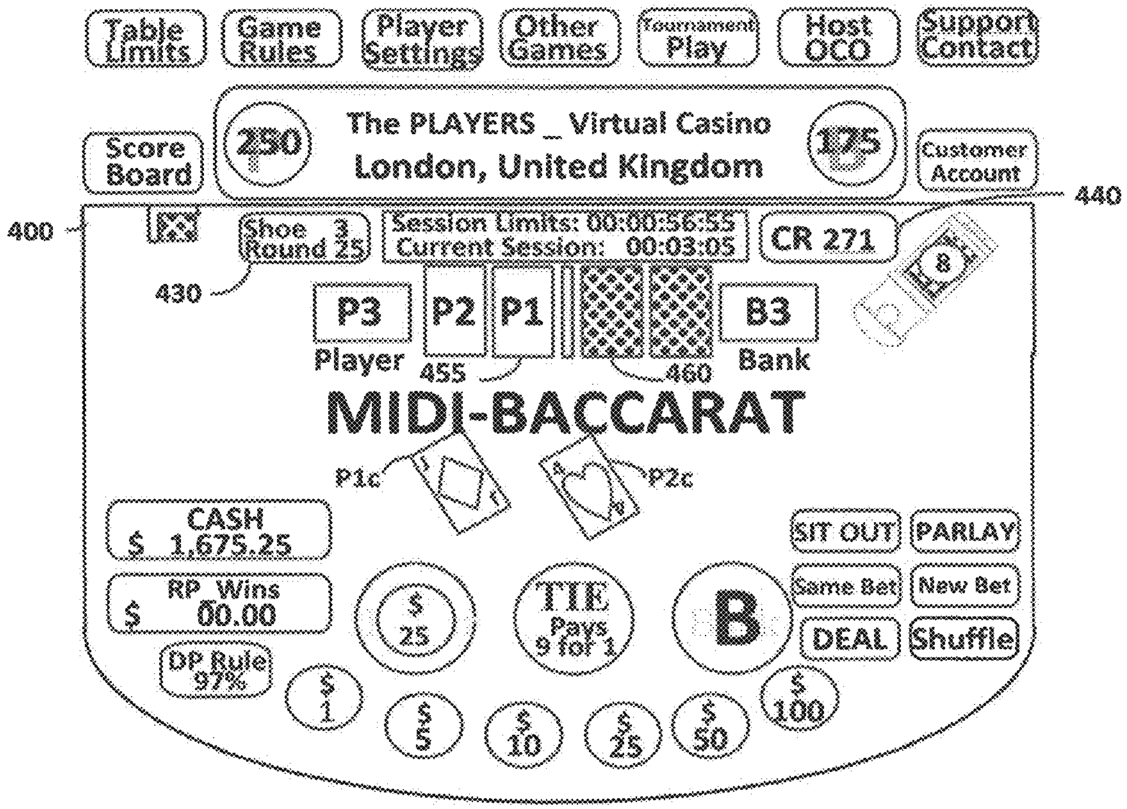
FIG. 4L is an illustration of a screen shot of a virtual Midi-Baccarat game, depicting fundamental elements related to the systems "Peek Option 1", for the PLAYER hand, as disclosed in exemplary embodiments of the invention

FIG. 4L is an illustration of a screen shot of a virtual Midi-Baccarat game table 400, depicting fundamental elements related to the systems "Peek Option 1", for the PLAYER hand, as disclosed in exemplary embodiments of the invention.

Shoe 3 Round 25 430 is the current game round in progress; and the Cards Remaining Display 440 informs the RP that "271" cards remain in the CDS game deck, whereas the original inventory of the eight (8) ("S52CD") game deck consisted of "416" cards. Both cards dealt to the "Peek Position", (FIG. 4K 445*pp*), Face-Down, have been exposed P1c and P2c and after (x-seconds) will be moved to their final destinations, P1 and P2, within the designated area 455 for the faced-up PLAYER hand, prior to completing the current game round.

Figure 4M:
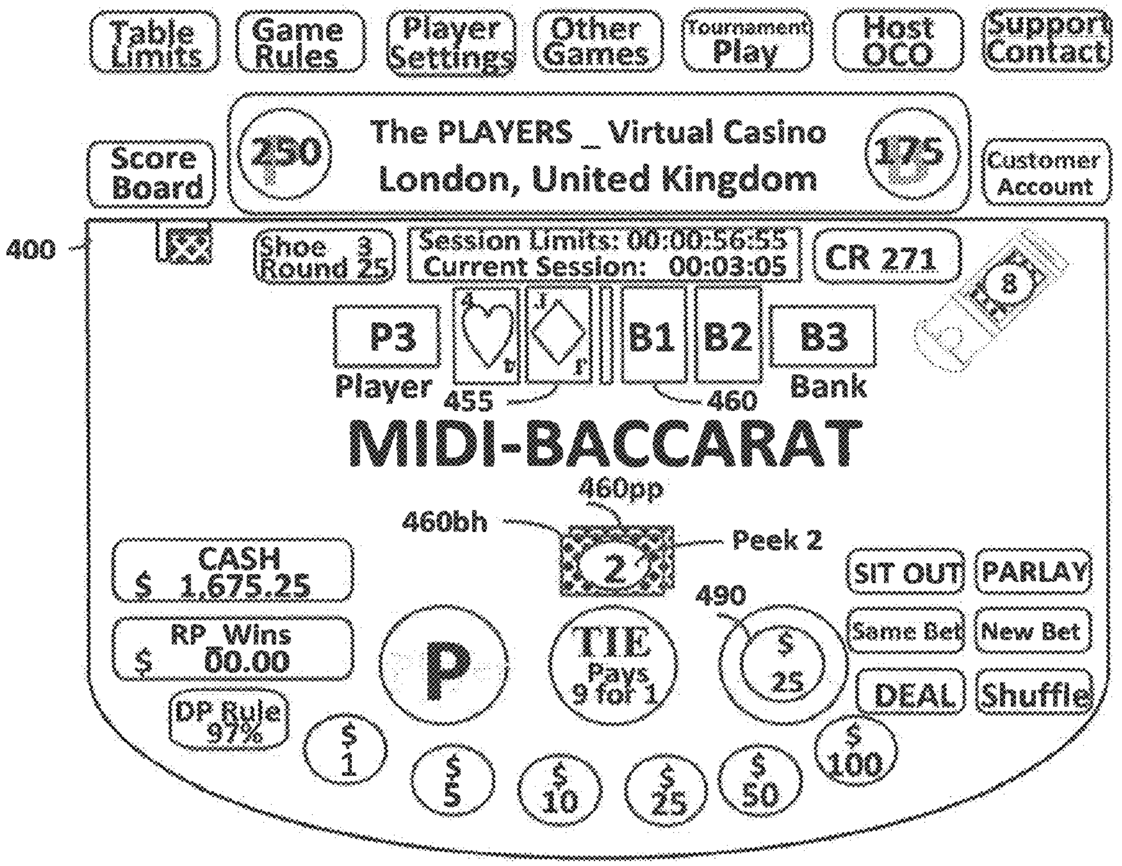
FIG. 4M is an illustration of a screen shot of a virtual Midi-Baccarat game, depicting fundamental elements related to the systems "Peek Option 2", for the BANK hand, as disclosed in exemplary embodiments of the invention

FIG. 4M is an illustration of a screen shot of a virtual Midi-Baccarat game table, depicting fundamental elements related to the systems "Peek Option 2", for the BANK hand, as disclosed in exemplary embodiments of the invention Shoe 3 Round 25 continues. The cards comprising the PLAYER hand are displayed, Face-Up, in their designated areas, (P1 & P2), for the PLAYER hand 455 on the game table top 400; whereas the BANK hand is simultaneously moved from its original position, (B1 & B2), of the area designated for the placement of the BANK hand 460, to the "Peek Position" 460*pp*; and the RP, playing the BANK hand 460*bh* has, selected PEEK Option 2 Peek 2 to expose the Bank cards, one by one, (without Peeking), whereas using his/her client computer's mouse or other input device one click on the top card will expose the top card face-up; and another click on the bottom card will expose the bottom card Face-Upon the game table top 400. The system also displays the amount wagered 490 by the RP on the BANK hand.

Figure 4N:
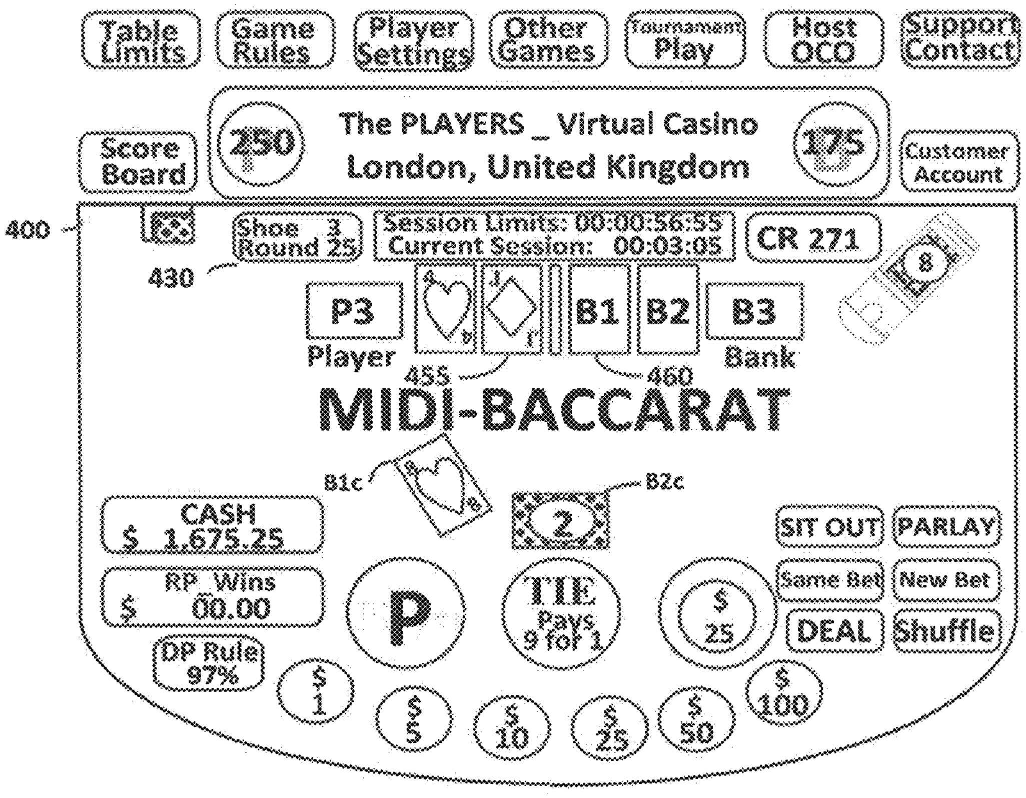
FIG. 4N is an illustration of a screen shot of a virtual Midi-Baccarat game, depicting fundamental elements related to the systems "Peek Option 2", for the BANK hand, as disclosed in exemplary embodiments of the invention

FIG. 4N is an illustration of a screen shot of a virtual Midi-Baccarat game table 400, depicting fundamental elements related to the systems "Peek Option 2", for the BANK hand, as disclosed in exemplary embodiments of the invention Shoe 3 Round 25 430 continues. The cards comprising the PLAYER hand are displayed, Face-Up, in their designated area 455. The RP has used his/her mouse to expose the top card B1c of the Face-Down BANK hand. The RP must use his/her CPU's input device to expose the bottom card B2c of the BANK hand.

Figure 4O:
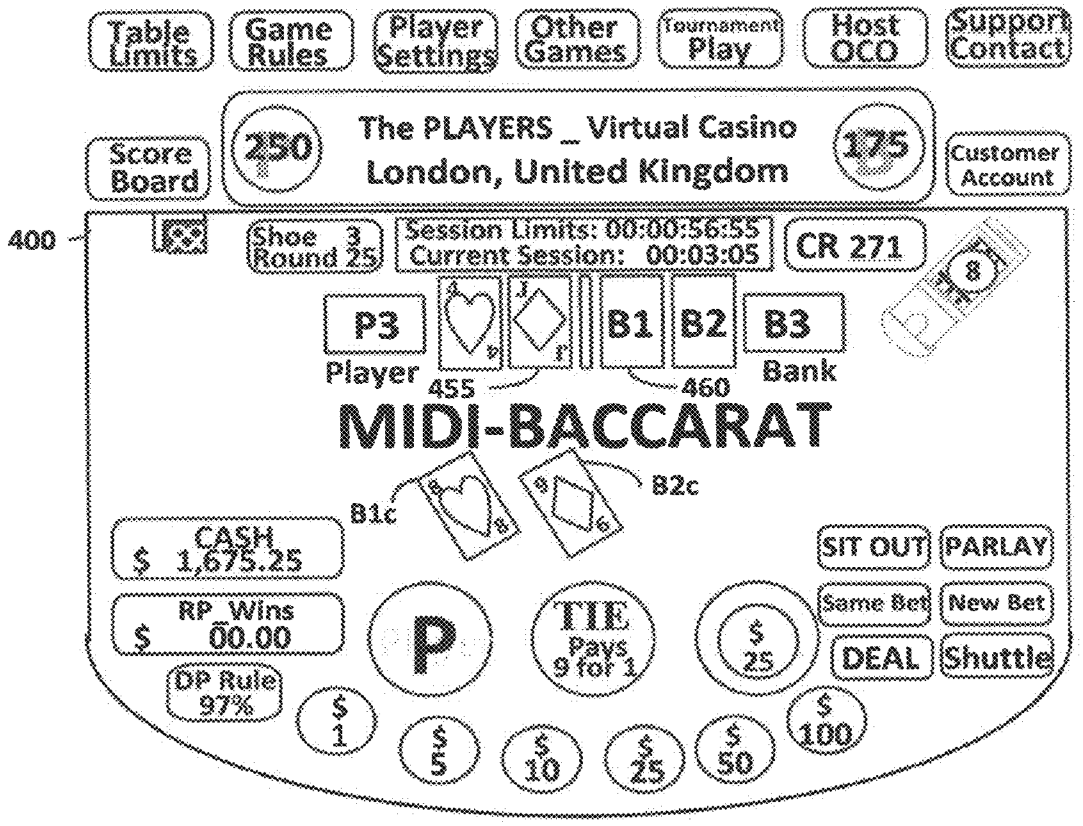
FIG. 4O is an illustration of a screen shot of a virtual Midi-Baccarat game, depicting fundamental elements related to the systems "Peek Option 2", for the BANK hand, as disclosed in exemplary embodiments of the invention.

FIG. 4O is an illustration of a screen shot of a virtual Midi-Baccarat game table 400 depicting fundamental elements related to the systems "Peek Option 2", for the BANK hand, as disclosed in exemplary embodiments of the invention.

Shoe 3 Round 25 continues. The cards comprising the PLAYER hand are displayed, Face-Up, in their designated areas 455. The top card B1c and the bottom card B2c of the BANK hand have been exposed; whereas, after (x seconds) both Faced-UP BANK cards will immediately be moved to their designated positions, B1 or B2 within the area designated 460 for displaying the BANK hand.

Figure 4P:
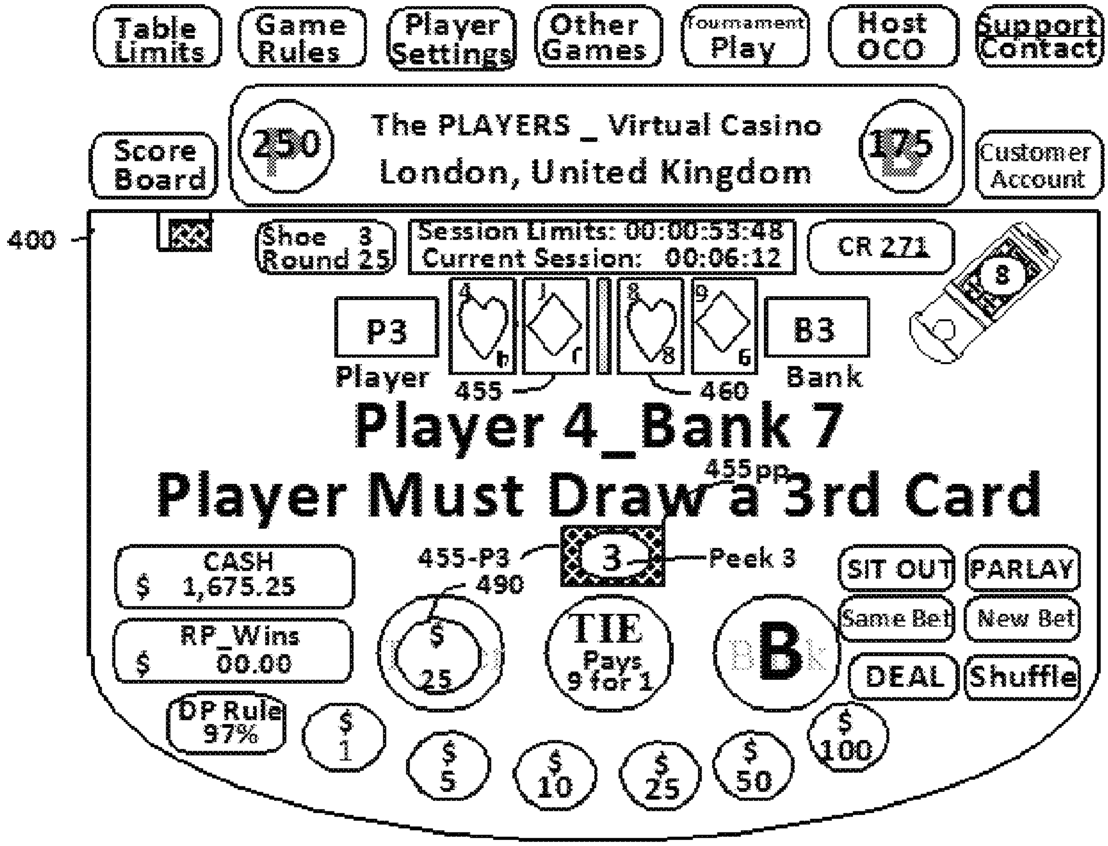
FIG. 4P is an illustration of a screen shot of a virtual Midi-Baccarat game, depicting fundamental elements related to the systems "Peek Option 3", for the PLAYER hand, as disclosed in exemplary embodiments of the invention.

FIG. 4P is an illustration of a screen shot of a virtual Midi-Baccarat game table 400, depicting fundamental elements related to the systems "Peek Option 3", for the PLAYER hand, as disclosed in exemplary embodiments of the invention.

Shoe 3 Round 25 continues. The PLAYER hand has 4 and the BANK hand 7. According to the Baccarat games "3$^{rd}$ Card Rule"; the PLAYER hand must draw a 3$^{rd}$ Card. The system's online gaming software displays the current scores of the PLAYER and BANK and/or generates an audio announcement of the scores of the game hands; and any actions, if any, that must be taken to achieve a final score for the game hands so the settlement of the wagers can be achieved.

A 3$^{rd}$ Card has now been delivered by the system to the "Peek Position" 455*pp* for the PLAYER hand. The RP previously selected "Peek Option 3" Peek 3 to expose the delivered 3$^{rd}$ Card. When Peek 3 has been selected to expose one or more cards delivered Face-Down to the "Peek Position" 455*pp* or 460*pp*, the moment the RP clicks on any card in the PLAYER or BANK hands "Peek Position"; all cards in the "Peek Position" will be instantly exposed on the game table top 400, and they will be moved, without any delay, and faced-up in the appropriate areas designated for the PLAYER hand 455, or the BANK hand 460.

Figure 4Q:
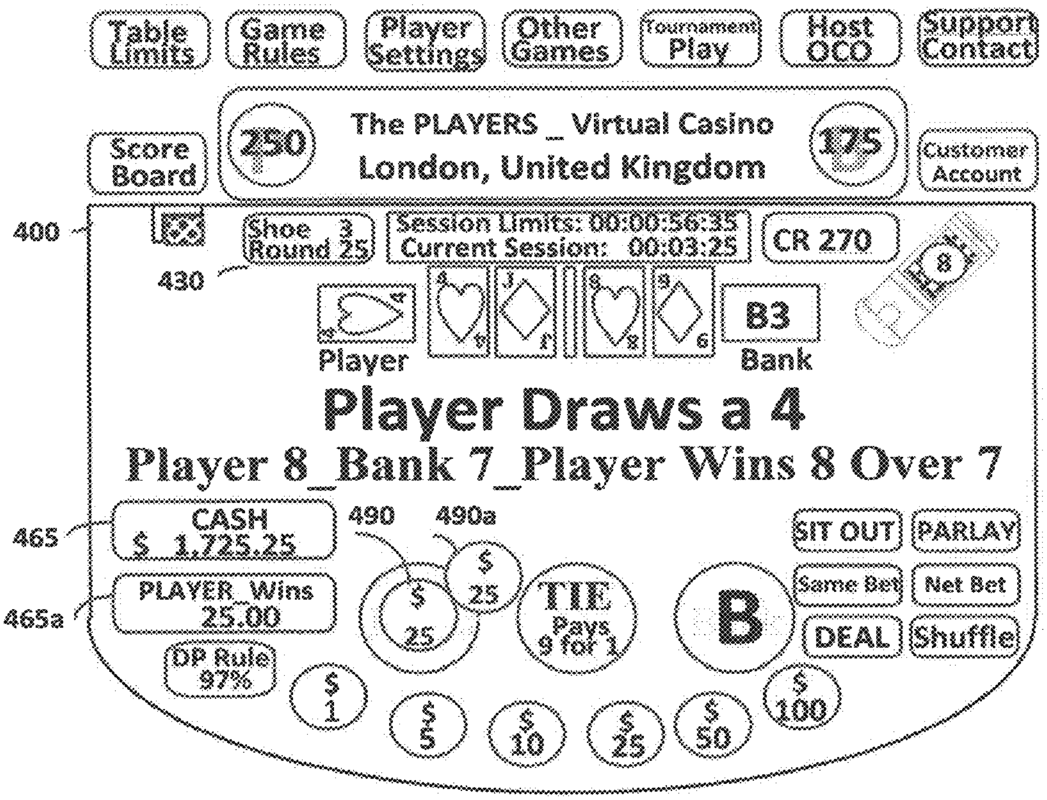
FIG. 4Q is an illustration of a screen shot of a virtual Midi-Baccarat game, depicting fundamental elements related to the systems "3$^{rd}$ Card Rule", for the PLAYER hand, as disclosed in exemplary embodiments of the invention.

FIG. 4Q is an illustration of a screen shot of a virtual Midi-Baccarat game table 400, depicting fundamental elements related to the systems "$3^{rd}$ Card Rule", for the PLAYER hand, as disclosed in exemplary embodiments of the invention.

Shoe 3 Round 25 430 continues. The $3^{rd}$ card removed the CDS after it has been exposed and delivered to the PLAYER hand has a card value of 4. The game rules prohibit the BANK hand from taking a $3^{rd}$ Card; and the outcome of the current game round is displayed and/or announced by the system software. (The PLAYER hand Draws a 4; the "PLAYER hand has 8_the Bank hand 7_the PLAYER hand Wins 8 over 7) The settlement is made and the PLAYERS original wager 490 and his/her winning wager 490*a* are displayed; and the actual amount won 465*a* by the RP is displayed; and that amount is added to the RP CASH Bankroll 465 display.

Figure 4R:
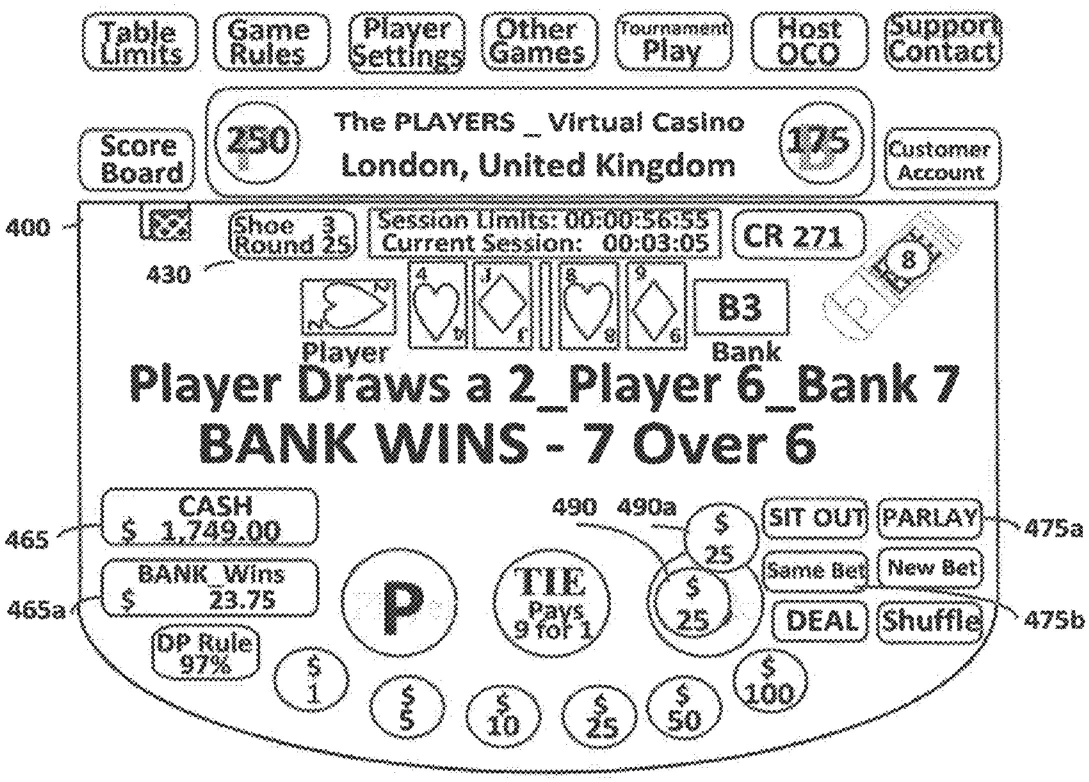
FIG. 4R is an illustration of a screen shot of a virtual Midi-Baccarat game, depicting fundamental elements related to the systems "Settlement" of a winning BANK hand, as disclosed in exemplary embodiments of the invention.

FIG. 4R is an illustration of a screen shot of a virtual Midi-Baccarat game table 400 depicting fundamental elements related to the systems "Settlement" of a winning BANK hand, as disclosed in exemplary embodiments of the invention.

Shoe 3 Round 25 430 continues; whereas the Scores are different. The $3^{rd}$ card removed from the CDS after it has been exposed and delivered to the PLAYER hand has a card value of 2. The game rules prohibit the BANK hand from taking a $3^{rd}$ Card; and the outcome of the current game round is displayed and/or announced by the system software. The PLAYER Draws a 2. ("PLAYER 6_Bank 7_BANK wins 7 over 6").

The settlement is made and the RP's original BANK wager 490 and his/her winning wager 490*a* are displayed; and the net amount won by the RP ($23.75) 465*a* after a 5% commission ($1.25) is deducted from the amount the RP wagered ($25.00) 490 on the BANK hand is added to the RP's CASH Bankroll 465 display. When a PLAYER, BANK or TIE wager is lost the amount displayed in the CASH Bankroll 465 display during the play of a game round does not change, because the amount of any wagers placed during a game round are deducted from each RP Cash Bankroll 465 display. If the RP has a winning PLAYER, BANK or TIE wager for the just completed game round, and has not used the Same Bet Button 475*b*, to take down the amount of the winnings, and leave the amount of the initial wager in play, only the amount won will be added to the RP's; CASH Bankroll 465 display; or if the RP's has used the Parlay Button 475*a* to wager the amount of the original wager, and the amount won, (parlayed the original bet), on the next game round the RP's CASH Bankroll 465 display will not change until he/she wins a limit Parlay bet.

Figure 4S:
FIG. 4S is an illustration of multiple "Drop Down Menus" that can be called individual by each remote player activating the appropriated "Button" comprising the ("RPUI's") BAR MENU, as disclosed in exemplary embodiments of the invention.

FIG. 4S is an illustration of a screen shot of a virtual Midi-Baccarat game table 400, depicting fundamental elements related to the systems Bar Menu's "Drop Down Menus", when called, as disclosed in exemplary embodiments of the invention.

The configuration of each of the systems "Bar Menu" Buttons drop down menu, without limitation, may be modified to meet the needs of the online casino operator, ("OCO"), and or the RP's.

The system will offer default "Minimum and Maximum" bet limits for each type of Baccarat game, (Mini, Midi or Big-Baccarat), available to the remote players.

Preferably, the system will offer the RP's one or more options to enter their own "Minimum and Maximum" bet limits for his/her current play session. Allowing variable limits to RP's, playing the identical game, which will prove to be advantageous to both the host OCO's and the RP's. This would be particularly true when the game selected for play is a high limits Baccarat game table, (i.e. a $500 Minimum and a $100,000.00 Maximum), hosted by a real B&M casino; and the captured game play gaming data is broadcast to the RP's for real-time, or on-demand broadcast to the RP's.

The remote players will be able to see and participate in an event that a relatively small number of people, globally, will ever see or experience. They will have the ability to visually observe the play of the game, hear the sounds related to the play of the game; and view and hear the ambient sounds of the casino environment by placing a Minimum Bet; far less than that required of the actual live Baccarat game players present at the game table hosted during real-time or on-demand by the "B&M" casino and/or OCO.

The OCO's and/or B&M casino's, capturing and broadcasting the live play of a high-limit Baccarat game, by wired or wireless means, costs may be offset by just "one" high-limit Baccarat player engaged in the play of the game from a remote location. Additionally, the B&M casino, hosting the play of a live casino Baccarat game for real-time broadcast to RP's, for real-time or on-demand play by RP's, using simple marketing strategies, will be able to keep more live players at the game table; reduce the B&M's cost of keeping a Baccarat game open 24/7, (games which may be without players), whereas in the event there are no live players at a Baccarat table, (excluding one game-starter or "shill"), may remain open to accommodate 500 or 5,000 remote players wagering online. Also, that one Baccarat game can generate huge marketing benefits for both the "B&M" casino and the host "OCO".

Additionally, the captured game play and game data, can be made available to the RP's for "on-demand" play for a limited or unlimited period of time.

Alternatively, the video portion, "the game play", of the Baccarat game captured for real-time broadcast to RP's, can be filtered or separated from the captured game-data, (preferably captured by a CDS w/Scanner or other card scanning device at the game table), and/or the ambient sounds of the play of the game captured by one or more microphones), for broadcast to the RP's. Separating, the video portion, "the game play", from the captured game and/or gaming data and/or audio, will provide a means to allow RP's, located in gaming jurisdictions, where limited "Bandwidth" is available to carry "streaming video", will increase the number of RP's, globally, that will have access to the game and/or gaming data fundamental to the play of any online casino table game.

Preferably, without limitation, when the Baccarat game selected for play by a remote player is not a "virtual Baccarat game", but the game play and/or gaming data captured during real time from a live Baccarat game, played by real people in a real "B&M" casino; the TABLE LIMITS 405*a* button will be replaced by a VIDEO (FIG. 5 505) button. The contents of the TABLE LIMITS (FIG. 5 405) button's drop down menu, preferably will be integrated into the GAME RULES (FIG. 5 405*b*) button's drop down menu.

Preferably the game rules 405*b* for the selected game should be easily accessible, and transparent, to the RPs; as should be the house advantage or disadvantage.

Using player settings 405*c*, a RP may select a virtual Mini, Midi or Big-Baccarat game using game data generated by the online gaming system software's RNG; or a virtual Mini, Midi or Big-Baccarat game using "gaming data" captured at a real Baccarat table played in a real "B&M casino; whereas the captured "gaming data" is integrated into the "OCSO" online casino system for broadcast to RP's during real-time and/or on-demand; and/or a remote players may access the real-time play of a real Baccarat game, (played by real people in a real "B&M" casino), by means of one or more CCTV cameras and audio devices, coupled to a Video Teleconferencing, "VTC", network.

In some embodiments, the RP will not be provided with any means to control the speed of the play of an online casino table game, captured live in a real casino, broadcast during real-time to the RP's. When play of an online casino table game, captured live in a real casino, broadcast during real-time to the RP's; is stored for on-demand broadcast to the RP's, it may be edited, to speed up the play of the game when called for on-demand play. In other words, whereas the CDS w/S also housing, or is coupled to, a timing device that records the exact time, (hour, minute and second), that the first Card and the last card is delivered to the PLAYER and BANK hands during each game round dealt from a "particular shoe"; and the time that it takes for the game players to play, (expose and face-up) the game hands, the time for the game dealer(s) to announce the scores of the game hands and the results of each game round, and the time it takes for the dealer(s) to complete the settlement of the wagers is known to the system software. Preferably, that portion of the CCTV cameras capturing the real-time shuffle of the game deck and it's placement in the CDS w/S used to deal the cards to the game players would not be cut from the captured game play. That portion of the video is fundamental to assuring the RP that the integrity of the gaming data is above reproach.

In an attempt to prevent RP's from becoming "problem gamblers", (and/or to help those that are), each RP on logging into an online casino website using one or more methods of the current invention may enter into the system a designated time limit specific to the time he/she is allowed to play, (his/her "play session), minutes/hours per session, per day, per week or per month. When a particular RP's "session limit" is achieved the system will automatically terminate the RPs play. Preferably, once the RP's enters his/her "session limits" into the system he/she will have the option to enter a specific period of time that he/she will not be able to change his/her self-imposed "session limits" without the assistance of the OCO's "Problem Gamblers" management team . . . who will be able to access the RP's, requesting the change, player rating history, which is preferably programmed to identify RP's who are, or who have the potential to become "Problem Gamblers". Preferably, all online casinos, or those operating under the same corporate umbrella would maintain and share a central database of "Problem Gamblers" that would prevent a RP from circumventing any self-imposed "session limits" by switching from one online casino site to another.

The other games option 405*d* provides a list of other casino games available on the current online casino's website.

The tournament play option 405*e* provides the RP's with access to all information related to any Card Game or Slot Tournaments hosted by the "B&M" providing any real-time game content to the host OCO; and or access to all information related to any Card Game or Slot Tournaments hosted online by the host OCO.

The Host OCO option 405*f* provides transparency which is necessary to instill confidence in the RP's that he/or she is dealing with an OCO who is legally licensed and regulated. This menu requires that all parties associated with the Host OCO, B&M casino that provide the game play and/or gaming data for broadcast live or on-demand to the RP's, the "OCSD", financial institution or other entity that handles all debit and credit transactions related to the play of the host OCO games; and the location of the online casino's game servers, including the city, state, country and/or gaming jurisdiction; and the names of their CEO and Chief Technical Officer; and their direct contact information.

A support option 405*g* provides one or more e-mail address and phone numbers where the RP may seek technical support specific to the RP's interaction with the online casino's gaming systems; and where the RP may seek and receive consulting relating to Problem Gaming; and contact information specific to the OCO hosting the online gaming website; and contact information specific to one or more persons responsible for resolving any RP's customer dispute; and the online link and telephone number of government regulators responsible for policing all OCO operating in the gaming jurisdiction where the OCO has been licensed.

Figure 5:
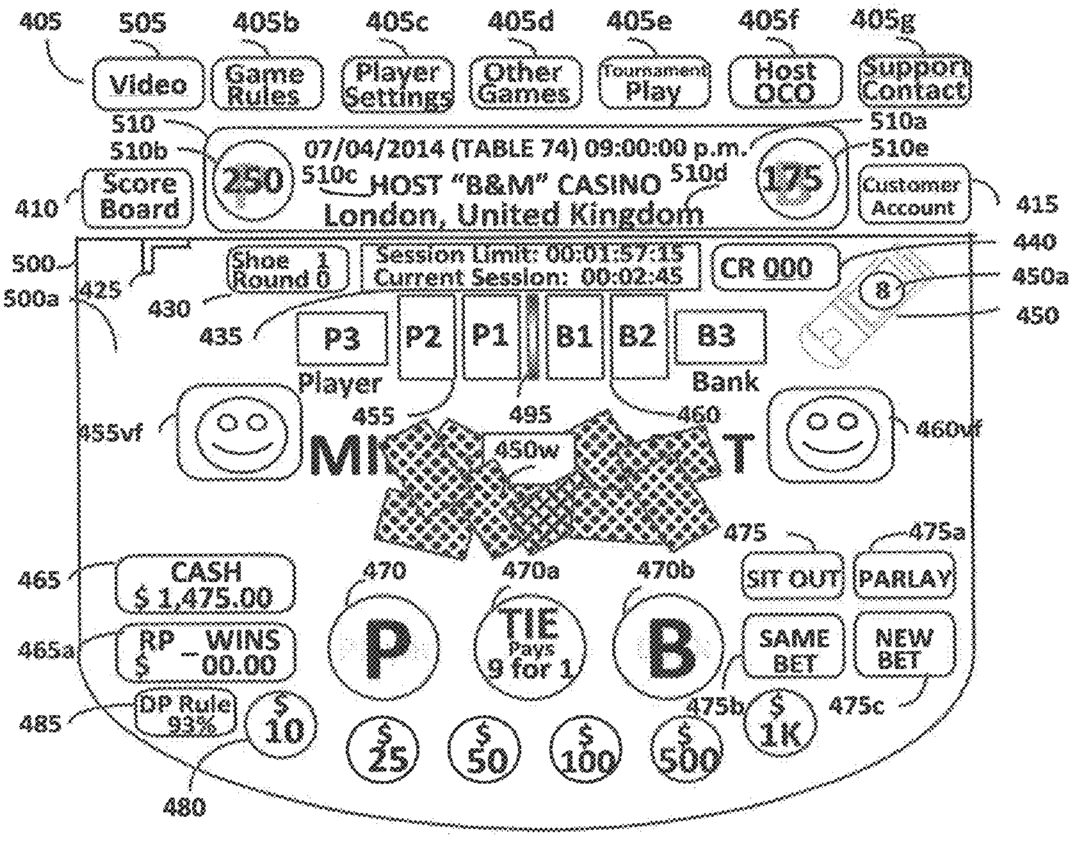
FIG. 5 is an illustration of an overhead view of the captured CCTV image of a real Midi-Baccarat Game Table; with the systems computer generated ("RPUI") overlaying the image of the Midi-Baccarat Game Table, in accordance with the invention.

FIG. 5 Represents the gaming data, captured sensory game play data; and/or gaming data captured, in accordance with the invention, by the online gaming system's capture devices from the play of a real Midi-Baccarat game, played by real people, during real time, at a real casino Baccarat table, located in a real "B&M" casino that is preferably legally licensed and regulated; whereas the captured sensory game play data; and/or gaming data is available for real-time, delayed and/or on-demand broadcast to the remote players, by wired or wireless means, over an intranet, an extranet, a virtual private network ("VPN"), a cell network, a Video Teleconferencing network, ("VTC"), a non-TCP/IP-based network, a Television Broadcast; and/or any LAN, WAN, or the like including the Internet or the WWW.

The system's ("RPUI"), overlaying, the captured real-time images captured of a real "B&M" casino's game table, represented by game table 500, is used by the RP's to play the live game when broadcast to the RP's during real-time, delayed or on-demand; whereas the system's ("RPUI") used to play the captured live game is essentially identical to the ("RPUI") the system of the current invention provides to RP's playing a Virtual or On-Demand Baccarat game online. One notable difference in the ("RPUI") is that the Virtual and On-Demand Baccarat games ("RPUI") includes a DEAL button (FIGS. 4 & 5E 475*d*) and a SHUFFLE button (FIGS. 4 & 5E 475*e*) button. The system ("RPUI") (FIG. 5) used for Baccarat games broadcast to the RP's for play during real-time does not include the DEAL or SHUFFLE buttons.

Typically, when playing a Baccarat game at a Midi or Big-Baccarat game table all of the cards dealt to the PLAYER and BANK hands are initially dealt, Face-Down, from a Card Dispensing Shoe, (CDS), to the Baccarat game dealer or a Baccarat game player who will "Face-Up", the PLAYER and/or BANK hands. Once the game hands are "Faced-Up" the game dealer will place PLAYER and BANK hands, "Face-Up", in the areas imprinted on the game table's layout 500*a* designated for the PLAYER hand 455 and the BANK hand 460.

Preferably, the real-time game play and gaming data captured, by the system's capture devices, from the play of a real Baccarat game, played by real people, during real time, at a real casino Baccarat table, located in a real "B&M" casino that is preferably legally licensed and regulated; whereas the captured game play and/or gaming data is available for real-time, delayed and/or on-demand broadcast to the remote players, by wired or wireless means, over an intranet, an extranet, a virtual private network ("VPN"), a cell network, a Video Teleconferencing network, ("VTC"), a non-TCP/IP-based network, a Television Broadcast; and/or any LAN, WAN, or the like including the Internet or the WWW.

Preferably, the "B&M" casino will maintain a database of all game play and/or gaming data the "B&M" casino captures and provides to an "OCO"; and preferably the "OCO" will maintain a database of all game play and/or gaming data, captured in one or more legally licensed "B&M" casinos, that is provided to a legally licensed "OCO" for real-time, delayed or on-demand play by the RP's located in any global gaming jurisdiction where online casino gambling is legally licensed and regulated.

The remote player(s) may view the real-time video images of the "game deck" 450*a*, comprised of eight (8) ("S52CDs"), being "washed" 450*w* and shuffled by a real game dealer. After the "game deck" 450*a* has been shuffled and "cut", preferably, it will be placed into a CDS w/Scanner 450 that is coupled to the system of the invention, by the live dealer.

The CDS w/Scanner 450 captures the gaming data, the number assigned by the card manufacturer to each ("S52CD") that is preferably imprinted, with machine readable indicia, on the face and/or edges of each card, (as is the card suit, rank, and or value of each card, comprising the inventory of a ("S52CD"); and the delivery sequence of each card removed from the "game deck" 450*a* carried by the CDS w/Scanner 450, to be "burned" or delivered to a game hand; and the number of the ("S52CD), and card suit, rank, value and delivery sequence of each card removed from the CDS w/Scanner 450 will be transferred during real-time, or on demand, to the CPU device of each RP who has logged into the host "OCO's" online casino website; thereby providing the RP's with real-time game play and/or game data captured from one or more types of casino card games, preferably a Baccarat game, played by real people in a legally licensed and regulated "B&M" casino; whereas, the RP's knowing the source of the captured game play and/or gaming data will achieve greater confidence in the integrity of the game play; and/or gaming data, and enjoy a more realistic, exciting and entertaining online casino experience.

The VIDEO 505 button, when activated by the remote player, will call a drop-down menu listing at least one recorded "Welcome Video" the RP may select to view. Each time a remote players visits an OCO's website and selects a particular "B&M" casino's games and/or gaming data for play; a "Welcome Video" recorded by the "B&M" casino, he/she will be presented with the option to play or not play the "Welcome Video".

Preferably, when the "Welcome Video" is played by the remote player a representative of the "B&M" casino providing the "OCO" the card game play and/or gaming data will welcome the remote player to the "B&M" casino by giving the RP, without limitation, of a short verbal history of the "B&M" casino and the City and State where the "B&M" casino is located; and a short background of the "OCO" hosting the online casino website, and the City, State or Country where the OCO's principle offices are located and where the online casino servers are located in an effort to remove any doubts that the remote player may have relative to the integrity of the "B&M" casino providing the game play and/or gaming data, and/or the host "OCO" presenting that game play and/or gaming data for online wagering to the RPs. The remote player may also select and play a Video that will give him/her a virtual tour of the host "B&M" casino; and/or a "link" to the host "B&M" casino's online reservation site; and/or a virtual tour of the "B&M" casino operators and/or OCO's facilities and etc.

Activating the GAME RULES 405*b* button will call a drop-down menu providing the remote players access to the game rules, the game tables Minimum and Maximum betting limits, the number of ("S52CD") comprising the game deck, the deck penetration rule, and without limitation, the house advantage or disadvantage.

Activating the PLAYER SETTINGS 405*c* button will call a drop down menu that will allow the remote player to instruct the online casino software program to use one of the system's three (3) "Expose Card (Peek) Options" (FIG. 4H 500) selected by the RP as his/her Default Option" to expose the PLAYER hand and/or the BANK hand that he/she has placed a wager on for each Baccarat game round played. (In the event that the RP fails to select his/her preferred Default Option, the system will automatically select "Expose Card (Peek) Option 1", the system's RPUI's Default Option.

The RP's will also be able to call the PLAYER SETTING 405*c* buttons drop-down-menu to establish his/her "Session Limits" and/or instruct the system to deal a selected Virtual or On-Demand Baccarat game at a slow, medium or fast speed; and/or the RP's may also, without limitation, use the Player Setting menu to select and/or control the volume, or mute, any audio provided by the system. (i.e. the call of the game hand and/or game rounds, canned background music, the ambient sounds of the play of the game table selected for play, including the voices of the game players and/or game dealer(s), and/or the ambient sounds of the surrounding casino environment; and etc.

Activating the OTHER GAMES 405*d* button will call a drop-down-menu listing all types of online casino games, originating from one or more legally licensed and regulated "B&M" casinos, and/or "OCO" associated with the "B&M" casino and/or "OCO" providing the game content for the online casino game currently being played to the RP.

Activating the TOURNAMENT PLAY 405*b* button will call a drop-down-menu listing all types of casino game "Tournaments", played in a real "B&M" casino, and/or all types of online casino game "Tournaments", originating from one or more legally licensed and regulated "B&M" casinos, and/or OCO's associated with the "B&M" casino and/or "OCO" providing the game content for the online casino game currently being played by the RP.

Activating the HOST OCO 405*f* button will call a drop-down-menu providing the name and address of the "OCO", a link to its privacy policy, a link to its "Dispute Resolution" procedures, Self-Imposed restrictions, Problem Gambling and etc.

Activating the SUPPORT/CONTACT 405*g* button will call a drop-down-menu providing names, addresses, telephone numbers, e-mail address and links for the RP's to get technical support relative to the operation of the host online casino's website; RP's Account including financial information, Dispute Resolution department, Problem Gambling, Session Limits, and links to the host online casino corporate website; and links to the "B&M" casino providing the recorded game content to the host "OCO"; and, without limitation, and links to the government regulatory agency responsible for regulating online casino games in the gaming jurisdiction the RP is located at the time he/she accesses the host online casino operator online casino website.

The Baccarat "Scoreboard", (FIG. 5C 410*a*), can be called at any time by pressing the Scoreboard Button 410 prior to or during the RP's play session or a game round.

Without limitation, a remote player, at his or her leisure, may log into the host OCO's website, select a Baccarat game for play, activate the "Customer Account" button 415 and review his/her "Customer Player Rating History", ("CPRH"), which will provide the RP with access to the Baccarat Scoreboard, (FIG. 5C 410*a*), generated by the OCO's software for each "Particular Shoe" that the remote player has played on the host OCO website. The remote player will have the option to print out one or more of any Baccarat Scoreboards stored within the ("CPRH") file, for each "particular shoe" the remote player has placed a wager on when playing an online casino Baccarat game hosted by the current online casino website.

Display Field 510 displays the name 510*c* of the legally licensed and regulated "B&M" Casino hosting the real-time play of the Baccarat game. Preferably, without limitation, the captured game play and/or gaming data, and/or "audio" of the subject Baccarat game is captured by one or more captured devices, (i.e., CCTV cameras, (which may include CCTV cameras coupled to a Video Teleconferencing, ("VTC"), Network), and/or a CDW w/Scanner 450 or other card scanning device known in the art; and/or Microphones under the control of the "B&M" Casino), coupled to one or more legally licensed and regulated OCO's online casino Baccarat software programs, that may broadcast the captured game play and/or gaming data, and/or "audio" of the Baccarat game; during real-time or on-demand to one or more remote players wagering online.

Display Field 510 also displays the City and Country 510*d* where the "B&M" Casino, hosting the real-time play of the Baccarat game being captured by one or more of the system's capture devices during real-time, is located. Also, displayed within Display Field 510 is the Date, Table number of the game table, (assigned by the OCSD, for security reasons, to conceal the actual number of the game table assigned to it by the host "B&M" casino from the RP's), and the precise Time 510*a* that the current images on display were broadcast to the RP's or recorded.

Preferably, the system software is programmed to calculate, record and display the total number of RP's wagering on the PLAYER hand and the number of RP's wagering on the BANK hand for the upcoming and/or current game round; and the total amount wagered on the PLAYER hand, the BANK hand and the TIE bet, by all of the RP's during the play of each game round; and the game tables OCO's total net WIN or LOSS for each "particular shoe" dealt to the RP's playing at a particular Baccarat table . . . that is broadcast during real-time to the RP's.

Display Field 510*b* displays the total number of RP's wagering on the PLAYER hand 470 for the upcoming and/or current game round; and Display Field 510*e* displays the total number of RPs wagering on the BANK hand 470*b* for the upcoming and/or current game round. Preferably, the total amount wagered on the PLAYER hand, the BANK hand and the TIE bet, by all of the RP's during the play of each game round; and the game tables OCO's total net WIN or LOSS for each "particular shoe" would not be displayed on the RP's client computers display.

Preferably, the total number of RP's wagering on the PLAYER hand and the BANK hand for the upcoming and/or current game round; and the total amount wagered on the PLAYER hand, the BANK hand and the TIE bet, by all of the RP's during the play of each game round; and the game tables OCO's total net WIN or LOSS for each "particular shoe" dealt to the RP's playing at a particular Baccarat table . . . that is broadcast during real-time to the RP's . . . would, without limitation, be displayed on the host OCO's system terminal (s); and on one or more "Administrator Terminals or Displays" (not shown), coupled to the online casino system, located within close proximity to the host "B&M" casino's Baccarat game table providing the game play and/or gaming data and/or audio, for real-time broadcast to the remote players for wagering. Preferably, the "Administrators Terminal or Display" (not shown) would be monitored by the host "B&M" casino's Baccarat game supervisor(s).

When the real-time play of a "B&M" casino's Baccarat game is captured and broadcast live to one or more RP's wagering online it is to the advantage of the host OCO, and the host "B&M" casino operator, to allow the "B&M" casino's Baccarat game supervisors to use an Administrator's Terminal (not shown) to view, during real-time, the number of RPs engaged in the play of the game online and the total amount of their wagers. For example, presuming that at the "B&M" Casino the number of players engaged in the play of the game being broadcast live to the RP is minimal and the amounts wagered are small, the Administrator's Terminal may reveal that two-hundred and thirty-five, (235), RPs are also playing and wagering a total amount of approximately $100,000 per game round.

The game table top 500 includes a discard rack 425 to receive any cards, (not shown), that are dealt from the captured image of the CDS w/Scanner 450 that are "burned" or removed from play when a game round is completed.

The online casino Baccarat software tracks and displays the number of "particular shoes" the RP has participated in during his/her current "play session", and the number of the game round 430 currently been dealt from the "particular shoe". The number of the "particular shoe", and game the game round may be unique to each RP.

The RP's may activate the Player Setting Button 405*c* to call a Session Menu, (not shown), that allows each RP's to enter into the system any time limits he/she wishes to place to restrict the total time he/she may wager on the host OCO site during any online gambling session; or limit the time he/she is allowed to play each day, week, month or year. Whenever, "Session Limit" 435, entered into the system by the RP is achieved, on the completion of the current game round, the RP's play session will automatically be terminated by the system software. At the beginning of the RP's play session a "Session Limit" 435 and timer may be displayed, such as 00:02:00:00 (two hours). As the RP's play session progresses the length of the RP's "Current Session:" 435 will be displayed and the RP's "Session Limit:" 435 will respond by displaying the amount of time remaining before the RP's play session is terminated. Those limits may not apply to "Free Play" or "Tournament Play" online casino games.

At the time a RP enters his/her "Session Limits" into the system he/she must also enter a date preventing the RP from changing his/her self-imposed "Session Limits" prior to the date the "Session Limits" are scheduled to expire and/or be reset. Preferably, the RP will not be able to personally change those setting before the self-imposed date without the assistance of the host OCO "Problem Gamblers" team. The advantage of the "Session Limits" feature is to prevent the RP from becoming a "Problem Gambler"; and/or to assist "Problem Gamblers" in controlling their online gaming habits in the event those habits do become a problem for the RP.

At any time, the remote player may use a mouse, or other input device to, to activate the Customer Account button 415 to call a pop-up screen displaying, without limitation, the remote players financial data relative to the play of the game which may include "Cash on Hand", "Available Credit", "Win or Loss" for the current game session and the remote players Name, Address, Location and other personal information including, but not limited to, the RP's date of birth and gender.

The online casino software is programmed to calculate the percentage of the "game deck" 450*a* that has been removed from the CDS w/Scanner 450 and display that percentage in the Deck Penetration Field, ("DPF"), (FIG. 4K 440*a*). At such time that the current DP Rule 485 ("DPR") is achieved the system will alert the live game dealer and players, and/or the RP's, that upon completion of the current Baccarat game round, the depleted game deck will be removed from the CDS w/Scanner 450, and replaced with a freshly shuffled game deck 450*a*.

Preferably, the "DPR" should be 97% (or 404 Cards) if the Baccarat game deck is comprised of eight standard 52 card decks; whereas when the system software identifies that the "DPR" has been achieved there will be fourteen (14) cards remaining in the CDS w/Scanner 450.

The average number of cards dealt to the PLAYER and BANK hands during a Baccarat game round is 5.5 cards. Therefore, the remaining fourteen (14) cards are more than enough to complete any Baccarat game round in progress at the time the "DPR" is achieved.

Alternatively, the online casino software may be programmed to convert the "percentage" of cards removed from the game deck 450*a*; displayed in the DPF 440, to the number of cards displayed in the CR Display Field 440). At such time that the system software determines that the number of cards remaining in the CDS w/Scanner 450 equals the current DP Rule 485 percentage of the game deck 450*a*, the system will alert the live game dealer, and/or the system software, to complete the current Baccarat game round, remove the game deck 450*a* from the CDS w/Scanner 450, and replace it with a freshly shuffled game deck 450*a*. (The CR Display will be easily understood by the average Baccarat player.)

Preferably, the "OCSD" would include at least one commercially available proprietary software program to analyze the play of each remote Baccarat player to determine the probability that one or more of the RPs may, by illicit means, have obtained prior knowledge of the top card of the game deck, carried by the CDS w/Scanner 450, which he/she may use to identify the "1$^{st}$ Card Advantage" that the PLAYER or BANK hand, or the TIE bet, has to win the upcoming game round.

In the event the system's "1$^{st}$ Card Advantage" software identifies a RP who consistently bets on the PLAYER or BANK hand, or the TIE bet, having the 1$^{st}$ Card Advantage for the upcoming game round, increasing the probability that he/she will overcome the house advantage, the system software may take appropriate counter measures. i.e. 1) restrict the suspect RP to making a specific minimum bet; 2) temporarily suspend the RP from playing Baccarat while the "OCO" and/or Gaming Regulators investigate the possibility of any illicit activity by the RP; or 3) bar the suspect RP from play and invite him/her to play the OCO's Slots.

The system software in accordance with the invention is programmed to activate a color coded display 495 field at the end of each game round to visually, (in addition to the system's audio announcement of the outcome of the game round), alert the RP to the outcome of each completed game round. The color coded display 495 field will preferably turn White when the 1$^{st}$ card from the "particular shoe" 450*a* is removed from the CDS w/Scanner 450 for delivery to the PLAYER hand. When the Baccarat game round is completed; the color coded display 495 field will preferably illuminate GREEN when the Player hand wins the game round; and preferably BLUE when the BANK hand wins the game round; and preferably YELLOW when the score for the PLAYER and BANK hands TIE and the TIE bet wins; and preferably the color coded display field 495 will remain illuminated, (displaying the color designated to identify the outcome of the last game round), until the first card of the next game round is removed from the CDS w/Scanner 450 for delivery to the PLAYER hand; whereas the color coded game round results display 495 will illuminate White.

The 1$^{st}$ Card and the 3$^{rd}$ Card delivered from a real CDS w/Scanner 450, during each Baccarat game round, are always delivered to the PLAYER hand. If the cards are removed Face-Down from the CDS w/Scanner 450 and delivered Face-Down to the game players playing the PLAYER and BANK hands, as they are when playing Midi-Baccarat or Big-Baccarat, once the game player playing the PLAYER hand has exposed the PLAYER hand Face-Up on the game table layout 500*a*; it will be tossed to the game dealer who will position the two cards Face-Up over the areas P1 and P2 which are located within the area 455 imprinted on the game table layout 500*a* that is designated for the PLAYER hand.

Preferably, the online casino software will include "back-end" software, knowing the value assigned to each card dealt from a Baccarat game deck, that will identify "The 1$^{st}$ Card Advantage" or Disadvantage that the PLAYER or BANK hand, or the TIE BET will have during the game round when the value of the 1$^{st}$ Card dealt to the PLAYER hand is known. To assist any OCO's or "B&M" casino's staff, monitoring the play of the game by means of an "Administrative Terminal" or Display" (not shown), the first card dealt to PLAYER, when faced-up, will always be placed in the P1 position; thereby enabling their staff to visually identify the PLAYER hand, the BANK hand or the TIE BET having the 1$^{st}$ Card Advantage for the current game round.

The 2$^{nd}$ Card and the 4$^{th}$ Card delivered from a virtual or real CDS w/Scanner, during each Baccarat game round, are always delivered to the BANK hand. If the graphic images of the cards are dealt Face-Down, as shown in (FIG. 5C 460*bh*), as they are when playing a Midi or Big Baccarat game the 2$^{nd}$ Card will be positioned Face-Down over B1, and the 4$^{th}$ Card will be positioned Face-Down over B2, whereas both B1 and B2 are located in the area 460 imprinted on the game table layout that is designated for the BANK hand. If the game rules requires a 3$^{rd}$ Card to be dealt to the BANK hand it will be positioned Face-Up over P3 which is also located within the designated area 460 imprinted on the game table layout 500*a*.

The designated area for the placement of wagers on the PLAYER hand 470 is identified by the circled letter "P", and the designated area for the placement of wagers on the TIE bet 470*a* are identified by the circled word "TIE"; and the designated area for the placement of wagers on the BANK hand 470*b* are identified by the circled letter "B".

The total amount of the remote player's cash bankroll, excluding any wagers in play, that is available for wagering is displayed in the CASH display field 465.

The total amount of all winning bets, minus any commissions on winning BANK wagers, and the type of winning wager, "PLAYER, BANK or TIE BETS", are displayed in the RP's Win field 465*a*. The amount won, minus any commissions, is added to the CASH display field 465; and if the RP's original bet is also removed from the winning PLAYER, BANK or TIE BET fields; the amount wagered will be restored to the CASH display field 465.

The lowest denomination of the five chips 480 comprising the chips designated for wagering 480 in accordance with the invention is always configured to accommodate the Minimum Bet limit the system, and/or the RP, inputs into the system for the Baccarat game selected for play. The system will automatically assign a denomination to each of the remaining chips, designated for wagering, that will appropriately correspond to the lowest denomination chip, equal to the RP's selected Minimum Bet, to make is simple for the RP to place wagers relative to wagering the game tables Maximum Bet. When playing a live game captured during real-time at a real "B&M" casino, for real-time or on-demand broadcast to the RP's; RP's who have selected the live game for play may have the option to enter their own Minimum and Maximum Table limits, or accept the limits in place at the live game hosted by the "B&M" casino; and broadcast during real-time or on-demand to the RP's.

The RP will press the NEW BET Button 475*c* to clear all bets from the systems betting fields; and the RP will press the SAME BET Button 475*b* to wager the same amount(s) wagered on the just concluded game round, (won or lost), for the upcoming game round; and the RP will press the PARLAY Button 475*a* to parlay a winning bet; and/or the RP will press the SIT OUT Button 475 to observe the play of one or more upcoming game rounds, dealt from the current "particular shoe", without placing a wager.

Preferably, prior to the commencement of a Baccarat game round the RP player will have made a wager on the PLAYER or BANK hand or a TIE bet. However, if the host OCO is to follow the practices offered by real bricks-and-mortar casinos to their Baccarat players, (they will allow the game round to be dealt without a wager), who may request, and expect, a "free hand" to be dealt occasionally; the "OCO" will allow its RP to use the SIT OUT Button 475 to observe the play of one or more game rounds without placing a wager.

Any bets made by the remote player prior to the commencement of the upcoming game round will be removed from play when the New Bet Button 475*c* is pressed. The original amount wagered on a winning PLAYER, BANK or TIE hand will remain on the winning betting field, (PLAYER 470, TIE 470*a*, or BANK 470*b*), and any amounts won, minus any commissions, will be added to the RP's CASH display field 465 if the Parlay Button 475*a* was not activated at the time the original bet was made; and/or if the RP has not activated the New Bet Button 475*c* prior to the removal of a first card from the virtual CDS 445 for delivery to the PLAYER hand.

The Parlay Button 475*a* when activated calls a drop-down-menu (not shown) that allows the remote player to instruct the system to parlay a winning wager one or more times, or until the winning parlay bets exceed the game table's "Maximum Bet" limit. In the event the parlay feature is activated and the original PLAYER, BANK or TIE wager reaches the "Maximum Bet" limit the next game round(s) the system will add any winning wagers, that exceed the "Maximum Bet" limit, to the CASH display field 465; and wager the game tables "Maximum Bet" for the upcoming game round; and continue to do so until the selected PLAYER or BANK hand's parlay bet loses.

During a game round the RP can press the Same Bet Button 475*b* to cancel the Parlay feature; whereas if the RP's selected betting field wins, the amount of the RP's wager for the next game round will be identical to the winning rounds original bet; and the bet for the upcoming game round will remain as a wager on the same betting field that produced the winning wager. At the end of each game round the RP can cancel the parlay feature and by pressing the New Bet Button 475*c*. [Note: The Minimum and Maximum Bet limits for the TIE bet is typically smaller than the Minimum and Maximum Bet limits for wagers on the PLAYER and BANK hands.]

The Deck Penetration Rule for the current card game being played by the remote player is always on display for each "particular shoe", or game deck, in the DP Rule display 485.

The remote player may use his computers "mouse", or other input device, to drag any one of the gaming chips 480 imprinted with a specific numeric value for placement as a wager on the (P)layer 470, (T)i.e. Bet 470*a* or (B)ank 470*b* hands. Each time the RP places a wager it will be deducted from amount displayed in the CASH display field 465.

The system software will automatically change the value of the gaming chips 480 to accommodate any Minimum or Maximum Bet limits each RP may enter into the system by means of pressing the Bar Menus 405 Table Limits Button to call a drop down menu, (not shown), to allow each RP to enter his/her own Minimum and Maximum Bet limits for his/her current playing session; whereas those limits must be within a Minimum and Maximum Bet range pre-programmed into the online casino software by the OCSD.

If the play of a live Midi or Big-Baccarat game, hosted by a real "B&M" casino, is captured and broadcast during real-time, delayed, or on-demand for play by one or more RP's, the RP will be able to see the images of the cards dealt to the game hands during each game round. The cards dealt to the PLAYER and BANK hands may be visible to the RP as seen from an overhead view of the game table 500 captured by one or more CCTV cameras coupled to the online gaming system, and/or one or more cameras coupled to a ("VTC") network, that is coupled to the online gaming system; whereas the captured video images, preferably, will be transmitted to the RPs by means of a "Virtual Private Network", ("VPN").

Alternatively, the cards dealt to the PLAYER and BANK hands may also be visible to the RP's as seen from an overhead view of the game table 500 captured by one or more dedicated CCTV cameras coupled to the online gaming system, and/or one or more cameras coupled to a ("VTC") network, that is coupled to the online gaming system; whereas the captured video images of the actual Baccarat game players, present at a Baccarat game table located in a real "B&M" casino, designated by the live game dealer to play, (expose), the PLAYER and BANK hands for each particular game round, preferably, will be transmitted to the RPs by means of a "Virtual Private Network", ("VPN") and displayed, preferably on a "split screen" 455*vf* and 460*vf* overlaying the captured overhead view of the live game to be broadcast to the RP's during real-time, delayed, or on-demand.

The system software in accordance with the invention is programmed to receive, without limitation, preferably the output of the CDS w/Scanner, (the gaming data), or other card scanning device, used by the host "B&M" casino's Baccarat game table to capture the gaming data specific to the play of a particular Baccarat game, captured by one or more of the system's capture devices for real-time, delayed or on-demand broadcast, by wired or wireless means, to one or more authorized RP's who have logged into an OCO's online casino's website and selected that particular Baccarat game table's captured sensory game play data; and/or gaming data for real-time, delayed or on-demand play for the RP's current online gaming session.

Preferably, without limitation, the captured game data will include; 1) the name and location of the "B&M" casino hosting the real-time play of the Baccarat game captured by one or more of the system's captured devices; and 2) the number assigned to the Baccarat game table by the host "B&M" casino; (preferably the actual casino game table number, for security reasons, displayed on the RP's display terminal will be replaced by a coded table number, recorded within the system software that is known to be the pseudo table number of the actual table number assigned to the game table by the host "B&M" casino); and the number assigned to the CDS w/Scanner 450 by its manufacturer and/or the host "B&M" casino; and 3) the number of available seats at the game table; and 4) the number of each game table seat occupied by a live game player during the play of each Baccarat game round; and 5) the amount wagered on the PLAYER hand, the BANK hand, or the TIE BET by each Baccarat player seated at the host "B&M" casino's game table during the play of each Baccarat game round dealt from each "particular shoe"; and 6) the date and time that each action related to the play of the game being captured occurs, (including the Shuffle and placement of the freshly shuffled "game deck" 450*a* into the CDS w/Scanner 450); and 7) the disposition of each card removed from the "game deck" carried by the CDS w/Scanner to be "burned" or dealt to the PLAYER 455 or BANK 460 hand, including the number assigned by the card manufacturer to each of its ("S52CD"), the number of cards removed from the "game deck" 450*a* carried by the CDS w/Scanner 450, and the card value, card suit, card rank and the delivery sequence, of each card removed from the CDS w/Scanner to be "burned" or delivered to the PLAYER or BANK hand during the play of each game round dealt from each "particular shoe" or "game deck"; and 8) the date and time that the 1$^{st}$ card was removed from the game deck; and 9) the date and time that the 1$^{st}$ Card dealt to the PLAYER hand, during each game round, was removed from the CDS w/Scanner; and 10) the date and time that the last card, completing each game round, was removed from the CDS w/Scanner and delivered to the PLAYER or BANK hand; and 11) the final scores for the PLAYER and BANK hands at the end of each game round; and 12) the outcome of each Baccarat game round, i.e. the winning PLAYER or BANK hand; or the PLAYER and BANK hands that TIE.

Alternatively, the captured Baccarat gaming data may be merged with the captured ambient sounds of the live game played by real people in a "B&M" casino's environment, (excluding any captured video game play data), for broadcast, by wired or wireless means, to the remote player during real-time, delayed or on-demand, using a multi-media data feed. Whereas, the methods of the current invention used to capture the game and/or gaming data and the ambient sounds of the play of a Baccarat game will provide a very unique and cost effective means for the host "B&M" casino operator; and/or the "OCO" to capture the game and/or gaming data and the interest, and potential play of its online casino Baccarat games by remote Baccarat game players engaging in the play of the game, by wired or wireless means, from a location remote from the play of a live Baccarat game hosted by a real "B&M" casino.

Figure 5A:
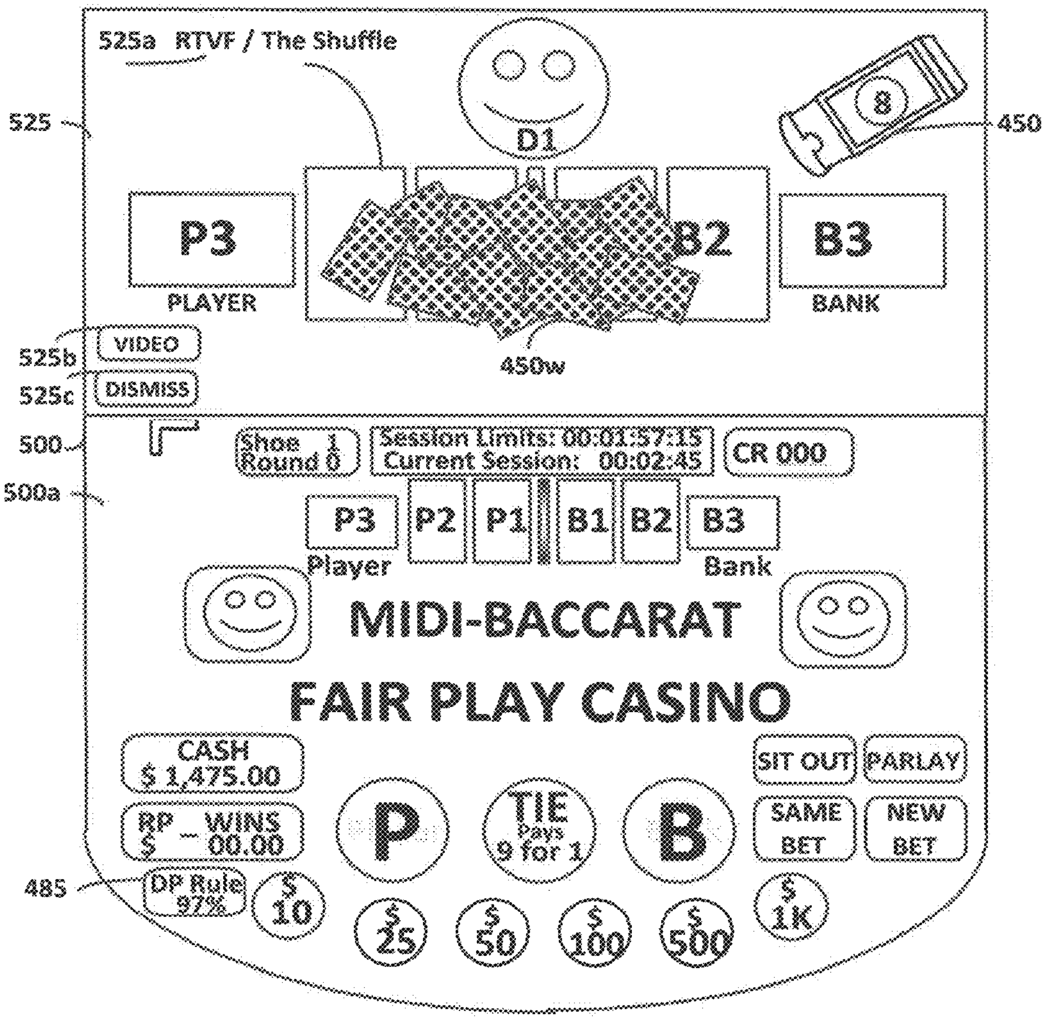
FIG. 5A is an illustration of an overhead view of the captured CCTV image of a real Midi-Baccarat Game Table, with overlaying ("RPUI") and optional enhanced display for images captured by the online casino system, in accordance with the invention.

FIG. 5A In accordance with the invention is an illustration of a screen shot of an overhead view of a real Midi-Baccarat game table top, 500 captured by one or more system CCTV cameras or "VTC" cameras depicting an enhanced view of a Baccarat game procedure that is fundamental to the play of the game.

The RP may uses the Bar Menu's (FIG. 5 405) VIDEO 505 Button to call the "Video Selections" drop-down-menu (FIG. 5E) to select, without limitation, one or more pre-recorded videos; and/or one or more real-time videos, related to the play of the selected Baccarat game, captured by the systems video and audio devices; whereas the captured video images are available for display in the systems enhanced Video display field 525. The RP's may activate the DISMISS 525*c* Button to dismiss the enhanced Video display field 525. The "B&M" casino operators and/or the OCO's Deck Penetration Rule 485 is always displayed.

Without limitation, preferably, the online gaming system's ("RPUI") is coupled to one or more CCTV cameras and/or "VTC" web-cameras controlled by the host "B&M" casino's surveillance room security cameras "Control Panel", (not shown), which is programmed to remotely control one or more cameras dedicated to capturing and recording various aspects of the real-time play of casino table games and/or the casino environment; which can be broadcast over an intranet, an extranet, a virtual private network ("VPN"), a cell network, a Video Teleconferencing network, ("VTC"), a non-TCP/IP-based network, any LAN, WAN, or the like including the WWW, to an unlimited number of RPs CPU devices connected to the host OCO's online casino website, in accordance with the invention.

The RP's has selected Video number three (3) (3. Dealer Station|The Shuffle) to be displayed within the Enhanced Display Field 525; which, when called, is positioned over the captured image of the Baccarat game table 500 during the play of the game. The example Video currently displayed 525*a* is the Real-Time Video Feed ("RTVF"), captured by a system camera dedicated to capturing a close-up overhead view of the game dealer D1 in charge of the game, the "game deck", the CDS w/Scanner 450, shuffling, and loading the shuffled "game deck" into the CDS w/Scanner, delivering the PLAYER and BANK hands, Face-Down, to the game player, positioning the game hands, once exposed by the game player (s), Face-UP, in the designated areas for the PLAYER hand 455 and the BANK hand 460 imprinted on the game table layout (FIG. 5 500*a*).

In the example Enhanced Video Display 525 the game dealer D1 is engaged in executing a first procedure, "washing" 450*w* the game deck, before restacking the "washed" game deck and then proceeding to Shuffle it prior to placing it in the CDS w/Scanner. Note: When the eight (8) packaged ("S52CD") decks, that typically comprise a Baccarat "game deck", are removed from their packaging they are spread by the game dealer(s), Face-Down, on the game table top. The game dealer then places his/her hands, palms down, on top of the spread cards and moves his/her hands in a circular motion; thereby, co-mingling, "washing the cards".

Figure 5B:
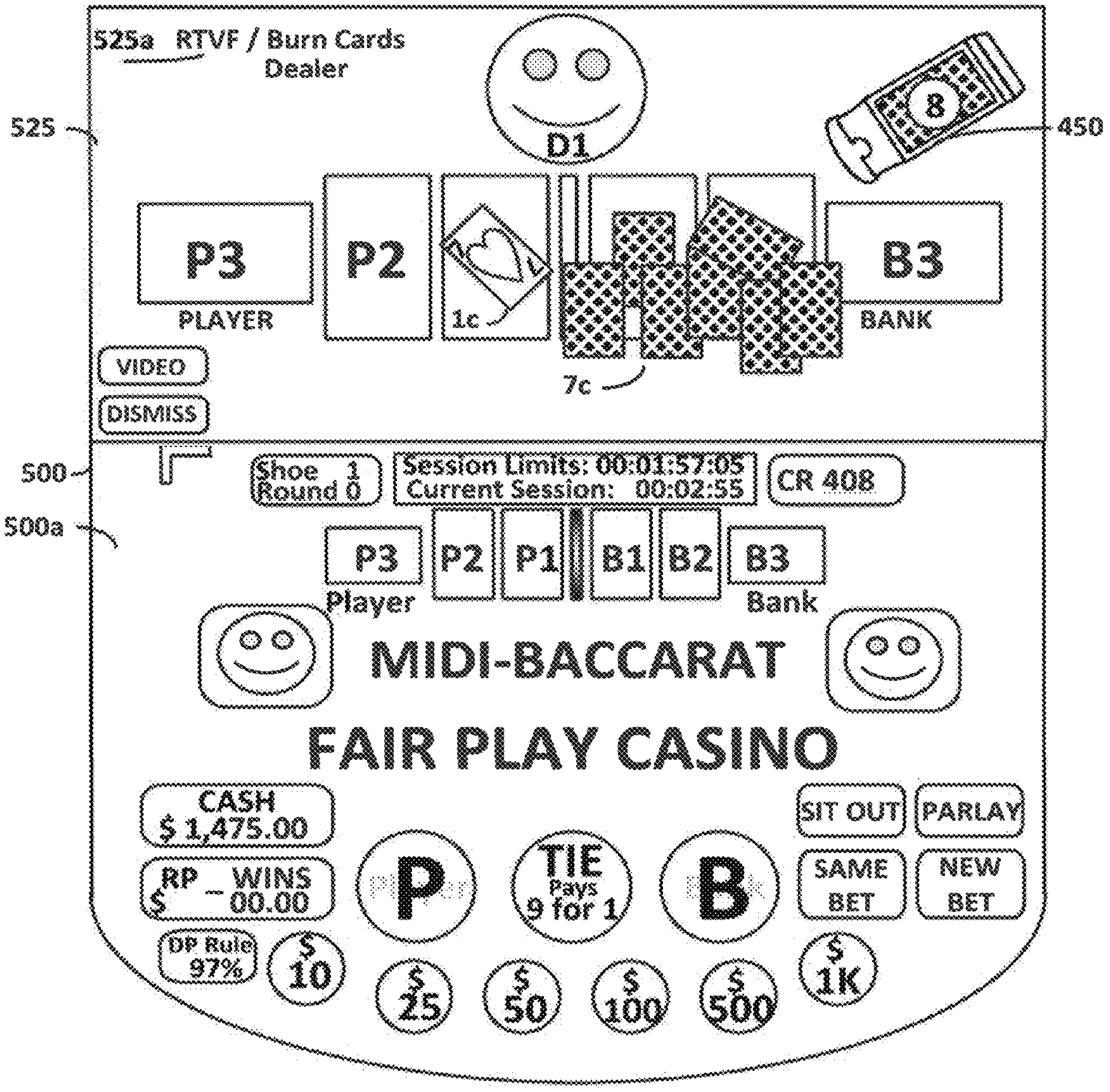
FIG. 5B is an illustration of an overhead view of the captured CCTV image of a real Midi-Baccarat Game Table, with overlaying ("RPUI") and optional enhanced display for images captured by the online casino system, in accordance with the invention.

FIG. 5B In accordance with the invention is an illustration of a screen shot of an overhead view of a real Midi-Baccarat game table top, 500 captured by one or more system CCTV cameras or "VTC" cameras depicting an enhanced view of a Baccarat game procedure that is fundamental to the play of the game.

The ("RTVF") 525*a* represents the real-time image captured by a dedicated system CCTV camera and/or "VTC" camera focused on the game dealer D1 and the game table top 500. The "game deck" has been shuffled and placed in the CDS w/Scanner 450. The game dealer removes the 1$^{st}$ Card from the CDS w/Scanner and faces it up 1*c* on the game table top. The cards numeric value is seven (7). Therefore, according to the Baccarat game rules the game dealer will remove a number of cards (7) from the CDS w/Scanner 450, Face-Down, equal to the card value of the 1$^{st}$ Card 1*c* faced up on the game table top 500. On removal of the additional seven cards 7*c* from the CDS w/Scanner 450 the game dealer will pick up the 1$^{st}$ Card 1*c* and place it, Face-Down, with the other seven cards 7*c* removed from the CDS w/Scanner 450; and then pick up all of the Face-Down cards from the game table top 500; and, without exposing any of the cards to the game players, place them, Face-Down, in the game tables Discard Rack 425. The game dealer is now prepared to deal the first game round from the CDS w/Scanner ask the game players to place their bets; i.e., "PLACE YOUR BETS PLEASE".

Figure 5C:
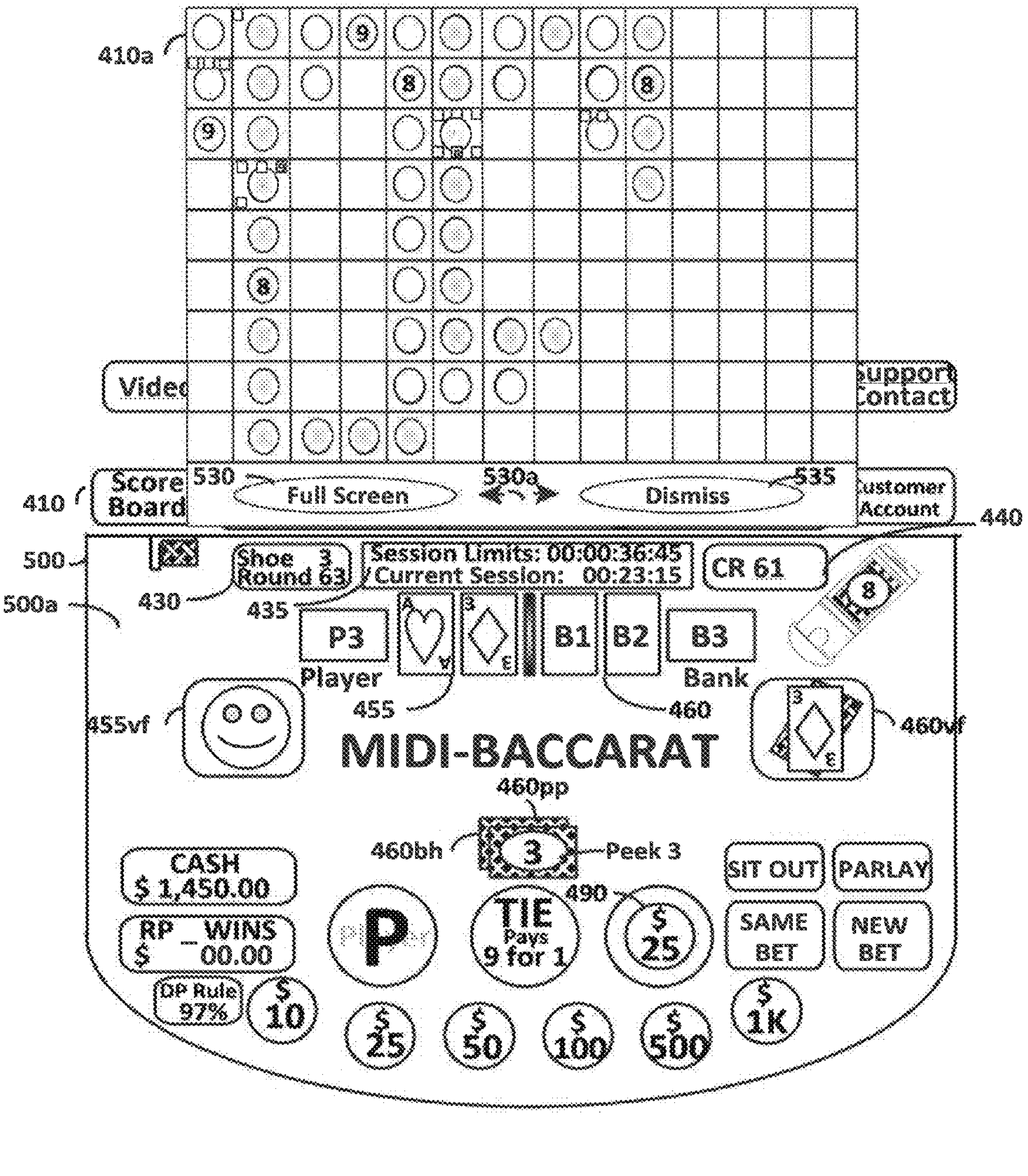
FIG. 5C is an illustration of an overhead view of the captured CCTV image of a real Midi-Baccarat Game Table, (with overlaying ("RPUI; depicting one or more aspects of the progress of the play of the game, which includes the online casino system's Baccarat Scoreboard that is common to all Mini, Midi and Big-Baccarat games, in accordance with the invention.

FIG. 5C is in accordance with the invention an illustration of a screen shot of an overhead view of a real Midi-Baccarat game table top, (with the system's ("RPUI") overlaying the real-time captured video image of the "B&M" casino's ("MBGT") top 500), depicting one or more aspects of the progress of the play of a Midi-Baccarat game round, including a computer generated SCOREBOARD 410*a*, that is common to all types of Mini, Midi or Big-Baccarat games.

Shoe 3, Round 63 430. The RP's current Session Limit 435 ends in 36 minutes and 45 seconds; as he/she has used 23 minutes and 15 seconds 435 of his/her self-imposed daily session limit of one-hour. The number of Card Remaining 440 in the depleted "game deck" is sixty-one (61).

The RP has activated the SCOREBOARD 410 Button to call and display the system's SCOREBOARD 410*a*. If the RP wishes the scoreboard display to enlarge; he/she will activate the FULL SCREEN 530 Button; and if the RP wishes to dismiss the scoreboard display he/she will activate the DISMISS 535 Button; and if the number of winning PLAYER and BANK hands, comprising a "Run", as recorded in the vertical columns of the SCOREBOARD 410*a* exceeds the maximum number of vertical columns displayed; the RP player may use the Drag Arrows 530*a* to drag the SCOREBOARD 410*a* Left or Right to expose any vertical columns hidden from the RP's view.

The RP has placed a wager 490 on the BANK hand. The PLAYER hand has been exposed and placed, Face-up, in its designated area 455 imprinted on the game table layout 500*a*; and the BANK hand 460*bh*, originally delivered, Face-Down, to its designated area 460 after the PLAYER hand 455 has been exposed, is automatically moved to the Peek Position 460*pp*; and as shown the RP has select Peek Option 3 Peek 3 to expose the BANK hand 460*bh*.

In accordance with the invention the game dealer has used a, wired Keyboard (FIG. 6A 610) or wireless Keyboard (FIG. 6A 610*a* or 610*b*), coupled to the host "B&M" casino's surveillance room security cameras' "Control Panel", (not shown); which is programmed to remotely control one or more cameras dedicated to capturing and recording various aspects of the real-time play of casino table games and/or the casino environment; which can be broadcast over an intranet, an extranet, a virtual private network ("VPN), a cell network, a Video Teleconferencing network, ("VTC"), a non-TCP/IP-based network, any LAN, WAN, or the like including the WWW, to an unlimited number of RPs CPU devices connected to the host OCO's online casino website.

Whereas, the game dealer has used the system's Keyboard, (i.e. FIG. 6A 610), to communicate with the host "B&M" casinos surveillance room security cameras' "Control Panel", instructing the "Control Panel" (not shown) to focus the appropriate video camera on the live player seated in a particular Baccarat game table's seat, (that the game dealer has input into the system of the invention by means of the Keyboard, (i.e. FIG. 6A 610)), to capture and display the image of the live player 455*vf* designated by the game dealer to play the PLAYER hand; and/or the image of the live player, and/or his/her game hand 460*vf*, designated by the game dealer to play the BANK hand. Preferably, the images of the live game players designated to play the PLAYER hand 455*vf* and/or the BANK hand 460*vf* will be captured and displayed on a "split screen" overlaying the captured image of the live game table top 500 displayed on the RP's CPU device's display.

Figure 5D:
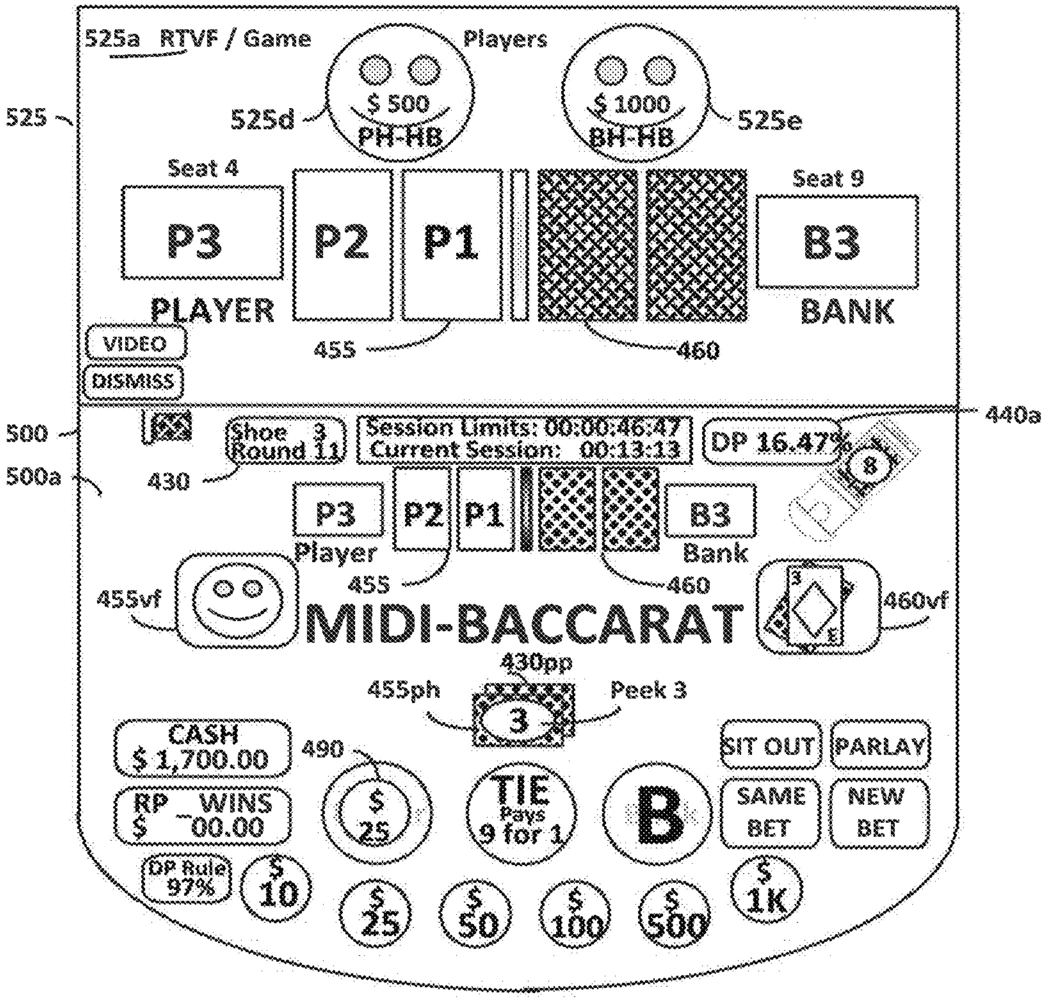
FIG. 5D is an illustration of an overhead view of the play of a real Midi-Baccarat game table top, captured by one or more system CCTV cameras and/or "VTC" web-cameras coupled to the system of the invention; including an enhanced display for viewing selected CCTV images of various aspects of the play of the game and/or the casino environment, in accordance with the invention.

FIG. 5D The play of Shoe 3|Round 11 430 is in progress. The RP has placed a wager 490 on the PLAYER hand; and the Deck Penetration Display field 440*a* informs the RP that 16.47% (69 Cards) of the cards comprising the "game deck" 450*a* has been removed from the CDS w/Scanner 450; and the computer generated images, ("CGI") of the PLAYER hand 455 has been delivered, Face-Down, to the Peek Position 455*pp*; and the ("CGI") of the BANK hand has been delivered, Face-Down, to its designated position 460 imprinted on the game table top's layout 500*a*; and the captured video image, ("CVI"), of the live game player 455*vf*, (or his/her Avatar), designated to receive and play the live game's PLAYER hand; and/or the "CVI" of the live player designated to receive and play the live game's BANK hand, and/or the "CVI" of the actual BANK hand 460*vf* are displayed on a "Split Screen" overlaying the real-time "CVI" of the actual game table top 500 with layout 500*a*.

The enhanced Video Display Field 525 currently displays the RTVF of the "CVI" of the live player 525*d*, present at the host "B&M" casinos Baccarat table that is being captured by the online gaming systems capture devices for real-time, delayed or on-demand broadcast to the RPs in accordance with the invention, who, having placed the highest wager on the PLAYER hand for the upcoming game round, will be designated by the game dealer to receive and play the PLAYER hand; and the RTVF of the "CVI" of the live player 525*e*, present at the host "B&M" casinos Baccarat table that is being captured by the online gaming systems capture devices for real-time, delayed or on-demand broadcast to the RPs in accordance with the invention, who, having placed the highest wager on the BANK hand for the upcoming game round, will be designated by the game dealer to receive and play the BANK hand. Preferably, the images of the live game players designated to play the PLAYER hand 455*vf* and/or the BANK hand 460*vf* will be captured and displayed on a "split screen" overlaying the captured image of the live game table top 500 displayed on the RP's CPU device's display. Preferably, the "CVI" images of the live game players designated to play the PLAYER hand 525*d*, and the BANK hand 525*e* will be captured and displayed on a "split screen" within the Video Display Field.

The enhanced Video Display Field 525 also displays an enhanced view of the system's ("RPUI") areas designated for the PLAYER hand 455; and the BANK hand 460.

Figure 5E:
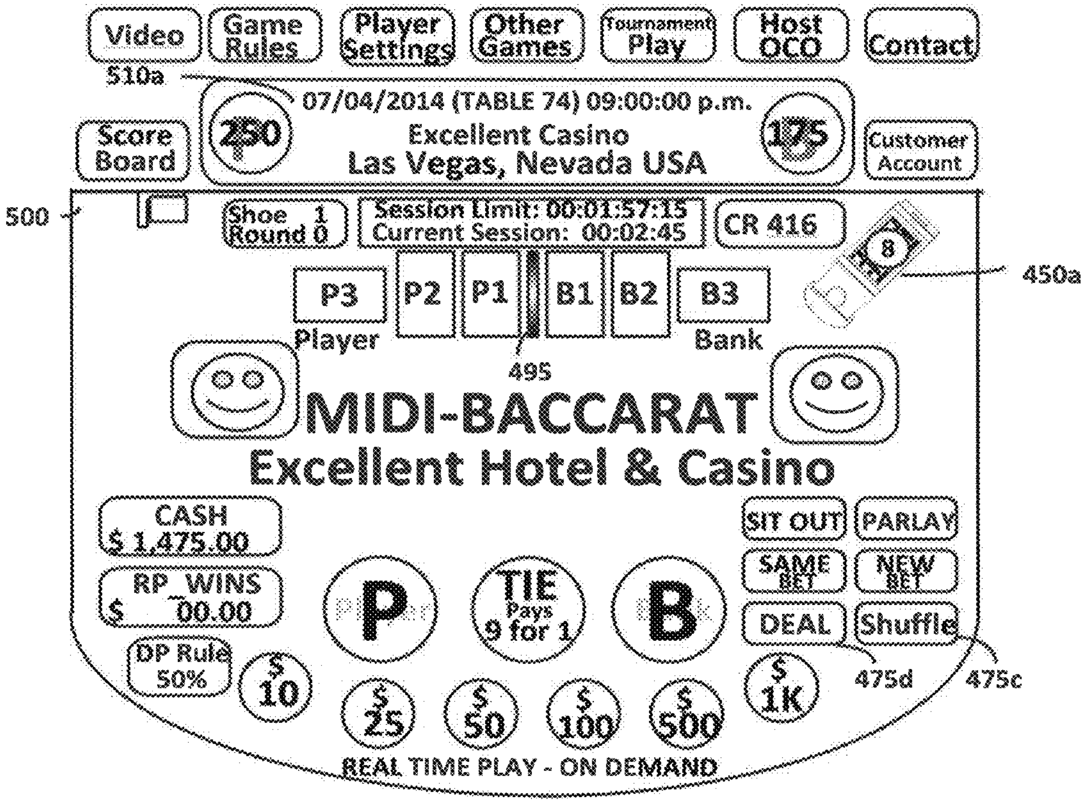
FIG. 5E is an illustration of an overhead view of the captured CCTV image of a real Midi-Baccarat Game Table, (with overlaying ("RPUI; played ON-DEMAND; whereas the ("RPUI") has been modified by the addition of the "DEAL" and "SHUFFLE" buttons, in accordance with the invention.

FIG. 5E The system's ("RPUI") of (FIG. 5) is used by a RP to engage in the play of a real Baccarat game, broadcast during real-time to the RP includes Sit Out 475, Parlay 475*a*, Same Bet 475*b*, and New Bet 475*c* Buttons. When the captured real-time play of a Baccarat game is played on-demand; Deal 475*d* and Shuffle 475*c* Buttons are added to the ("RPUI"); thereby providing a means that will allow the RPs to deal the game hands at their own pace; and to allow the RP to shuffle the captured inventory of the real-time game deck, available for play on-demand by an unlimited number of RPs, at will before the system's Deck Penetration Rule is achieved. This would be true for the game deck shuffled by the RP. When the RP, playing an on-demand game, shuffles the original inventory of the game deck captured from a real-time game played by real people in a real "B&M" Casino, the inventory of the reshuffled game deck will be unique to that RP's CPU.

FIG. 5F The Bar Menu's (FIG. 5 405) VIDEO 505 button is used to call the "Video Selections" drop down menu; specific to the real time broadcast of a Baccarat game, captured by a legally licensed and regulated "B&M" casino's; and/or OCO's CCTV cameras and/or "VTC" web-camera(s), coupled to the Online Casino System, in accordance with the invention.

The host "B&M" Casino and/or "OCO" may choose one or more of the "Video Selections" to be the default "Video Selections", for play prior to the commencement of each the RP's play session; and/or during the play of the game. Each RP may select one or more options for display on/his her CPU display in the enhanced display area (FIG. 5A 525) as disclosed in the invention. For example, the remote player calls the "Video Selection" menu and selects Option 1; a WELCOME VIDEO, then the first time a registered RP visits the host OCO's online casino website and selects a game for play, a pre-recorded "introduction video" will automatically play a short welcoming the RP to the site and, preferably, a company spokesman will provide the RP with a brief background of the host "B&M" Casino and/or OCO.

Option 2; HOTEL-CASINO VENUES and/or Amenities'|"Option 2" In the event the RP has selected the play of a game broadcast to the RP's during real-time, at any time prior to or during the play of the game, the RP may choose to display and view of the host “B&M” Casinos Venues and Amenities available to the RP should he/she choose to visit the host “B&M” Casino.

Option 3. The DEALER STATION|The SHUFFLE|A RP, (engaged in the play of a game, hosted by a real “B&M” Casino, that is broadcast to the RP's during real-time), to validate the integrity of the game may select “Option 3” to have a real-time over-head view of the game dealers work station, enabling the RP to view the “shuffling” of the game deck, the “cut” and placement of the game deck in the CDS w/Scanner, and the dealer's removal or any cards from the CDS w/Scanner to be “burned” or delivered to a PLAYER or BANK hand; and other actions taken by the game dealer during the play of the real-time game.

Option 4. OVERHEAD VIEW OF THE GAME TABLE|All legally licensed “B&M” Hotels & Casinos in most gaming jurisdiction are required by gaming regulators to capture this view of their game tables, while complying with privacy concerns of the players.

Option 5. SEAT(S) of LIVE CUSTOMERS PLAYING the PLAYER or BANK HANDS|Each game player seated at a real game table seat has a designated PLAY AREA (FIG. 6 20*b*). The RP may select Option 5; which will instruct the system software to display an angled downward overhead frontal view of the game player, selected to play the PLAYER or BANK hand, and the images of game player “peeking” at and exposing the game hand. That image may also be displayed on a “split screen”, (FIG. 6A 455*vf* or 460*vf*) overlaying the captured overhead view of the game table where the play of the game is being conducted.

Option 6 ASCENDING ACTIVE SEAT DISPLAY SEQUENCE|A CCTV, preferably a HD “PTZ” camera, controlled by the “B&M” casino's surveillance room's “CCTV Control Panel” will be programmed to continuously capture an image of each active game table seat's play area, (FIG. 6 20B), in ascending order, (1-15), again, and again; whereas the systems “CCTV Control Panel” will be programmed to capture a designated area, (i.e. 2-3 feet) surrounding the live player, whereas the camera will pause at each active seat for (x-seconds) and then move on to the next active seat and etc., throughout the play of the game. [In the event any live player objects to his/her image being publicly broadcast to the RP's, (other people), once that objection is noted, if the live players image is displayed outside of the casino surveillance room, (excluding any required display by gaming regulators), the actual image of the live player will be “screened out” or replaced with an “Avatar”.

Option 7 SURROUNDING CASINO ENVIRONMENT|The RP, playing a Baccarat game played in a real “B&M” Casinos, that is captured and broadcast during real-time to the RP's may select Option 7 to instruct the system software to broadcast and display the images and ambient sounds of the casino environment on the RP enhanced display (FIG. 5A 525) as the RP engages in the play of the selected game broadcast to the RP during real-time.

Option 8 VTC SPECIAL EFFECTS|Because of the high wagers casinos allow Baccarat players to wager on the game hands; when the play of a live Baccarat game, captured by VTC Network web-cameras, may be broadcast to a small number of RP's, capable of placing large wagers, it is feasible that it would be more than cost effective to have a camera operator present in the Host “B&M” casino, to capture unique images of the play of the game, game players or the casino environment; for limited broadcast over a “VPN” to a select group of RP's who have accessed the real-time play of the game by means of a VTC Network. (Preferably, the output of VTC Network Web-Cameras may be accessed by any VTC Network provider using an open VTC Network platform.)

Option 9 VTC PUBLIC Networks|When the play of a live Baccarat game, captured by VTC Network web-cameras, is broadcast to an unlimited number of RP's it may not carry the output of any “special effect” cameras designated for broadcast to a select group of “high rollers” invited to engage in the remote play of a particular private game; and/or public game hosted by a real “B&M” Casino and/or “OCO”.

Option 10 VTC PRIVATE|More than one select groups of remote players may access the identical game tables VTC and/or CCTV cameras output, whereas each select group may be using a different VTC Network provider to access and engage in the play of a real-time Baccarat game hosted and captured and broadcast during real-time by the host “B&M” Casino and/or “OCO”, in accordance with the current invention.

FIG. 6 is a top view of an Intelligent Big-Baccarat game table, in accordance with the invention, that is coupled to the “Online Casino System” 30, and Security CCTV Camera(s) 15, GamePlay VTC WebCamera(s) 20, GamePlay CCTV Camera(s) 25 and the host “B&M” Casino's Security CCTV Control Panel 15*a*, used to capture the live play of a Big-Baccarat game, played by real-people, at a real Big-Baccarat game table located in a real, legally licensed and regulated “B&M” Casino; for real-time, delayed or on-demand broadcast, by wired or wireless, over an intranet, an extranet, a virtual private network (“VPN), a cell network, a Video Teleconferencing network, (“VTC”), a non-TCP/IP-based network, any LAN, WAN, or the like including the WWW, for play by an unlimited number of RPs, using a CPU device connected to one or more host OCO's online casino websites.

Embedded in the Intelligent Baccarat Game Table, (“IGT”), 600 top is an electronic Keyboard 630, which is coupled to the Online Gaming System 30, (“OGS's), Security CCTV Control Panel, (“SCP”) 15*a*.

Also, more than one microphone 45 will be strategically embedded in the “IGT” top 600 beneath the “IGT” layout 605 to record the ambient sounds of the game players seated at the game table. The “OGS's”30 software game module may also be programmed to activate those microphones closest to the game player occupying the game table seats that the game dealer D1, using keyboards 630 or 630*a*, has designated to receive the PLAYER or BANK hand for the current game round. The “OCS's) 30 software game module may be programmed to mute one or all of the “IGT” microphones located in close proximity to the game table seat designated to receive the PLAYER or BANK hand.

The “OCS's” software game module, using the recorded time that the PLAYER and BANK hands were exposed during the play of each game round, can program the real-time, delayed or on-demand game data broadcast to the RP's, which will include the “OCS's) (“RPUI”) that allows the RP's to expose the face-down graphic images of the cards dealt to the RP players wagering on the PLAYER or BANK hand; whereas the “OGS's) software's game module uses the output, the card delivery game data, captured by the CDS w/Scanner 450 to generate a graphic image of each card dealt to the live players' PLAYER or BANK hand during each game round. Therefore, in the event that a RP have not exposed his/her computer generated PLAYER or BANK hand within the time, known by the system software, that the live customer playing the PLAYER or BANK hand took to exposed his/her game hand; the system software will automatically expose the RP's respective PLAYER or BANK hand's cards.

Imprinted on the game table layout 605 within an area designated for each seat available at the game table 600 is a "Play Area" 20*b* that includes a designated area for the live player to place a bet on the PLAYER 20*c*, or BANK 20*d* hand winning; and/or that the score of the game hands will TIE 20*e* at the end of the upcoming game round. Also, imprinted on the game table layout 605 are designated areas for game dealer D1 to place the faced-up PLAYER hand 25*a* and the faced-up BANK hand 30*a* and segmented areas 65 and 70 for game dealers D2 and D3 to places the "lammer chips" used to post the running total of any commission, each game player occupying a particular seat at the game table 600, may owe the house on winning BANK hand wagers made during the play of each game round dealt from a "particular shoe" (game deck) carried by the CDS w/Scanner 450. Cut into the game table top 600 and layout 605 is a card discard slot 55, a "Tip Slot" 50, and a Cash Drop slot 60. A gaming chip rack 80 is seated within an opening cut into the game table top 600 and layout 605; and a "lammer" commission chip rack 75 is attached to the game table top 600.

FIG. 6A. The real-time sensory game play data and/or game and/or gaming data captured, by the Online Casino System's 30 capture devices, from the play of a real Big-Baccarat game, played by real people, during real time, at a real Big-Baccarat table, located in a real legally licensed and regulated "B&M" Casino is available for real-time, delayed and/or on-demand broadcast to the remote players, by wired or wireless means, over an intranet, an extranet, a virtual private network ("VPN"), a cell network, a Video Teleconferencing network, ("VTC"), a non-TCP/IP-based network, a Television Broadcast; and/or any LAN, WAN, or the like including the Internet or the WWW, in accordance with the invention.

The Online Casino System's 30 REMOTE PLAYERS USER INTERFACE overlaying the captured image of the Intelligent Big-Baccarat Table, ("IBBT"), 600 is essentially a duplicate of the REMOTE PLAYERS USER INTERFACE overlaying the Midi-Baccarat table (FIG. 5 500). However, the ("RPUI) overlaying the ("IBBT") 600 includes two (2) additional input buttons: the BAR MENU 405 button, (a toggle button that calls or dismisses the BAR MENU), and the VTC-CCTV Display 525 Button, (a toggle button that calls or dismisses the Video Selections (FIG. 5F) drop-down-menu. The Customer Account Button (FIG. 5 415) has been relocated within the ("RPUI") as Customer Account Button (415*a*).

The Intelligent Big-Baccarat Game Table's (FIG. 6), as seen on the RP's CPU display monitor, Display field 510 covers the Keyboard (FIG. 6 630 & FIG. G). Displayed in Display field 510 is the Date, Table Number, and local Time 510*a*, City and Country 510*d* and the name of the host "B&M" Casino 510*c* at which the real-time play of the game is being recorded and broadcast to the remote players. The number of customers wagering on the PLAYER hand 510*b* and the BANK hand 510*e* for the upcoming or current game round is also displayed. Display field 430 displays the number of "the particular shoe" and game round, (which are unique to each RP). Each RP's self-imposed time limits, (i.e. 00:02:00:00), are displayed in the Session Limits field 435; and the number of cards remaining to be dealt from the CDS w/Scanner 450 is displayed in the Card Remaining field 440.

The amount of the RP cash available for wagering is displayed in the CASH Display field 465; and all amount wagered for the upcoming game round are displayed in the designated areas, for wagers on the PLAYER hand 470, the BANK hand 470*a* and the TIE BETS 470*b*, imprinted on the game table layout 605. The RP will use his/her CPU's "mouse" or other method to place his/her wagers by means of the seven (7) Gaming Chip 480 buttons; or the RP may use the PARLAY 475*a* button to parlay a winning wager; or the SAME BET 475*b* button to wager the same amount wagered on the PLAYER or BANK hand, during the previous game round, for the next game round; or the RP may use the NEW BET 475*c* button to place a fresh bet for the upcoming game round. In the event the RP does not wish to place a wager for the upcoming game round he/she will activate the SIT OUT 475 with his/her input device. The net amount won on winning wagers is displayed in the RP_Wins 465*a* field. The host "B&M" Casino's Deck Penetration Rule is displayed in the DP Rule 485 field.

The cards dealt to the customers playing the PLAYER and BANK hands, when faced-up by the game player is positioned by the game dealer, face-up, in the designated areas for PLAYER Hand 455 and the BANK Hand 460. When the last card delivered to the PLAYER or BANK hand has been faced-up, after a short delay to allow the game dealer to call the results of the game round, the tri-color coded Game Round Indicator Display 495 field will illuminate GREEN when the PLAYER Hand wins, BLUE when the BANK hand wins, and YELLOW when the scores of the PLAYER and BANK hand TIE; and WHITE when the first card for the next game round is removed from the CDS w/Scanner 450.

In response to the game dealer's using the Keyboard (FIG. 6 630) to transmit the number of the game table seat(s), occupied by the live Baccarat game players, designated by the game dealer to receive and play the PLAYER or BANK hand during the play of one or more game rounds, to the "OCS's" 30 Security CCTV Control Panel 15*a*, one or more CCTV cameras are automatically focused on a limited area, (i.e. two to three feet), in front of and to the sides the customer and/or his/her designated Play Area 20*b*, that has been designated to play the PLAYER or BANK hands. The video output of the CCTV cameras focused on the customer designated to play the PLAYER hand is displayed on split screen 455*vf*; and the video output of the CCTV cameras focused on the customer designated to play the BANK hand is displayed on split screen 460*vf*. Also, the microphones (FIG. 6 45) concealed beneath the game table layout 605 will capture and transmit the ambient sounds of the casino environment, surrounding the seat(s) occupied by the customers designated to play the game hand, to the RP's and/or to any Administrators Terminal Display who may choose to observe the play of the game from a remote location.

Figure 6B:
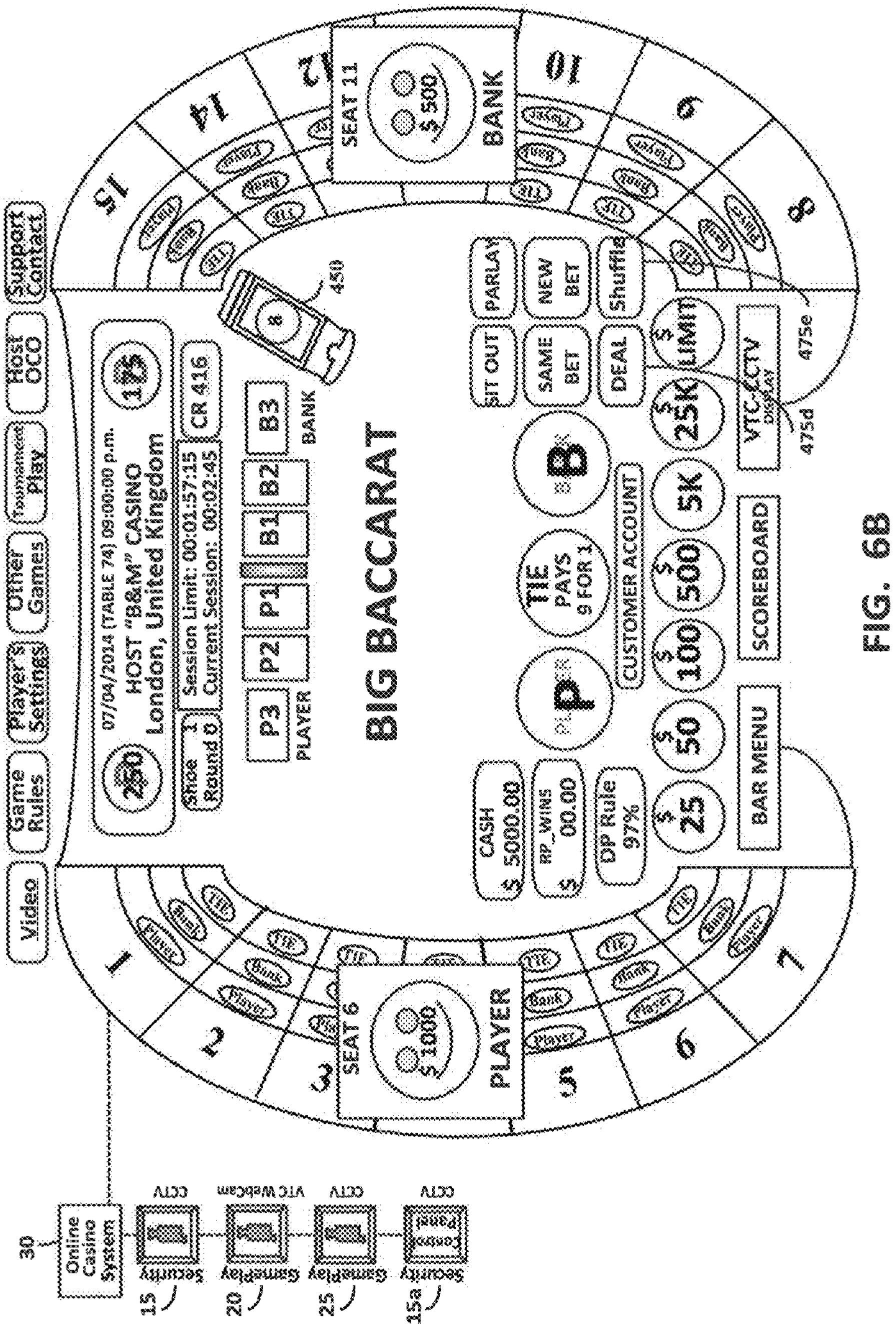
FIG. 6B is an illustration of a top view of the Intelligent Big-Baccarat Game Table (FIG. 6), with the systems ("RPUI") overlaying the captured image of the Big-Baccarat Game Table, whereas the ("RPUI") has been enhanced to the addition of the DEAL **475*d* and SHUFFLE 475*e*** buttons to accommodate the play of an "on-demand" Baccarat game, in accordance with the invention.

FIG. 6B identifies addition modification to the "OCSs" 30 ("RPUI") that are needed when the real-time broadcast of an online Baccarat game, in accordance with the invention, is captured, recorded and broadcast to the RP's for play on-demand. The DEAL 475*d* button and the SHUFFLE 475*e* button are added to the "OCS's" REMOTE PLAYERS USER INTERFACE.

FIG. 6B is an illustration of a top view of the Intelligent Big-Baccarat Game Table (FIG. 6), with the systems ("RPUI") overlaying the captured image of the Big-Baccarat Game Table, whereas the ("RPUI") has been enhanced to the addition of the DEAL 475*d* and SHUFFLE 475*e* buttons to accommodate the play of an "on-demand" Baccarat game, in accordance with the invention.

Figure 6C:
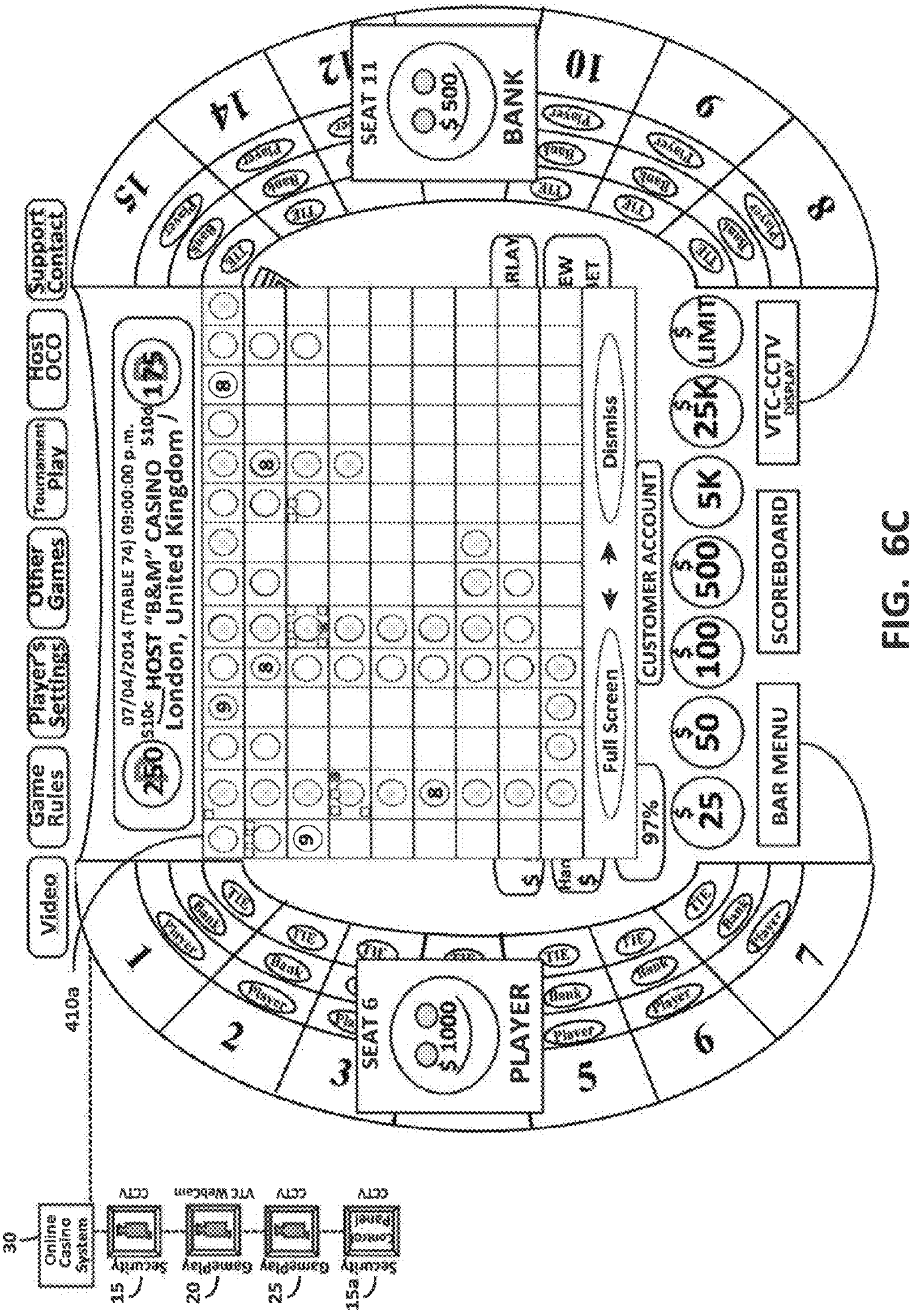
FIG. 6C is an illustration of a top view of the Intelligent Big-Baccarat Game Table displaying the system's Baccarat Scoreboard, on call, by a remote player playing the game during real-time, in accordance with the invention.

FIG. 6C The Online Gaming System's 30 Baccarat Scoreboard 410*a*, on call, is common to all Mini-Baccarat, Midi-Baccarat and Big-Baccarat games, in accordance with the invention, is on display.

Figure 6D:
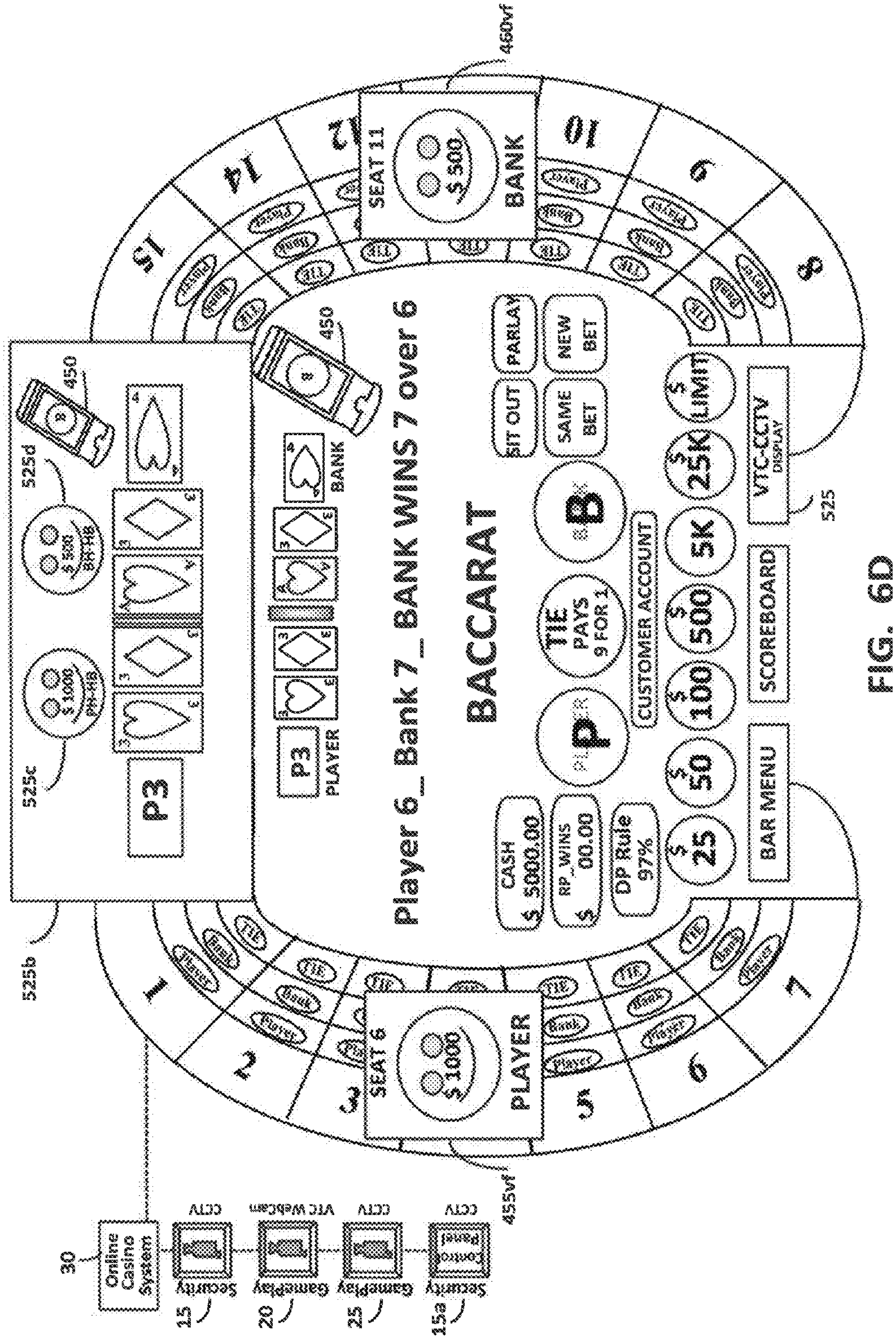
FIG. 6D is an illustration of a top view of the Intelligent Big-Baccarat Game Table with the enhanced display, on call, displaying the outcome of a completed Baccarat game round, in accordance with the invention

FIG. 6D Remote players who wish to get a close-up view of the outcome of each Baccarat game round, or should a RP be concerned about the integrity of the game, he/she may activate the VTC-CCTV Display 525 button to call the "Video Selections" menu (FIG. 5F) and select number (3. Dealer Station|Shuffle) A system CCTV and/or VTC camera is focused, at all times during the play of a live game, on the game dealer, his/her work station including the CDS w/Scanner 450, the designated areas for the PLAYER and BANK hand imprinted on the game table layout, the chip tray and Cash drop slot may be displayed on the system's enhanced display 525*b* that is available to the RPs.

In accordance with the invention, the "OCS's" 30 may also include one or more split screens (525*c* and/or 525*d*) in the enhanced display 525*b* to consolidate key elements related to the security and play of the game; and to further entertain the remote players by displaying a close-up view of the, images of the live players selected to play the PLAYER and/or BANK hands, thereby enabling the RP to see the facial expressions of the live players when winning or losing a wager. Duplicate split screens 445*vf* and 460*vf*, fundamental to the RP's CPU display is seen by the RP's, are also displayed. In the event any RP objects to his actual face being displayed to the RPs, he/or she mays select an "avatar" as his/her display. The system CCTV cameras also capture on an overhead view of the live game table, including images of the live players (not shown), seated at the game table.

Figure 6E:
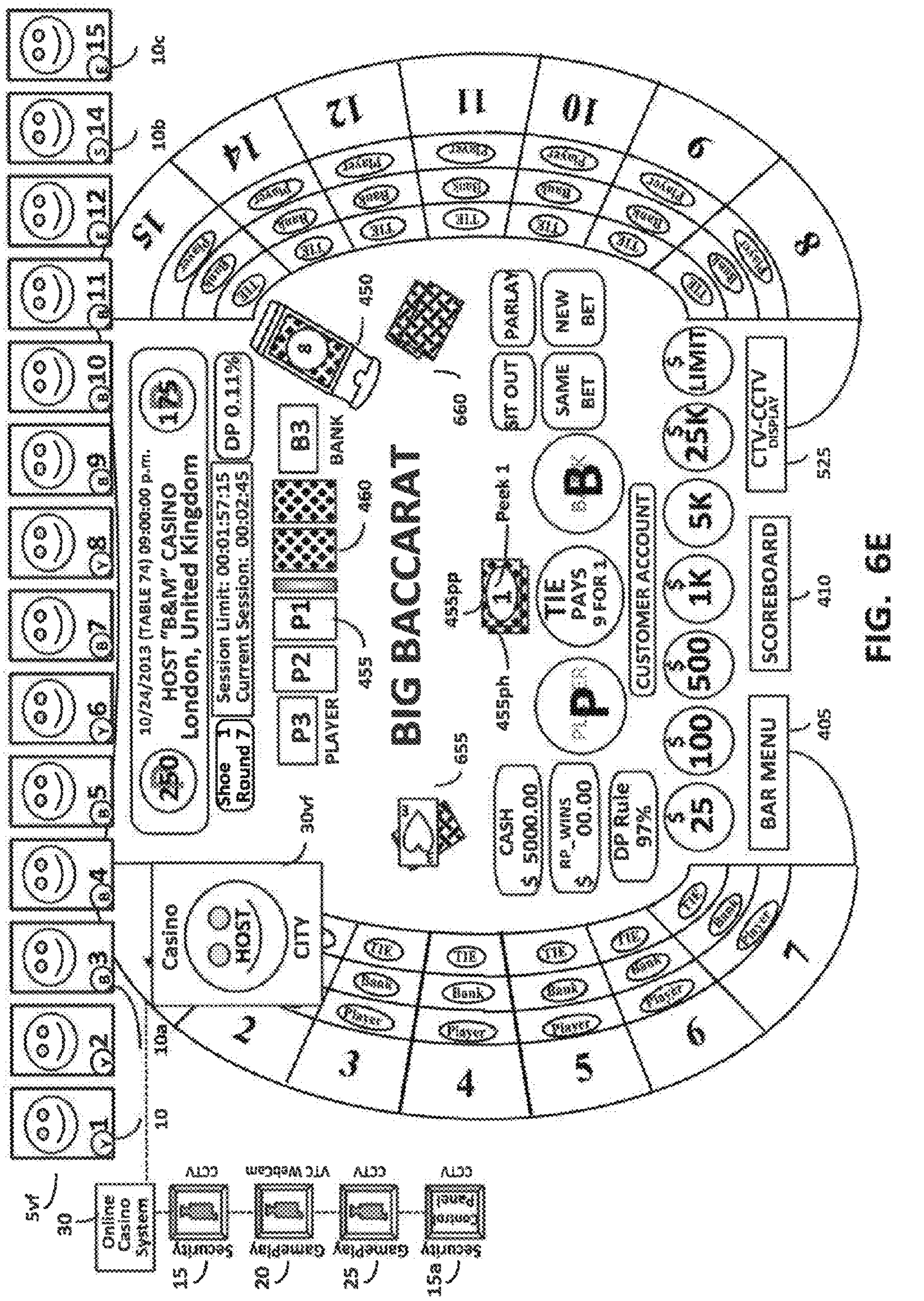
FIG. 6E is an illustration of a top view of the Intelligent Big-Baccarat Game Table as seen by one or more RPs who have accessed the real-time play of a Baccarat game played by real-people in casino by means of a Video teleconferencing, ("VTC") Network, in accordance with the invention.
Figure 6F:
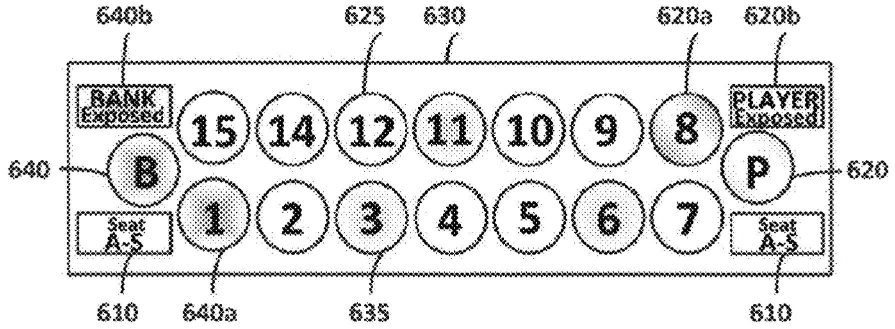
FIG. 6F is an illustration of the systems embedded, and/or wireless, keyboard that can, among other things, transmit information, relative to the play of the game being captured by the online casino system from and to the host (B&M) Casino's secure CCTV Control Panel, which may direct the focus of one or more CCTV cameras to capture the image of images or actions on the game players for broadcast during real time to RP's players engaged in the play of the captured real-time game, broadcast in real-time to the RPs for wagering online, in accordance with the invention.

FIG. 6E is an illustration of a top view of the Intelligent Big-Baccarat Game Table as seen by one or more RPs who have accessed the real-time play of a Baccarat game played by real-people in a real "B&M" Casino; whereas in accordance with the invention the "OCS's" 30 is capturing the real-time sensory game play data; and game data using one or more capture devices, including CCTV and/or Web-Cameras, that are coupled to a Video teleconferencing, ("VTC") Network, whereas a limited or unlimited number of remote players using the services of one or more "VTC" Networks may engage in the play of a casino card game captured and broadcast during real-time, by one or more "VTC" Networks, in accordance with the invention, to the remote players, by wired or wireless means, over an intranet, an extranet, a virtual private network ("VPN"), a cell network, a Video Teleconferencing network, ("VTC"), a non-TCP/IP-based network, a Television Broadcast; and/or any LAN, WAN, or the like including the Internet or the WWW, in accordance with the invention. The "OCS's" 30 REMOTE PLAYERS USER INTERFACE is to be used with online casino Baccarat games made available to RP's who have accessed the play of the game by means of a "VTC" Network.

When there are more than two clients participating in a VTC network "conference call"; an image of each participant may be displayed on one or more Split Screens 5*vf* displayed simultaneously on each conferee's CPU monitor or other display under the control of one or more of the individuals participating in the "conference call" that are coupled to the "VTC" Network. In this instance the VTC network client initiating the "conference call" is a "B&M" Casino's casino host 30*vf*, who has invited the conferees, to participate in the real-time play of a Baccarat game, hosted by a legally licensed and regulated "B&M" Casino; whereas the real-time sensory game play data and/or game data is captured by "OCS's" 30 capture device for real-time broadcast to the invited conferees, using the methods of the "OCSCANNER 30 that are incorporated with the technology and/or services of one or more "VTC" Network providers, over a "VPN".

The source, of the captured sensory game play data; and or game data, will be simultaneously "open" to multiple "VTC" Network providers; thereby providing a means for multiple independent groups, to use the same or different "VTC" Network providers, to participate in the play of the identical online Baccarat game, hosted by the "B&M" Casino, and/or an associated "OCO", unknown to other remote players who have also accessed the play of the online game by means of a "VTC" network.

In reference to the image of the Casino Host 30*vf* who may, or may not participate in the "conference call", be present at the game table or at another location will have access to the host "B&M" casino's customer database that includes the RP's personal and financial information. Any "VTC" participant, including the Casino host, may click on the image of another participant, to communicate with the other for idle chit-chat, request additional credit, and/or services.

In reference to the Split Screens 5*vf*. To make the play of the game more interesting to the "VTC" players; in the bottom left hand corner of each Screen is a circled "Y" 10, (indicating a bet on the PLAYER hand), a circled "B" 10*a*, (a bet on the BANK hand) a circled "S" 10*b*, (indicating the RP has SIT OUT, not placed a wager for the upcoming game round), or a circled "E" 10*c*, (indicating an empty seat).

The captured image of the game table, as seen by the RP, broadcast to the RP's, in accordance with the invention, includes the "OCS s" 30 ("RPUI") which overlays the real-time image of the "B&M" Casino game table top. Also visible to each of the RP's, on the real-time image of the actual Baccarat table, captured and broadcast by the "OCS's" 30 to the RP's, is the actual PLAYER 655 hand dealt to the live player, (present at the host "B&M" Casino's Baccarat table), that has been designated by the live dealer to play, (expose), the PLAYER hand; as is the actual BANK 660 hand dealt to the live player, present at the host "B&M" Casino's Baccarat table, that has been designated by the live dealer to play, (expose), the BANK hand. To know the outcome of the game round all the RP has to do is watch and wait for the live players, designated to play, (expose), the PLAYER or BANK hands, to face-up, and toss the game hand's cards to the game dealer who will position them in their designated areas, 455 for the PLAYER hand; 460 for the BANK hand. Or, the RP, at will, (having placed a wager on the PLAYER hand for the current game round), may use the "OCS's" 30 ("RPUI"), to play, (expose), the face-down graphic images of the PLAYER 455*ph* hand, delivered to the "peek position" 455*pp* using Peek Option 1, 2 or 3 to expose the PLAYER 455*ph* hand dealt to the RP by the "OGS's" 30 Baccarat game software, in accordance with the invention.

Once the RP, has exposed the face-down graphic images of the PLAYER hand; he/she will not know the value of the BANK hand until such time that the live dealer uses Keyboard (FIGS. 6 & 6G) to signal the "OCS's) Baccarat game software that the BANK hand has been exposed. Any 3$^{rd}$ Cards dealt to the PLAYER or BANK hands will be exposed in the same manner. The "OCS's") Baccarat game software, coupled to the "OCS's" 30 CDS w/Scanner 450, programmed with the Baccarat game rules; therefore when the system software recognizes that the last card dealt from the CDS w/Scanner for delivery to the PLAYER or GAME hand, when that card is exposed at the live game table the "OCS's" Baccarat game module will immediately settle the bets of all RP and wait for the next game round to be dealt from the CDS w/Scanner used to deal the game to the live players present at the host "B&M" Casino game table.

FIG. 6G Embedded in the Intelligent Baccarat Game Table, ("IGT"), Top (FIG. 6 600) top is an electronic Keyboard 630, that is coupled to the Online Gaming System's 30, Security CCTV Control Panel, ("SCP") 15*a*. The game dealer(s) use Keyboard 630 to enter and transmit information, related to the play of the game, to the ("OCS's") 30 control panel ("SCP") 15*a* that is programmed to control the focus one or more CCTC cameras, 15, 20, or 25, dedicated to monitoring the play of a game played at a particular game table located in a real "B&M" Casino hosting the play of a Baccarat game captured by one or more capture devices for real-time, delayed or on-demand broadcast to a limited and/or unlimited number of qualified RP's who have accessed the real-time broadcast of a particular game table, by wired or wireless means, for wagering on the play of the live Baccarat game from a location remote to the actual game table, in accordance with the invention.

Duplicate wireless Keyboards (FIG. 6 630*a*) positioned in close proximity to the "IGT" game dealers (FIG. 6 D2 & D3) may also be used to transmit game play information to the ("SCP") 15*a* by wireless means.

Each of the keys comprising Keyboards 630 and 630*a* will house one or more LED lights, (not shown), preferably WHITE, YELLOW or BLUE when illuminated. The keys comprising Keyboards 630 and (FIG. 630*a*), are comprised of the Seat Activation Keys 610, and numeric keys 1 through 15; and color coded PLAYER hand key 620, and the numeric key 8 620*a*, will illuminate, preferably GREEN, when activated in sequence, (1$^{st}$ the PLAYER hand key 620; and 2$^{nd}$ the numeric key 8 620*a*), by the game dealer D1, to signal the "SCP" 15*a* that, prior to the delivery of the PLAYER hand to a game player, the game dealer has selected the live player seated in game table Seat 8 620*a* to receive and play, (expose), the PLAYER cards for the current game round; whereas the "SCP" 15*a* will respond to the keyboard(s) 630 and/or 630*a* by positioning and focusing one or more CCTV cameras 20 and/or 25 on the play area 20*b* of game table Seat 8 620*a* to capture the images of the live player and his/her play of the PLAYER hand. Once the game player has exposed the PLAYER hand the game dealer will press the PLAYER Cards Exposed Key 620*b* two times in rapid succession, which when activated will also illuminate GREEN, to transmit that information to the "OCS's" 30 software game module which will record the date and time that the PLAYER hand was exposed.

The color coded BANK hand key 640, and the numeric key 1 640*a*, (preferably will illuminate BLUE when activated), pressed in sequence (1$^{st}$ the BANK hand key 640; and 2$^{nd}$ the numeric key 1 640*a*, by the game dealer D1, to signal the "SCP" 15*a* that, prior to the delivery of the BANK hand to a game player, the game dealer has selected the live player seated in game table Seat 1 640*a* to receive and play, (expose), the BANK cards for the current game round; whereas the "SCP" 15*a* will respond to the keyboard(s) 630 and/or 630*a* by positioning and focusing one or more CCTV cameras 20 and/or 25 on the play area 20*b* of game table Seat 1 640*a* to capture the images of the live player and his/her play of the PLAYER hand. Once the game player has exposed the BANK hand the game dealer will press the BANK Cards Exposed Key 640*b* two times in rapid succession, which when activated will also illuminate BLUE, to transmit that information to "OCS's" software game module which will record the time that the BANK hand was exposed. All inactive numeric seat keys 625 will be dark; and all active numeric seat keys 635 will initially be illuminated preferably WHITE.

Another non-limiting, exemplary embodiment of the methods and systems of the invention is described below in FIG. 7 in connection with a poker game.

Figure 7J:
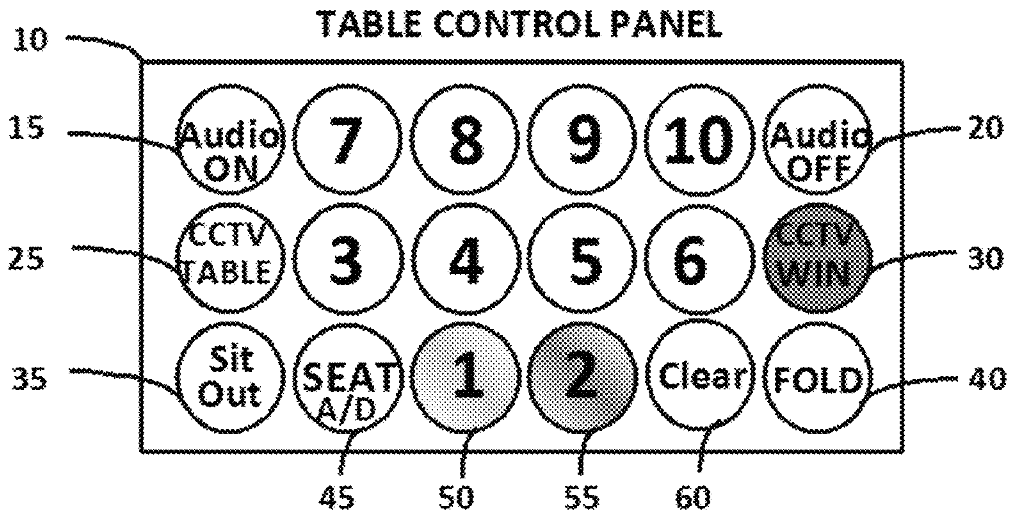
FIG. 7J is a top view of a "System Control Panel", a.k.a. keypad, coupled to the "ACS w/CSD") and the "$2^{nd}$ CSD"; and/or an online casino software system.
Figure 7:
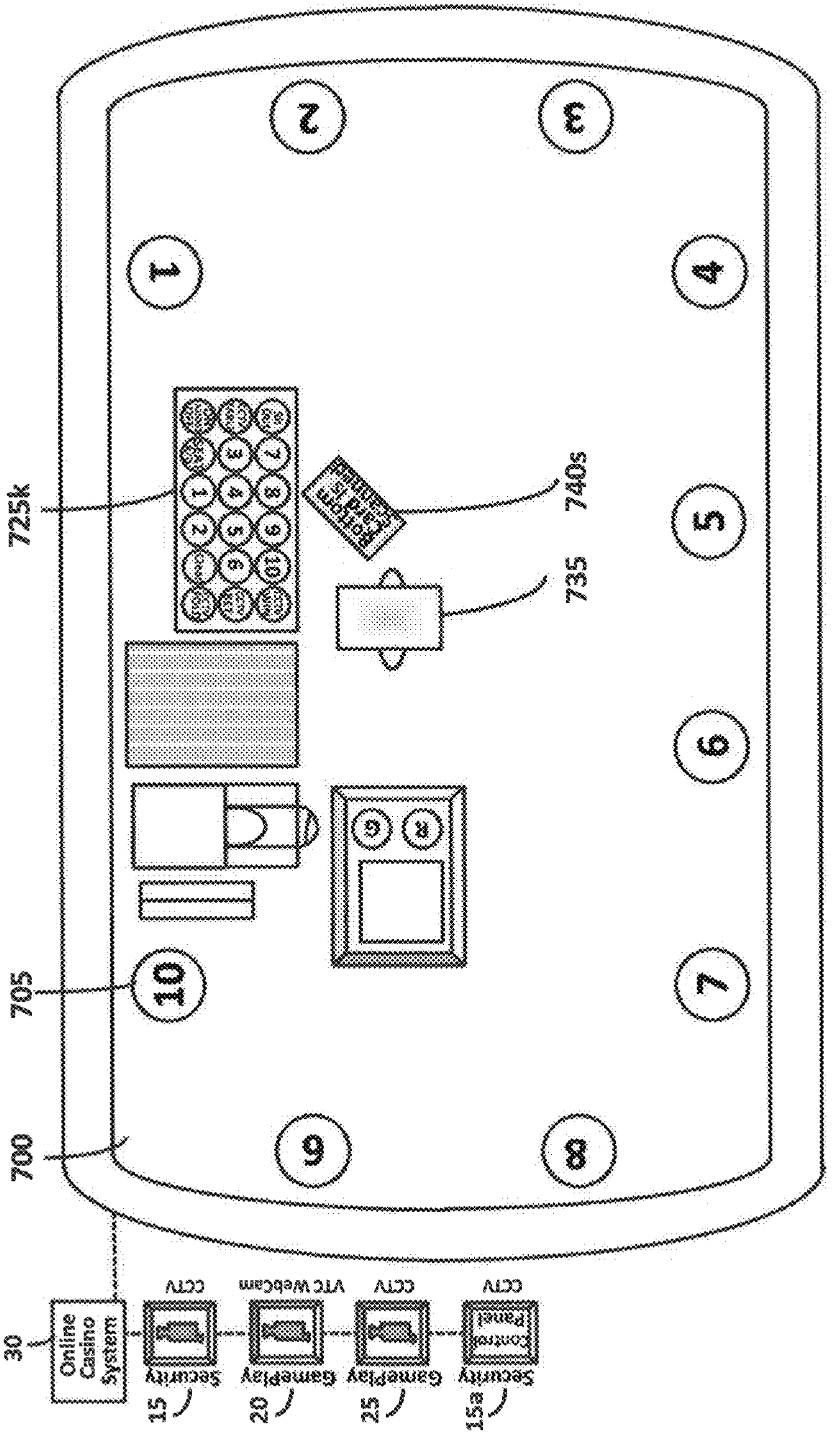
FIG. 7 is an illustration of an overhead view of a real Intelligent Poker Table, ("IPT"), used by ("B&M") casinos; whereas the "IPT" houses one or more electronic devices to increase game security and to speed up the play of the game and to transmit game table information to "BRAVO's Poker Room & Table Management System's backend software program.

FIG. 7 is a top view of an improved version of a casino poker table (FIG. 6 600) used by B&M casinos to monitor casino poker games, dealt from a hand held game deck, played in B&M casinos. In this embodiment, the table include 1) a modified Seat Designation Keypad 725*k*; and 2) the addition of a Settlement Display with Activation Key, ("SD w/AK), 735; and 3) the addition of a "2$^{nd}$ Card Recognition Device 740*s*, ("CRD"), an infrared scanner, charge-coupling device, neural-network or other CRD known in the art; but preferably an infrared scanner, embedded in the game table top, which is programmed to read machine readable indicia imprinted of the face of a playing card when the face of the playing card is passed over the 2$^{nd}$ CRD 740 by the game dealer; and 4) whereas the modified SDK 725, the SD w/AK 725*a*; and the 2$^{nd}$ CRD 740 are coupled to the ACS w/CRD 715, which are all coupled to 4) to a computer network 705, housing online casino card game software coupled to one or more capture devices capable of capturing the play of the game, which may include CCTV Video, Audio and/or gaming data specific to the game being played in a real B&M casino by real-people during real-time, and without limitation, any other electronics carried by or coupled to "BRAVO's Player Tracking System used for casino poker games; that collects information about the game deck and the play of the game that can be transferred to one or more online casino software programs or online casino computer networks programmed to utilize the data captured and transferred to the online casino computer network 705 and software to broadcast the captured play of a poker game, (played in a real B&M casino, by real people during real-time), live or on-demand to one or more remote players, using their client computer or other computing devices, to log into an online casino website hosted by the B&M casino capturing the play of one or more of its poker games; and/or an associated OCO authorized to broadcast the play of the captured games, provided by the B&M casino, by wired or wireless means, during real-time or on demand, to qualified remote players who have logged into the host OCO online casino website and select a particular game table, or game tables gaming data for live or on-demand play.

It should be noted that when the game dealer uses the SDK 725 to activate a game table seat designated to be dealt a game hand; the Settlement Display with Activation Key 725*a*, whereas the display consists of one housing, numbered for each seat at the game table's seats, containing a tri-colored LED light, which will automatically illuminate preferably WHITE when the corresponding seat number is activated by means of the SDK 725, which is coupled to the SD w/AK 725*a*. If a seat has not been activated my means of the SDK 725, the corresponding seat number carried by the SD w/AK 725*a* will remain dark.

When the "RIVER" card 770 has been dealt and those players remaining in the game have make their last bets, according to the game rules, the game dealer will press the SD w/AK 725*a* Activation Key which will signal the casino software's game round settlement module that the game round is over; whereas the settlement module will cause all SD w/AK displays who have folded or have a none willing hand to go dark. The settlement module will identify the active game table seat occupied by a game player holding the winning hand, by illuminating the SD w/AK 725*a* seat display preferably GREEN. If there are two players remaining holding identical game hands the settlement module will illuminate the appropriate SD w/AK seat display preferably GOLD indicating that the pot is to be split. If there is more than one pot because one or more players went "All-In" to cover a portion of another players bet which was larger than the "All-In" players bet the system will identify the winners of a particular portion of the pot by illuminating the "All-In" winner SD w/Ak display preferably ORANGE.

When the game dealer removes the pre-shuffled, pre-scanned game deck from the ACS w/CRD that will be used to deal the next round of poker all of the active seat SD w/AK display will be illuminated preferably WHITE.

It should be noted that the embedded "2$^{nd}$ CRD" 740 may also be added to other casino card game tables, (i.e. casino Blackjack games dealt from a hand held deck) when the inventory of game deck dealt to the game players has been pre-scanned, captured and stored, by one or more CRD, known in the art, that is coupled to a Player Tracking software program(s) used to monitor the play of one or more particular types of casino card games). Whereas, the addition of the "2$^{nd}$ CRD", an infrared scanner, charge-coupling-device, neural-network or other CRD known in the art, will allow the play of the game and/or the gaming data to be captured and broadcast live or on-demand to remote players, coupled to the computers or computer network maintained or hosted by the B&M casino; and/or a OCO associated with the B&M casino, for remote play.

Figure 7A:
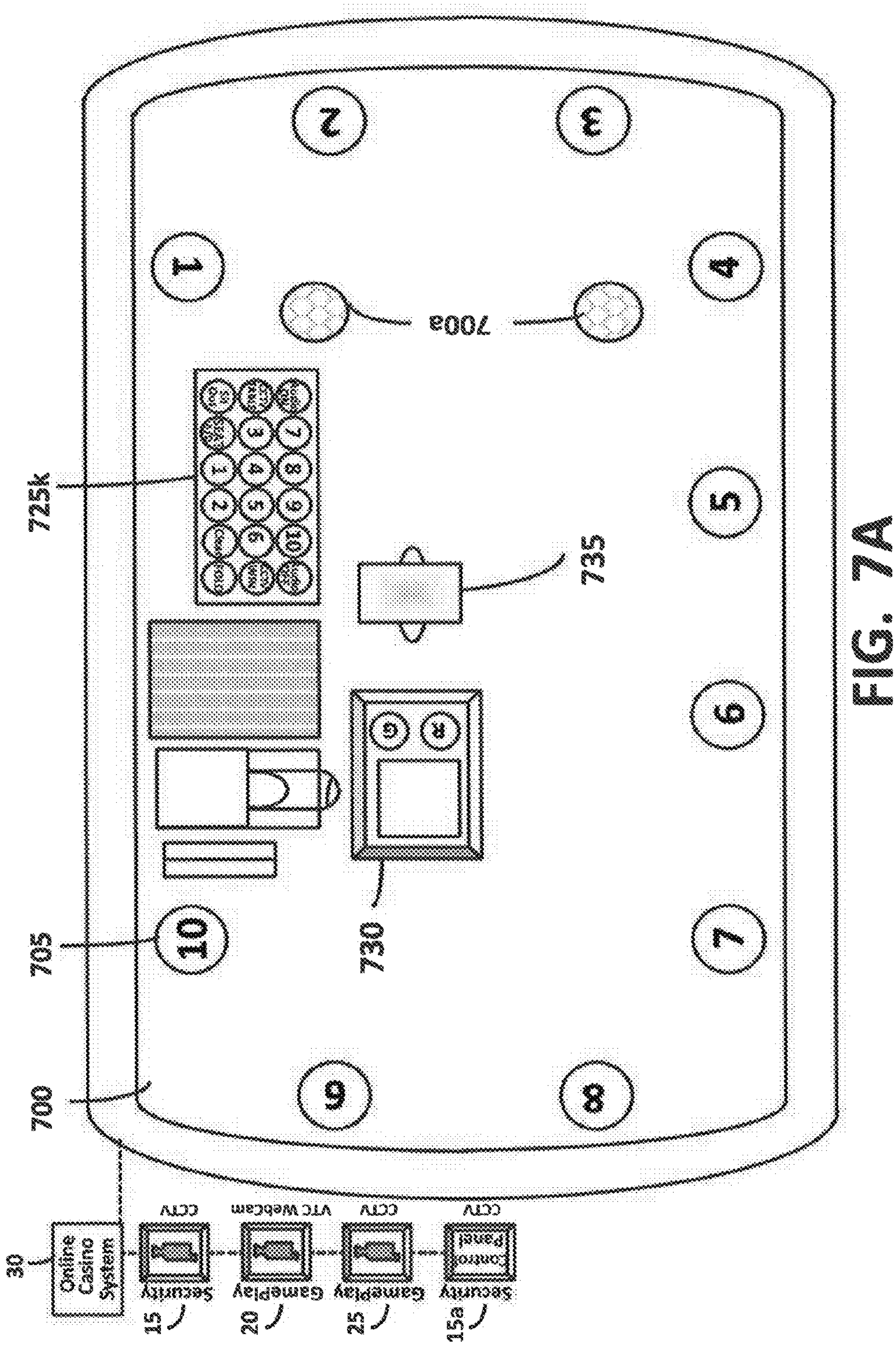
FIG. 7A is an illustration of an overhead view of a real Intelligent Poker Table, ("IPT"), used by ("B&M") casinos; whereas the teaching of the current invention enhances the above "IPT" by embedding a $2^{nd}$ card scanning device, ("$2^{nd}$ CSD"), in the top of the "IPT", couples the "ACS w/Card Scanner, to the embedded "$2^{nd}$ Card Scanning Device", and one or more supporting software routines; and further enhances the "IGT" with an embedded keyboard associated with the improved system of the current invention; thereby improving the security of the poker game and providing one or more unique and secure means to allow the real-time play, and/or gaming data, of the poker game to be captured and broadcast during real-time, or on-demand, by wired or wireless means, to one or more remote Baccarat players wagering online.

FIG. 7*a* is a top view of the improved poker table housing an electronic ACS w/CRD 715, a modified Seat Designation Keypad 725, the added Settlement Display with Activation Key (SD w/AK 725*a*) and a "2$^{nd}$ CRD" 740; whereas a freshly shuffled and scanned deck of cards 755 has been removed by the game dealer from the ACS w/CRD 715 and placed on the game table top 700, in close proximity to the 2nd CSD 740 embedded in the game table top.

Figure 7B:
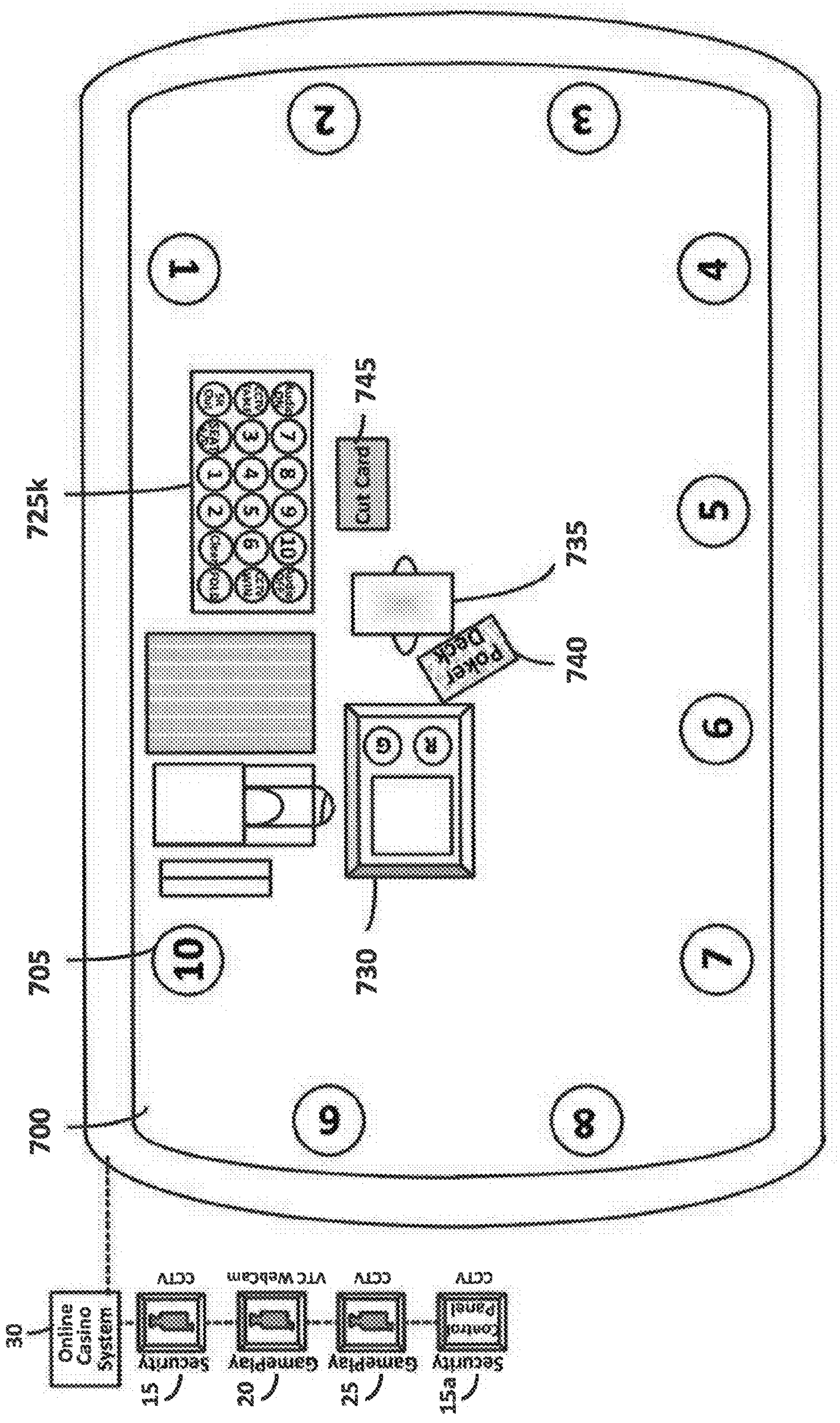
FIG. 7B is an illustration of an overhead view of a real Intelligent Poker Table, ("IPT"), enhanced by the teachings of the current invention; whereas a freshly shuffle deck has been removed by the Poker dealer from the "ACS w/Card Scanner" and placed Face-Down on the table top in close proximity to the "$2^{nd}$ CSD" embedded in the "IGT" top.

FIG. 7*b* is a top view of the improved poker table housing an electronic ACS w/CRD 715, a modified Seat Designation Keypad 725, the added Settlement Display with Activation Key (SD w/AK 725*a*) and a "2$^{nd}$ CRD" 740; whereas a freshly shuffled and scanned deck of cards has been removed by the game dealer from the ACS w/CRD 715 and placed on the game table top 700, in close proximity to the 2$^{nd}$ CSD 740 embedded in the game table top. The game dealer then cuts the freshly shuffled game deck, (FIG. 7*a* 755), by lifting a randomly selected portion of the cards, 755*t*, from the top of the deck and, without exposing the card value, rank or suit of the bottom card of the top portion 755*t* of the deck lifted from the freshly shuffled game deck, (FIG. 7*a*, 755), and places the top portion 755*t* of the game deck on the game table top layout 735 next to the bottom portion 755*b* of the cut deck of cards.

Figure 7C:
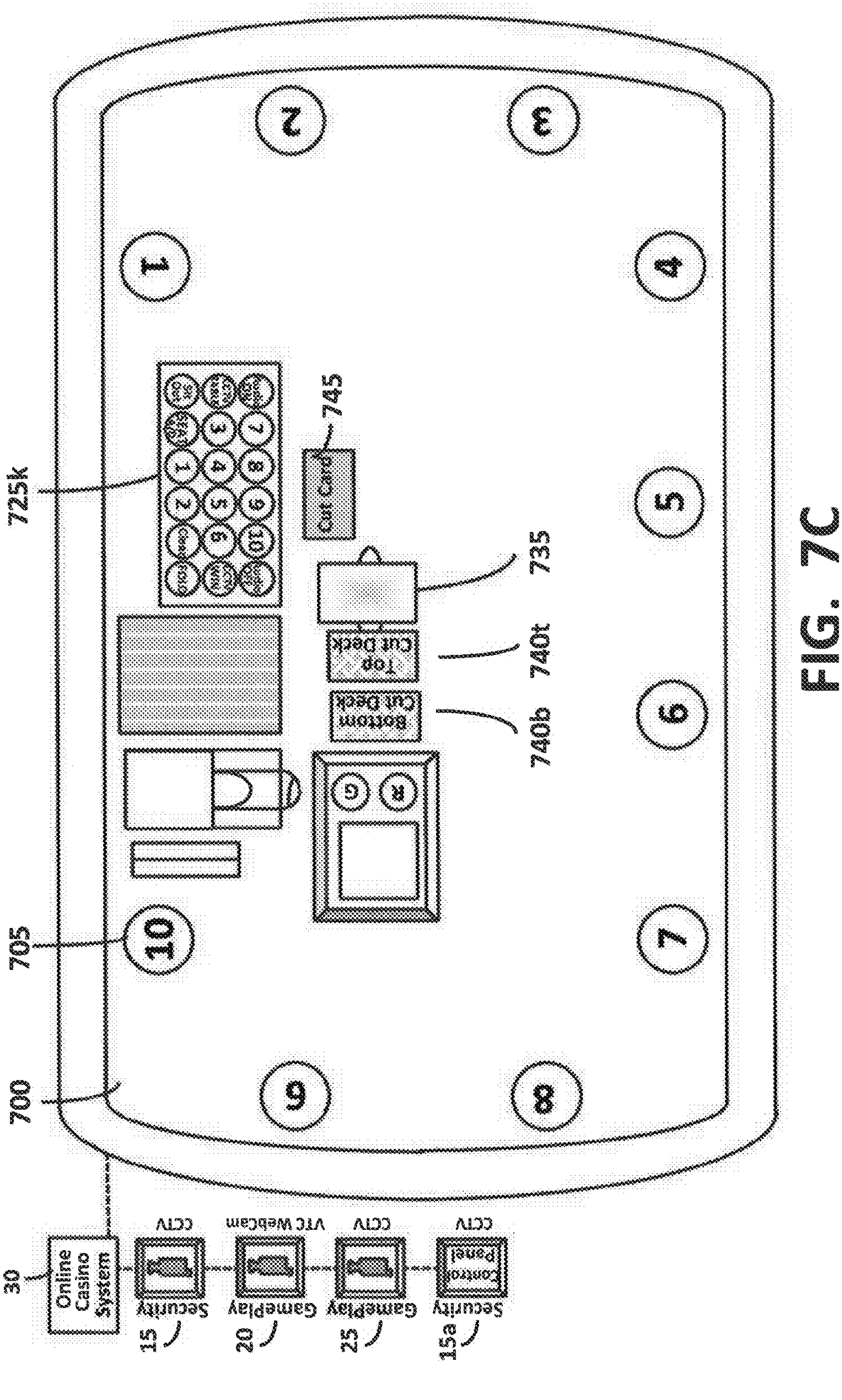
FIG. 7C is an illustration is of an overhead view of the enhanced ("IPT") depicting a $2^{nd}$ step; whereas the Poker dealer cuts a freshly shuffled deck removed from the ("ACS w/CSCANNER) placing the top portion of the "cut" deck, Face-Down, on top of the "$2^{nd}$ CSD".

FIG. 7*c* is a top view of the improved poker table housing an electronic ACS w/CRD 715, a modified Seat Designation Keypad 725, the added Settlement Display with Activation Key (SD w/AK 725*a*) and a "2$^{nd}$ CRD" 740; whereas a freshly shuffled and scanned deck of cards has been removed by the game dealer from the ACS w/CRD 715 and placed on the game table top 700, in close proximity to the 2$^{nd}$ CSD 740 embedded in the game table top, whereas the freshly shuffled and scanned game deck removed from the ACS W/CRD 715, cut by the game dealer, is divided into two portions; the top portion, (FIG. 7*b* 755*t*), and the bottom portion, (FIG. 7*b* 755*b*). The game dealer now takes the bottom portion (FIG. 7*b* 755*b*) of the cut deck and stacks it vertically on top of the top portion (FIG. 7*b* 455*t*) of the cut deck 755*c*, thereby completing the reconstitution of the inventory of the pre-scanned game deck.

However, at this point, the inventory of the "cut" or reconstituted game deck is not known to any one of the online casino software modules. To remedy this situation the game dealer will pick up the cut, reconstituted game deck, using his/her thumb on one end and index and middle fingers on the other end of the deck, (not shown), up off of the game table top while keeping the deck close to the surface of the game table top's layout to prevent exposing the card value, rank or suit of the Face-Down bottom card of the deck, (not shown), to any of the game players, casino staff or spectators, passes the cut game deck 755*c* over the 2$^{nd}$ CRD 740 embedded in the game table top, which is coupled to one or more of the online casino software programs housed on the B&M casino's and/or OCO's computer(s) 705, and then the dealer having passed the cut game deck, with the face of the deck's bottom card exposed, over the 2$^{nd}$ CRD 740, sits the cut game deck down on top of the "cut card" 745 which conceals the identity of the cut game decks bottom card from the game players, casino staff and any spectators.

The 2$^{nd}$ CRD 740 reads the machine readable indicia imprinted on the face of the cut deck's bottom card as it passes over the 2$^{nd}$ CRD 740; capturing and transferring the card value, rank and suit of the cut decks exposed bottom card to the systems online casino software, housed by one or more system computers 705, which includes the scanned inventory of the game deck previously captured by the system ACS w/CRD 715 and transferred to the online casino software's game deck module for storage. That action signals the system's online casino software's game deck module to restructure, or reconstitute, the card value, suit, rank and location, or delivery sequence of the inventory of the pre-shuffled and pre-scanned game deck previously captured by the systems ACS w/CRD 740 and transferred to the systems online casino software's game deck module.

The online casino software's game deck module now uses the output of the 2$^{nd}$ CRD 740, the card value, rank and suit of the cut, reconstituted, decks bottom card; and the card value, rank, suit and delivery sequence, location, of each card comprising the game deck pre-shuffled and pre-scanned by the ACS w/CRD 715, and stored in the software's game deck module uses the card value, rank and suit of the bottom card of the reconstituted cut game deck, i.e. the Four (4) of Clubs, will be programmed to identify the position of the Four (4) of Clubs in the game deck scanned by the ACS w/CSD 715 and transferred to the online casino software; whereas the systems online casino software's game deck module knowing the card value, rank, suit and location of each card in the game deck that is in back of the Four (4) of Clubs will move that portion of decks inventory, retaining their stored location, to the front of the game deck. Whereas, the captured inventory of the pre-scanned game deck, previously transferred to the online casino software's game deck module has been reconstituted and is therefore identical to the inventory of the cut, reconstituted, game deck, (passed over the 2$^{nd}$ CRD 740 embedded in the game table top 700), now positioned in the game dealer's hand, (not shown), where it will remain as the game dealer removes the cards one-by-one for delivery to an active game table seat, or any cards, according to the game rules that are burned or exposed in the area of the game table layout 735 designated for the placement of all "cards common" to the game hands, (FIG. 7*d* 755*d*), dealt to all of the active game table seats.

The system's modified Seat Designation Keypad 725 is used by the game dealer to identify the number of the active game table seats (FIG. 7*d* 755*d*), for the system software. Therefore, when the dealer deals a game round, according to the game rules pre-programmed into the online casino software, to an active game table seat, (FIG. 7*d* 755*d*), and the pre-scanned game deck has been cut and the bottom card of the reconstituted game deck has been passed over the 2$^{nd}$ CRD 740 embedded in the game table top 700, and the output of the 2$^{nd}$ CRD 740 has been transferred to the online casino software's game deck module the OCO's system will know the card value, rank, suit and location, delivery sequence, of the reconstituted hand held game deck that the dealer will deal the game hands to each of the active game table seats; and the card value, rank and sequence of any burn cards or cards common to all of the active game table seats which includes, (i.e.), the three (3) "FLOP" cards (FIGS. 7*e* & 7*g* 760), the one (1) "TURN" card (FIGS. 7*f* and 7*g* 765), and the one (1)

"RIVER" card (FIG. 7*g* 770), dealt from the reconstituted game deck when the game being played is "Texas Hold'em."

Figure 7D:
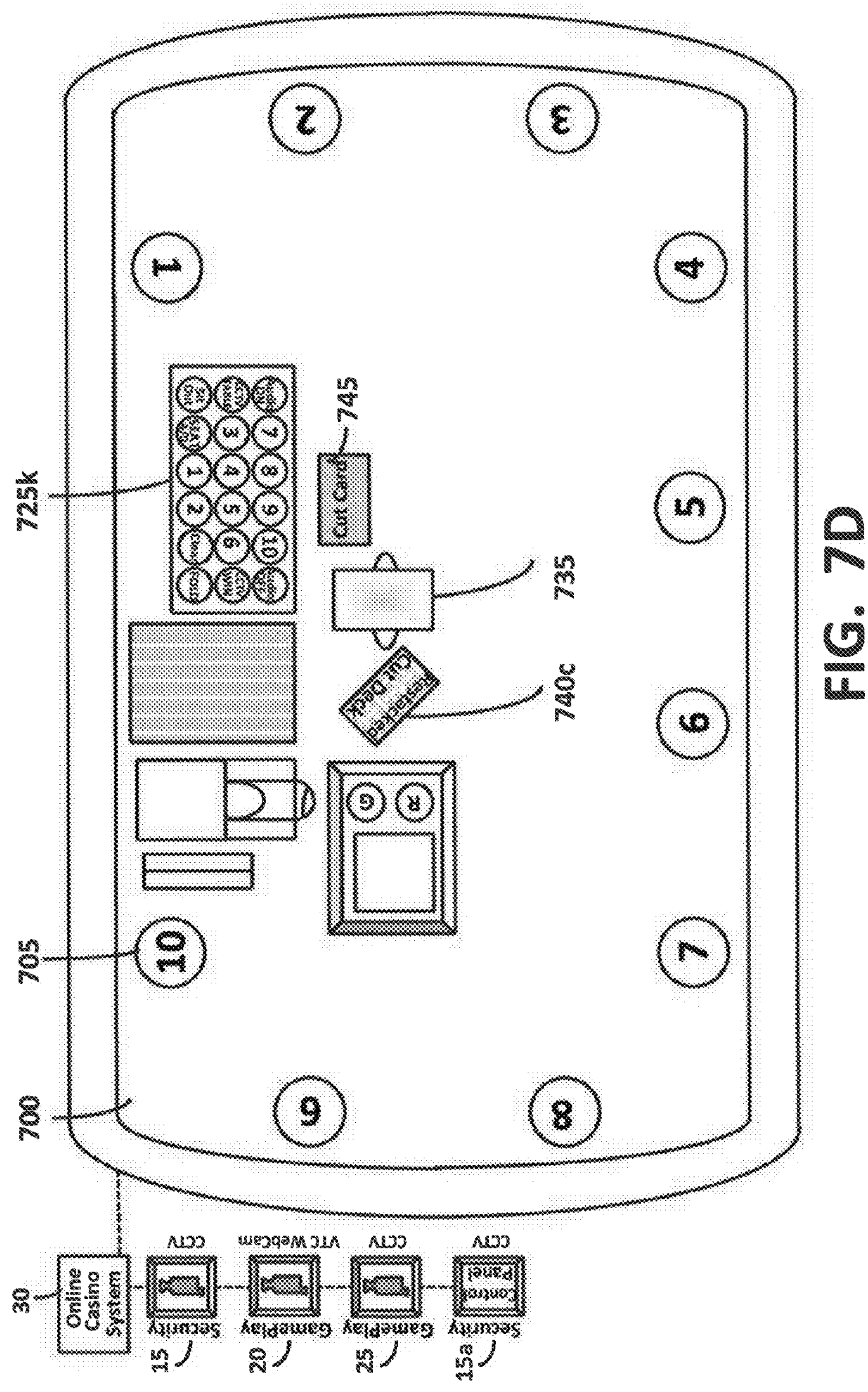
FIG. 7D an illustration is of an overhead view of the enhanced ("IPT") depicting a 3rd step; whereas the Poker dealer picks up the bottom portion of the "cut" deck, Face-Down, and places it on top of the bottom portion of the "cut" deck positioned on top of the "$2^{nd}$ CSD".

FIG. 7*d* is a top view of the improved poker table housing an electronic ACS w/CRD 715, a modified Seat Designation Keypad 725, the added Settlement Display with Activation Key (SD w/AK 725*a*) and a "2$^{nd}$ CRD" 740; depicting the first two-cards dealt Face-Down by the game dealer from a hand held game deck, (not shown), pre-shuffled and pre-scanned by the ACS w/CRD 715 embedded in the game table top; whereas on removal from the ACS w/CRD 715 the game dealer has cut, shifted the top portion of the cut deck to the bottom and moved the bottom portion of the cut deck to the top of the deck, (thereby reconstituting the inventory of the game deck, restacked the game deck, passed the Face-Down bottom card of the "cut" game deck over the game tables 2nd CRD 740, and them placed the cut, reconstituted game deck on top of the "cut" card; picked the reconstituted "cut" deck up with the "cut" card covering the face of the deck's bottom card, places it in his/her other hand and commences to deal the game hands 755*d*, from the hand held game deck, (not shown), to live players seated in a game table seat activated by means of the modified SDK 725, whereas the delivery sequence is determined by the game rules preprogrammed into the online casino software.

Figure 7E:
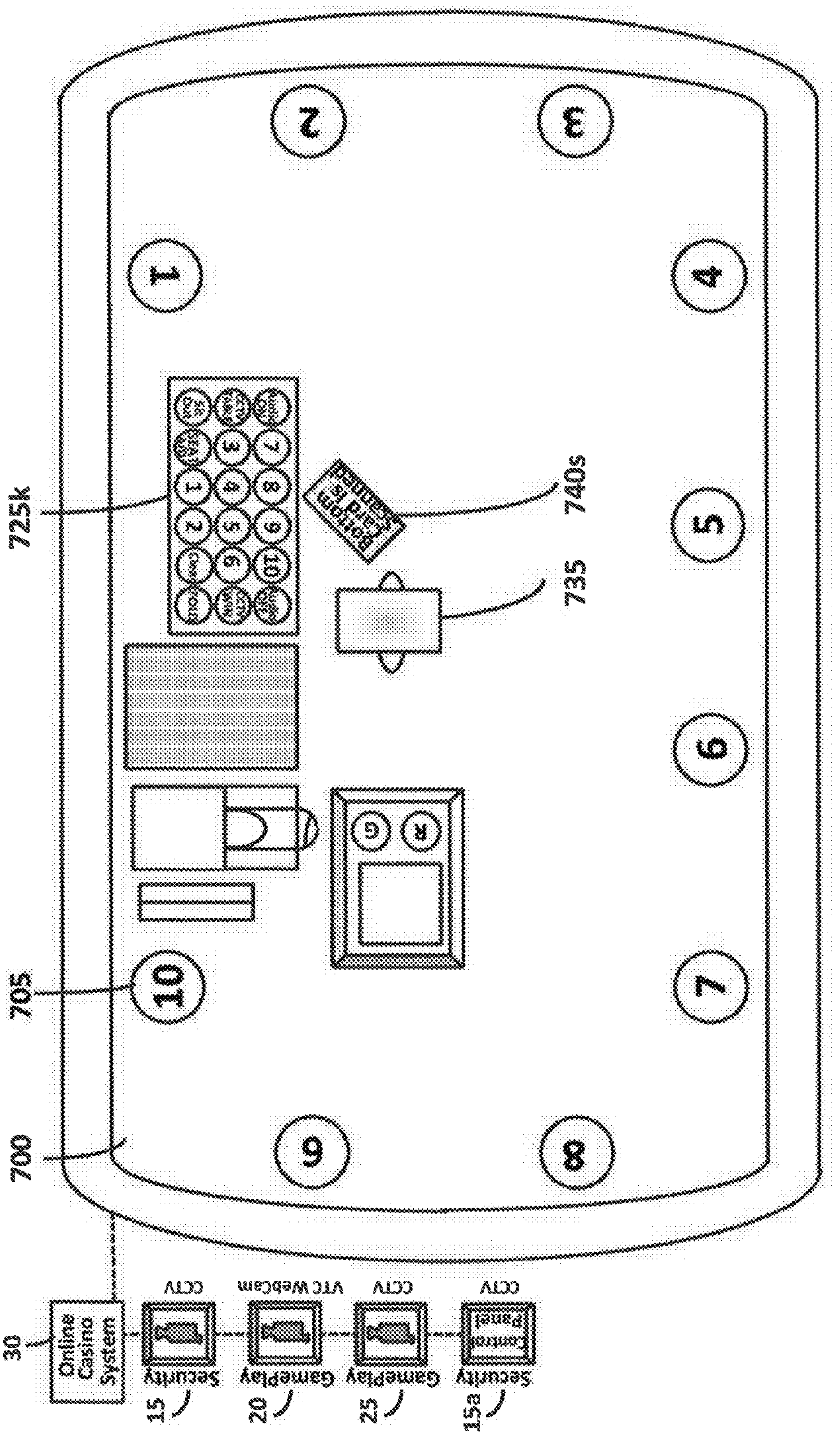
FIG. 7E an illustration is of an overhead view of the enhanced ("IPT") depicting a $4^{th}$ step; whereas the dealer then removes the restacked "cut" deck from the "$2^{nd}$ Card Scanning Device, ("CSD", without exposing the bottom card to anyone, and places the restacked "cut" deck on top of the "cut card", and then places the freshly shuffled and "cut" deck in his/her hand (not shown).

FIG. 7*e* is a top view of the improved poker table housing an electronic ACS w/CRD 715, a modified Seat Designation Keypad 725; depicting the dealers actions, (after the dealer has dealt, according to the game rules, two (2) cards 755*d*, Face-Down, to each of the players seated at an active game table seat. The two card dealt to each active game table seat are privately viewed by the player occupying the game table seat receiving the two cards; whereas the player, based on his/her knowledge of the game, and/or the game rules will, in turn, fold, bet, call, check or raise any bets, (not shown), made by other players who have not folded, (tossed in their cards, Face-Down, to the game dealer). If the settlement of the game round, based on the card values, ranks and/or suit(s) of the original two cards dealt to the players seated at an active game table is made; the game round will end; and a new freshly shuffled game deck, cut and reconstituted by the game dealer, will be dealt to each player occupying a designated active game table seat.

In the event the settlement of a game round is not determined by the original two cards dealt to the game players; the game dealer will remove the top card of the hand-held depleted game deck, Face-Down, and without exposing it to any of the game players burn the card 760*b*; prior to dealing the next three (3) cards, (the FLOP cards 760), Face-Up, in the center of the game table.

Alternatively, the burn card(s) may be passed over the 2$^{nd}$ CRD 740 which will identify the card value, rank, suit and its designated location in the depleted inventory of the reconstituted game deck previously uploaded to the system computers 705 housing the OCO's online casino's software's game deck module; whereas the system may use the identity of the "burned" card to verify the progress of the play of the game; and/or that the integrity of the game deck, dealt from the dealer's hand, has not been compromised by any illicit activity initiated by the game dealer. If so the system will be programmed to issue an alert to the game players by means of, but not limited to, the 2$^{nd}$ CRD 740 embedded in the game table top.

Alternatively, the system software knowing the card value, rank, and suit of each card designated for delivery to each active game table seat can also be used to verify the integrity of the two cards 755*d* originally dealt to each live player, (verifying that they are identical to the cards that a game player exposes, as part of a winning or losing hand, when involved in the settlement of the current game round), occupying an active game table seat at the game table being recorded by the B&M casino and/or an associated OCO. During the settlement of any game round the game dealer may press the "Activate Settlement" Key, "ASCANNER, (FIG. 7*i* 40), carried by the Settlement Display 725*a*, and (FIG. 7*i* 50) embedded in the game table top 700, which is coupled to, without limitation, the game table's embedded ACS w/CRD 715, and the 2$^{nd}$ CRD 740 which are all coupled to host B&M casinos computers, housing the online casino card game software, used to store the captured game play captured by CCTV cameras and Microphones, and/or, but not limited to, Card Recognition Devices that capture, and store the play of the game and/or the gaming data on one or more recording devices, including one or more digital video recorders, ("DVR"); whereas the captured game play and/or gaming data may be transferred to the appropriate online casino software module, housed by the B&M casinos, and/or associated OCO's, online computer network 705, or one or more online casino game servers housing one or more online casino software programs which will provide the means for the real-time play of a real casino card game, played by real people playing a game of poker, or other casino card game, in a real B&M casino, can be captured for live, real-time and/or delayed broadcast, (by wired or wireless means), and/or on-demand to remote players, coupled to the host online casino operators website by means of their client computers or other computing devices, that incorporates the captured game play and/or gaming data with a computer generated remote players user interface, ("RPUI"), which will allow the remote players to make wagers, game strategy decisions and interact with the play of the online casino card game supported by the systems online casino card game software, stored on the B&M casinos and/or associated OCO's online computer network, or online game servers, over a LAN, WAN or Intranet.

Alternatively, without limitation, the 2$^{nd}$ CRD 740, provides a unique means to reconstitute the inventory of a pre-scanned Poker deck, cut by the game dealer, game supervisor or game player, and the Seat Designation Keyboard ("SDK") 725, known in the art, is coupled to one or more of the capture devices and/or computers of exemplary embodiments of the invention and supporting online casino software programs provides a means to identify the card value, rank, suit and location of each card comprising the inventory of a game deck, held in the game dealers hand, while being dealt to live players occupying a game table seat, activated by the game dealer using the SDK 725 to identify for the system the number of each game table seat, occupied by a live person, that may be active during the play of each upcoming game round dealt to the game players. In the event a player occupying a game table seat that has been activated decides to take a break and not place a wager for one or more upcoming game rounds the game dealer will hold down the Sit Out Key, (FIG. 7*h* 10), and press the appropriate seat number on the Seat Designation Keyboard, (FIG. 7*h* 30), and then release both keys simultaneously; whereas the status of the active game table seat key's surface, illuminated WHITE, will change preferably to YELLOW indicating it Sit Out status. To reactive the above Sit Out sequence will be repeated.

Since the game rules, pre-programmed into the system software, and the location of each card in the reconstituted game deck is known by the system's software; and since the number of each active game table seat occupied by a live person is also known to the exemplary systems disclosed herein; when the game dealer removes a card from the hand-held game deck, (to be delivered to an active game table seat, "burned", or Faced-Up in the center of the game table), the card value, suit, rank and the delivery sequence of each card dealt to each active game table seat, "burned" or Faced-Up on the game table top is known to the system. Whereas, the exemplary systems of the invention can use that information to detect any errors or illicit manipulation of the cards, dealt during the play of a game round, by the game dealer and/or one or more of the live players engaged in the play of the game.

Another advantage of the system is that it knows the card value, rank, and suit of the Faced-Down cards dealt to each player's activated game table seat during each game round.

In the event the exemplary system of the invention is being used to broadcast, live during real-time or on demand, the play of a Poker Tournament, a remote player viewing the play of the Live or on-demand game, captured and broadcast by a OCO utilizing the teachings of the invention, may allow the remote player viewing the play of a Live or on-demand poker tournaments game, to use the systems ("RPUI") to view the down cards of at least one tournament players, and preferably the down cards or another player engaged in the process of considering to fold, call or bet in response to a bet or action taken by the primary tournament player that the remote players has selected to observe his/her strategy skills during one or more game rounds. Access to the Live or on-demand play of the tournament games, determined by the casino hosting the tournament, and/or the OCO broadcasting the tournament, may be FREE to the remote players; and/or access may be FEE based. FREE or FEE based access will provide huge, low cost marketing benefits, to the casino hosting the tournament. The remote players, having the ability to see the down cards of selected highly skilled Poker Tournament players, will have a better understanding of the selected tournament player's game strategy viewed by the remote player observing the play of the tournament games, Live or On Demand, will find that experience to be entertaining and educational.

Another advantage of the teachings of the invention is that the pre-scanned inventory of a game deck shuffled by a ACS w/CRD 715, prior to being dealt to the game players, can be stored, without being cut and/or cut, on one or more local, regional, state, national or international B&M Game Deck Databases; and/or transferred to one or more online casino card game servers; whereas the known inventory of "Pre-Shuffled, "Pre-Scanned", and/or "Pre-Shuffled", "Pre-Scanned, Pre-Cut and Reconstituted" captured and stored by a "particular" real B&M casino, and/or an OCO associated with the B&M casino, prior to the delivery of the cards comprising the known inventory of the game deck to the game players; and/or game hands at a real game table located in a "particular" real B&M casino. The known inventory of both decks; the "Pre-Shuffled, "Pre-Scanned" game deck, and the "Pre-Shuffled", "Pre-Scanned, Precut and Reconstituted" game deck can be captured and stored on the aforementioned B&M Game Deck Databases. Remote casino card game players, logging into an OCO's website, operated by the B&M casino or a 3$^{rd}$ Party OCO authorized to access a "particular" online game server, housing one or more B&M casinos' Game Deck Database, ("GDD"), will be able to select and play one or more types of game decks, (i.e. Poker, Blackjack, Baccarat and etc.) dealt to live players, at a game hosted by the selected B&M casino; whereas the B&M casino captured the play of the game, stored it one or more digital recorders; and/or transferred the gaming data during real-time or at a later date to GDD and/or an online casino operators game server.

Another advantage of the teachings of the invention is that a remote player who selects a Poker Deck from the GDD for play will be assigned a computer generated poker table that will become one of many online poker games hosted by the online poker site. The remote player may pre-arrange with the host OCO to make the poker tables assigned to his/her a closed game; or the poker table assigned to the remote player may be open to any remote player logged into the OCO website.

If the game is a 'Closed Game" or an 'Open Game" as long as the remote players that the game was assigned to is present at the "Closed or Open Game" the game deck used to deal each hand of Poker will be randomly selected from the original B&M casinos GDD selected by the remote player that the game table was assigned to by the OCO. Preferably, the name and location of the real B&M casino will be displayed on the computer generated game table tops layout as long as the remote player the "Closed or Open Game" was assigned is still actively engaged in the play of the game. When the remote player the virtual game table has been assigned to leaves the game, and at least two active players remain, the name of the B&M casino providing the GDD will continue to be displayed on the virtual game table top. However, the host OCO's software will be programmed to allow anyone of the game players to request and select another B&M GDD to provide the game deck. The remote player the game table was assigned to must approve the request before the B&M GDD can be switched to another B&M GDD provider associated with the OCO hosting the current poker game.

Another advantage of the teaching of the invention is to win the confidence of the remote players in the integrity of the games and gaming data provided by B&M providing the inventory of the game decks to the GDD. If the B&M casino maintaining the GDD is a "big brand" B&M casino, known to the public, the easier it is for the OCO to convince the remote players that the integrity of the games and gaming data provided by the B&M casino is beyond reproach. To further build the confidence of remote players in the integrity of the host OCO online casino card game, a software routine will be included in the ("RPUI") that will allow any one of the remote players, preferably when the "Dealer Button" is positioned at a remote players seat, to "cut" the game deck provided by the actual "B&M" casino to the OCO by means of the GDD. The inventory of the game decks housed on the GDD, and or online casino card games will preferably be updated daily . . . therefore no game deck should ever have to be used to deal a game to any remote players; once the game deck has been dealt to any remote player(s).

Figure 7F:
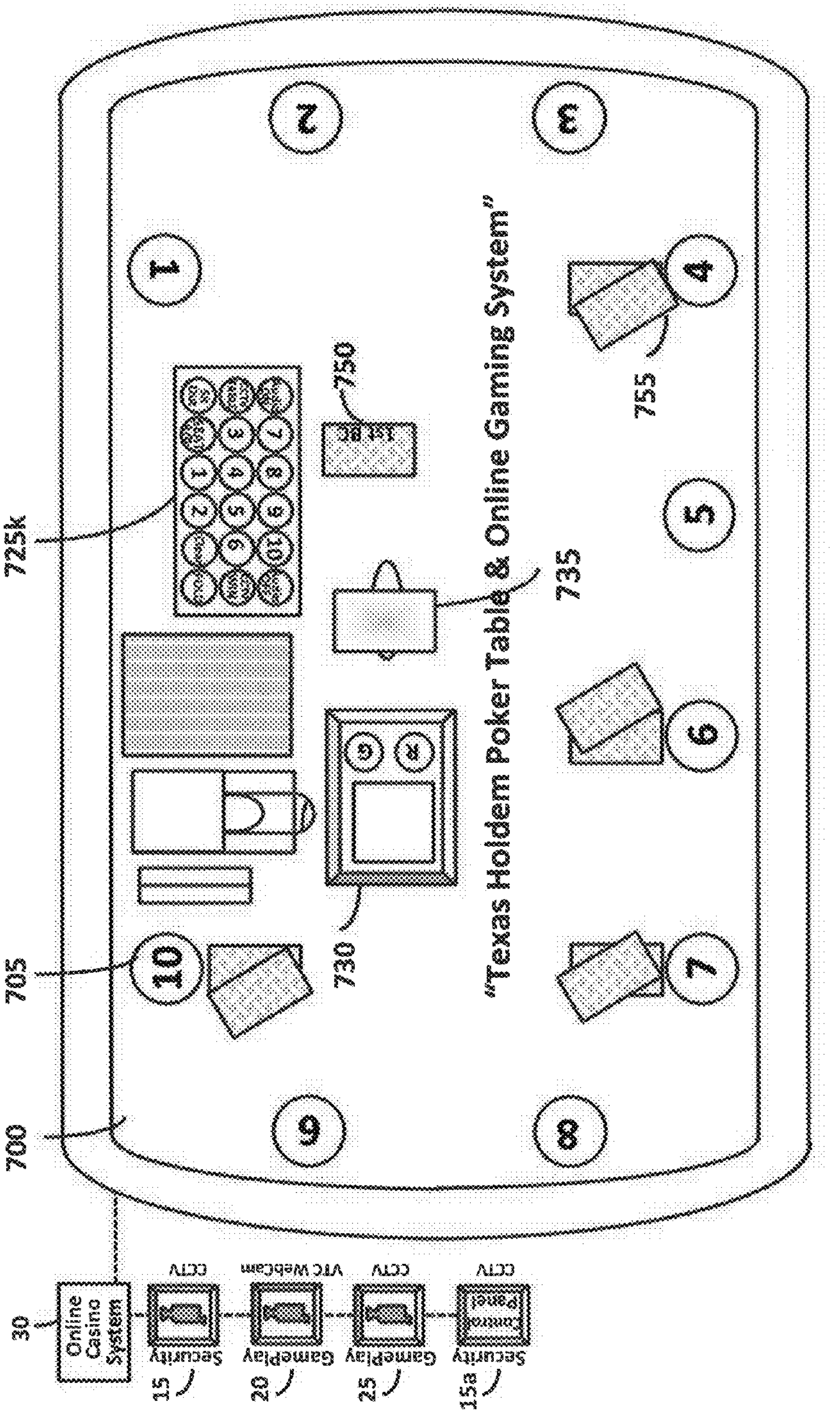
FIG. 7F an illustration is of an overhead view of the enhanced ("IPT") depicting a $5^{th}$ step; whereas the poker dealer holds his/her hand holding the poker deck down close to the ("$2^{nd}$ CSD) and slides the top card from the hand held deck, Face-Down, off the top of the deck and passes it over the "$2^{nd}$ CSC and "burns" the card by pushing it to one side and proceeds to deal two-cards, Face-Down to each of the game players.

FIG. 7*f* is a top view of the improved poker table housing an electronic ACS w/CRD 715, a modified Seat Designation Keypad 725, and a Activate Settlement Key, (FIG. 7*i* 40), that is part of the game round Settlement Display, (FIGS. 7, 7*a*, 7*b*, 7*c*, 7*d*, 7*e*, 7*f*, 7*g*, 725*a* and FIG. 7*i* 40), e depicting the dealers actions, (after the players have folded or placed a wager(s), (not shown), after the "FLOP" based on their original two card hand and the three cards comprising the FLOP 760), which according to the game rules consists of burning of the top card of the deck, 765*b* prior to dealing the TURN card 765*b*, Face-Up, next to the FLOP cards 760.

Figure 7G:
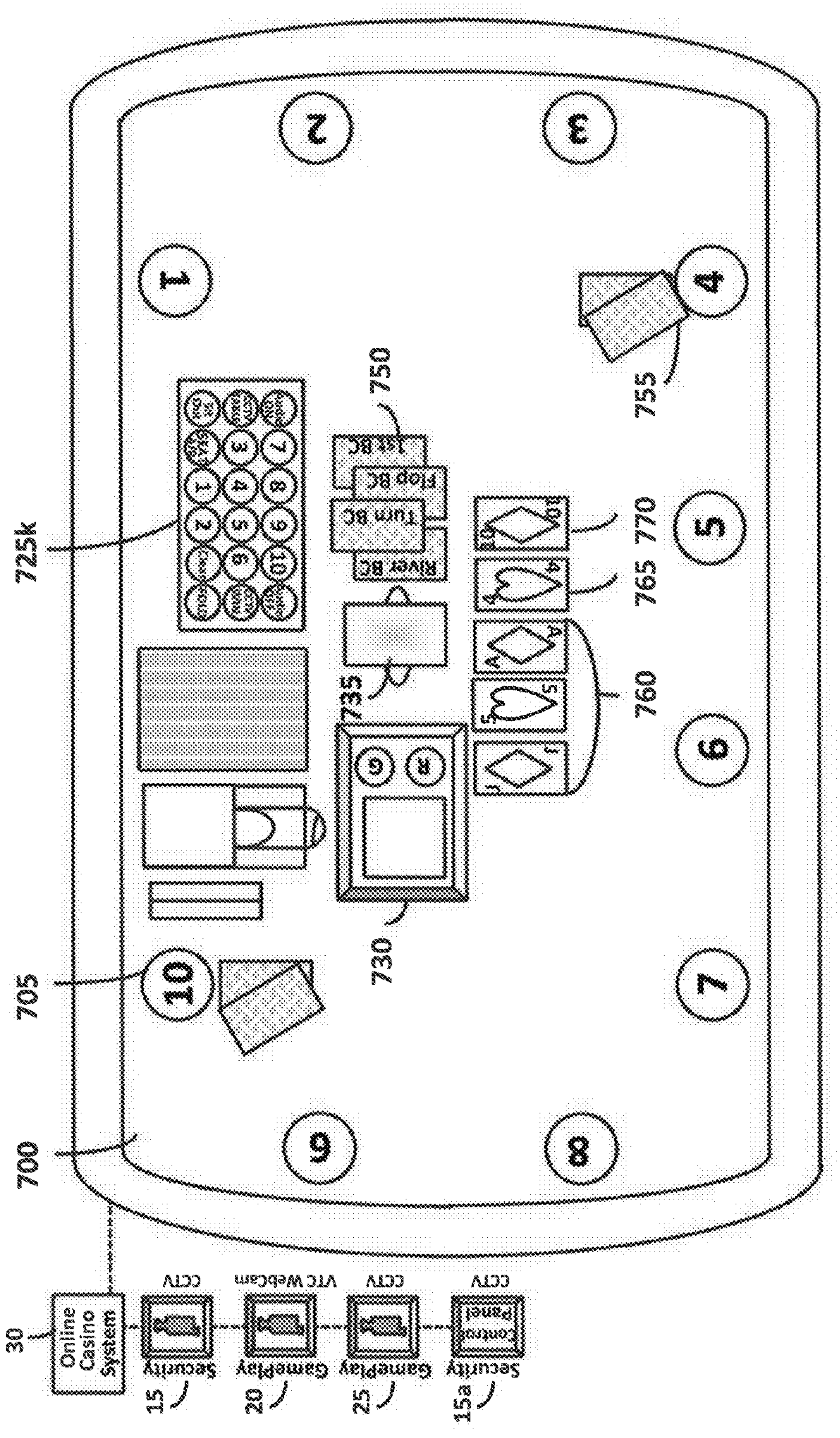
FIG. 7G an illustration is of an overhead view of the enhanced ("IPT") depicting a $6^{th}$ step; whereas if more than one player makes a wager, when the last wager is called, the game dealer, utilizing the same process, will pass a $2^{nd}$ burn card over the ("$2^{nd}$ CDS) and deal three (3) "FLOP" cards Face-Up in the center of the ("IPT").

FIG. 7*g* is a top view of the improved poker table housing an electronic ACS w/CRD 715, a modified Seat Designation Keypad 725, and a Activate Settlement Key, (FIG. 7*i* 40), that is part of the game round Settlement Display, (FIGS. 7, 7*a*, 7*b*, 7*c*, 7*d*, 7*e*, 7*f*, 7*g*, 725*a* and FIG. 7*i* 40), e depicting the dealers actions, (after the players have folded or placed a wager(s), (not shown), after the '"' based on their original two card hand and the four Face-Up cards; including the three (3) FLOP cards 760 and the (1) TURN card 765, which according to the game rules consists of burning of the top card of the deck,

770*b* prior to dealing the (1) RIVER card 770, Face-Up, next to the (1) TURN card 765 and the (3) FLOP cards 760.

Figure 7H:
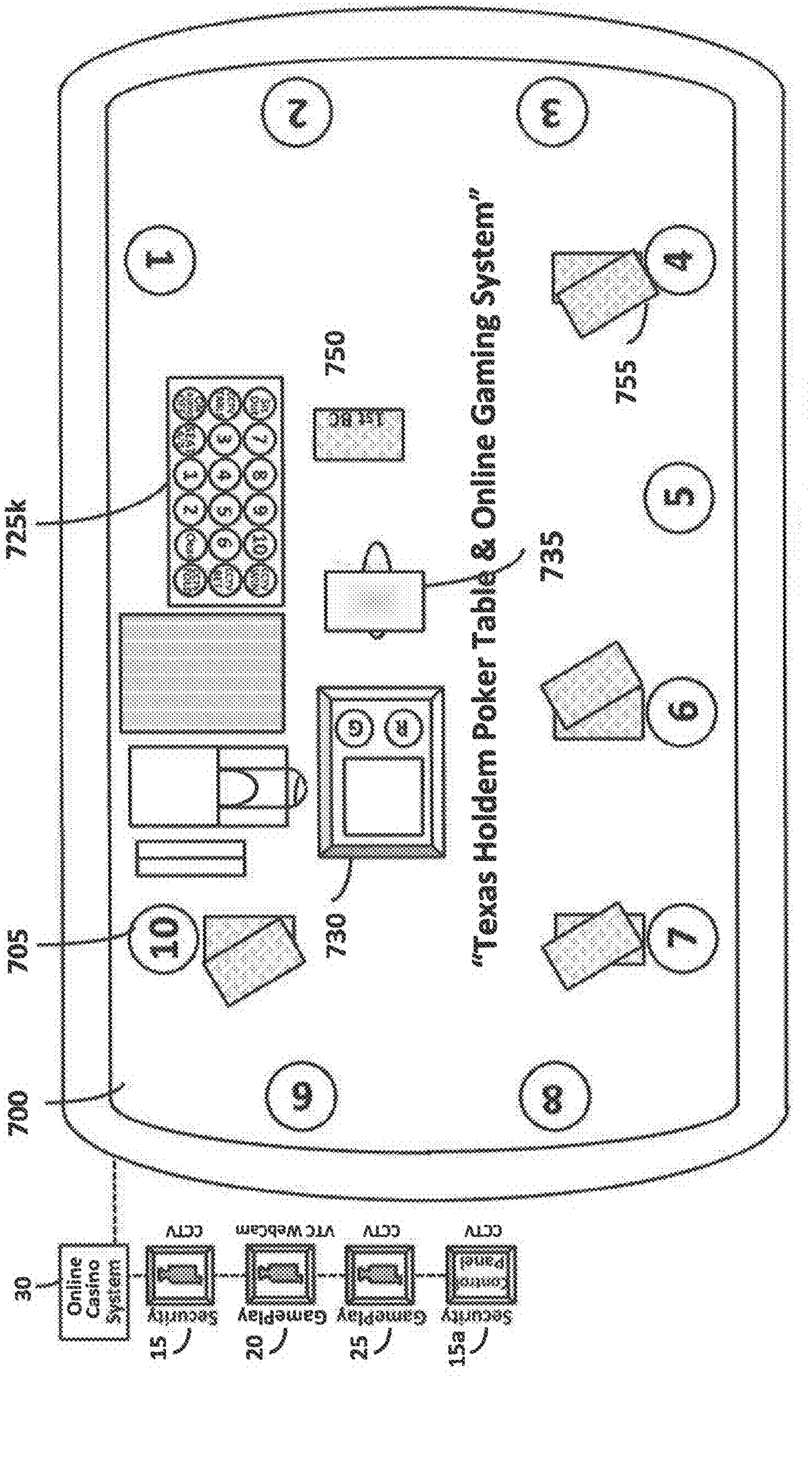
FIG. 7H an illustration is of an overhead view of the enhanced ("IPT") depicting a $7^{th}$ step; whereas if more than one player makes a wager, when the last wager is called, the game dealer, utilizing the same process, will pass a $3^{rd}$ burn card over the ("$2^{nd}$ CDS) and deal the one (1) "TURN" card Face-Up in the center of the ("IPT").
Figure 7I:
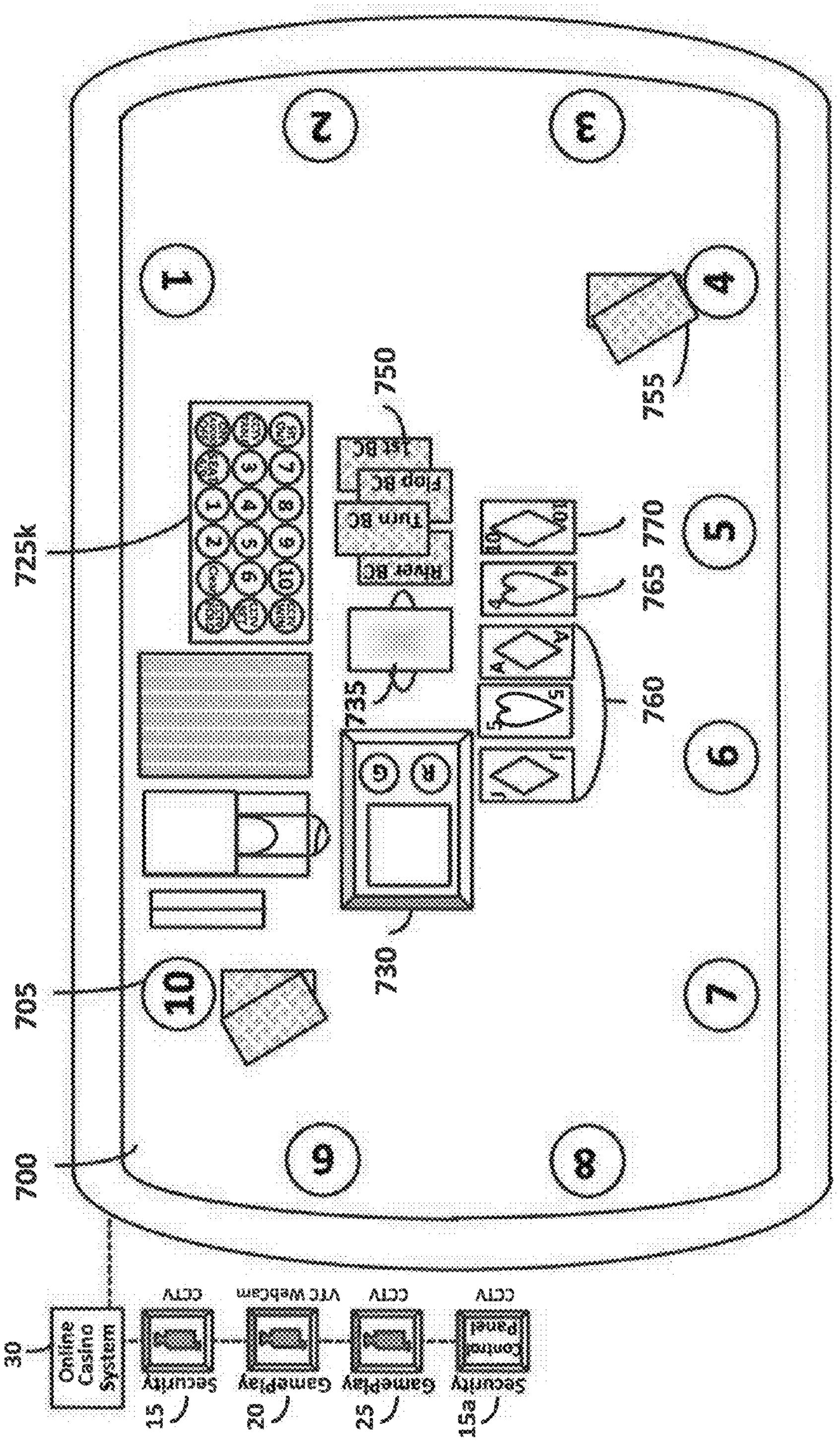
FIG. 7I an illustration is of an overhead view of the enhanced ("IPT") depicting a $8^{th}$ step; whereas if more than one player makes a wager, when the last wager is called, the game dealer, utilizing the same process, will pass a $4^{th}$ and final burn card over the ("$2^{nd}$ CDS) and deal the one (1) "RIVER" card Face-Up in the center of the ("IPT"). The remaining players will make their wagers.

FIG. 7*h* is a top view of a larger, more detailed version of the Seat Designation Keyboard, (FIGS. 7, 7*a*, 7*b*, 7*c*, 7*d*, 7*e*, 7*f*, 7*g*). The Seat Designation Keyboard FIG. 7*h* includes a Sit out Key 10, a Seat Reservation Key 20; and ten (10) numeric keys 30, one numeric key for each game table seat.

In the event a player, not playing at a game table asks the game dealer to reserve a particular game table seat currently occupied by another player the game dealer will hold down the Reservation Key (FIG. 7*h* 20), and press the seat number, (that the player has requested the game dealer to reserve for him/her when the current player vacates), and then release both keys simultaneously; whereas the status of the active game table seat key's surface, illuminated WHITE, will change preferably to RED indicating that another customer has asked that that seat be reserved for his/her when it is vacated by the current player seated in the requested seat. When the reserved seat is vacated the game dealer will press the reserved seat's seat button twice, signaling the systems software that the current player is leaving the game, and the surface of the reserved seat designation key will remain RED indicating that the seat is reserved for another player.

The below description provides additional exemplary embodiments, in which there is a stored library of decks of cards. A software program is written with a main routine with multiple sub routines that initiated by the program, programmer or in some cases by the choices of the player. The main routine might call for a pull of an image from this image database or library, requesting a stored deck image of eight (8) decks or one file with 416 cards. A secondary routine might then call for a file to be reordered and presented to the game board. A tertiary routine might be written to offer the user the choice to accept, deny, deal or pass the cut of the cards. This choice often called the cut, would be to divide a deck of cards into portions, in order to arrange their presentation or to change the order of cards to be dealt to the other players. Should the player choose to accept the deal of the cards the RNG could then reorder the deck with a predetermined variable or utilize the RNG itself. Other routines could be written in and could be utilized by the menu driven choices of the program itself. All of these actions are transparent to the player and all the player might see for this portion of the involvement would be a welcome splash screen, followed by a set of options for what game they wish to play and lastly what action they would like to do in their selection of the deal.

The next step would be a graphical representation to the player should he select the option of cutting the deck prior to the deck being dealt. A cut card has no value or makings and usually is a plain red card used to separate deck to further randomize the card order presented to the players. A nondescript representation of deck of cards could be presented to the player and utilizing his mouse he could move his cursor onto the deck representation and while depressing his left mouse key or keyboard (on many keyboards, number 6 key of the numeric keypad moves the mouse pointer left, number 4 key moves the mouse pointer right, number 2 key moves it down, number 8 key moves the mouse pointer up, number 5 and + key serve as right click while the number 0 key works as left mouse click) could raise, lower or preposition the cursor onto the deck. Once positioned the player could release or press the right mouse button. This action would be programmed to cause that position on the deck representation to turn that position red as if to appear that a red cut card had been inserted there. Another option that might be offered instead of a right mouse click could be a "double" left click which could be made to release to single mouse click on the deck.

Once that step was completed another player transparent subroutine would take the order of the cards that were imaged and reposition the order reflecting the new cut card activity. As an example, once the deck is selected the visual library image would be presented or offered to the program. Once a cut card has been selected and inserted, the ordered library image becomes separated at the cut site and forms two select arrangements of the ordered library image, above the cut card; segment (A) and below the cut card, segment (B). Then the deck image is reconstituted still in the order of the two halves and by moving the portion of the deck that was below the cut card or segment (B) on top of the original top portion of the deck or segment (A).

This action would then place the cut card on the bottom of the deck and indicate that the deck shuffle and cut had been completed and the cards were ready to be placed into play.

Each remote player will be allowed to cut the pre-scanned inventory of the game deck which was previously uploaded to each individual remote player's computer based on their table seat, or transferred to an "online casino software program" installed on the host casino's main CPU. The advantage in doing so is that by allowing the pre-scanned and pre-shuffled game deck, ("PPGD"), prior to it being placed by the game dealer into the systems CDS w/Scanner, the game dealer will allow a game player, game dealer or game supervisor to "cut" the "PPGD". (This should help the live game players, (and any remote players), overcome any reluctance to the host casino using a "PPGD", packaged by a card manufacturer, shipped to a B&M, whereas the B&M game dealer will open the "PPGD" game deck, sealed by the playing card manufacturer, and without shuffling it, without limitation, let a game player, game dealer or game supervisor "cut" the game deck before the dealer places the "PPGD" into the CDS w/Scanner used by the game dealer to dispense the cards, one-by-one, to the game hands and/or active game table seats during a game round.

Each card comprising the "PPGD" will be imprinted with "machine readable indicia", preferably on the face of each card comprising the "PPGD", that will allow to the CDS w/S to identify, for the system software, the deck number the card manufacturer assigns to each ("S52CD") it manufacturers for use, without limitation, with a CDS w/S used by any legally licensed casino too dispense the cards to the live players playing any casino card game. Whereas, since the inventory of the "PPGD", (stored on a microchip affixed to the packaging of each game deck, (comprised of at least one ("S52CD"), can be scanned by an external scanner, preferably hand held, controlled by the game dealer or other designated casino staff members; whereas the inventory of the game deck stored on the "microchip" will be transferred to the host B&M mainframe computer; to confirm that the inventory of the "particular shoe" is complete.

At such time that the subject "PPGD's", "microchip, has been scanned and the output of the scanning device has been transferred to the host B&M main CPU, on which is installed one or more casino card game monitoring programs, and/or one or more online casino card games available to a limited or unlimited number of remote casino customers who have logged into an online casino operators website, operated by, or associated with, the host B&M; and selected the identical casino, game table, and/or game for his/her current playing session, (after the host online casino operator has verified that the remote player has met all of the requirements necessary to meet the customer qualifications set by legally authorized gaming regulators regulating the play of online casinos accepting wagers from remote players residing within any gaming jurisdiction where online casino operators are allowed to accept cash wagers, or tournament entry fees, on games of chance), the inventory of the "PPGD" may be uploaded to the remote players PC or other computing device that he/she has used to log into the host online casino's website.

Alternatively, after the host B&M staff has uploaded the inventory of the "PPGD" to the host B&M main computer, (and before the systems online casino software programs uploads the inventory of the "PPGD" to the remote players', the game dealer, preferably will allow one of the game players, the game dealer or other casino staff members to "cut" the "PPGD" prior to it being placed into the CDS w/S. When the "cut" "PPGD" is placed into the housing of the CDS w/S and the 1st card carried by the CDS w/S is removed from the CDS w/S, through the card outlet at the front of the Shoe it will be scanned by the Shoes integral card scanner. Each remote player may therefore be allowed to cut the game deck uploaded to his/her client computer. In that event, since the system knows the card value, rank, suit and location of each card comprising the game deck uploaded to the remote player's PC, the remote players will be allowed electronically to cut the game deck. When the 1st card removed the CDS w/Scanner is identified the system will know the location of each card comprising the reconstituted game deck. The online casino software, on receiving the output of the scanner embedded in the game table top, will use the identity of the bottom card of the "game deck" to reconstitute the order of the cards comprising the "game deck" to match the altered, "cut", card value, rank, suit and delivery sequence of each of the card comprising the game deck after it is "cut". Each remote player to cut the pre-scanned inventory of the game deck, previously uploaded to each individual remote players CPU table seat, or transferred to an "online casino software program" installed on the host casino's main CPU. Subsequently, when a remote player logs into the host online casino operators website, selects the Baccarat game table from which the CDS w/S captured the card value, rank and suit, and the delivery sequence of each card dealt to the PLAYER and BANK hands, according to the game rules pre-programmed into the online casino Baccarat program, other hardware and software, that is coupled to the host "B&M's" Casinos main CPU. The output of the "CDS w/Scanner" is transferred to the main CPU which having one or more capture software programs, during real-time, for broadcast "Live" or "On Demand" by the host "B&M" casino capturing the game play; or a "OCO" hosting one or more online casino sites.

It should be understood that systems such as those described herein may be adapted and configured to function independently or may also interact with other systems or applications, such as for example, a casino management system or player tracking system. As such, the wagering data may be recorded and stored in connection with player information retrieved from their respective data communication devices. It should also be understood that the advantages of the invention discussed herein comprise only some of the advantages of the invention, and the invention is not to be limited in any way by such advantages.

Those skilled in the art will readily appreciate that any of the systems and methods of the invention may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as an existing electronic gaming machine, portable computing device or electronic platforms with multiple player positions. In addition, the system of the invention may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the invention so long as players and operators thereof are provided with useful access thereto or the opportunity to play the game as described herein. It should be readily apparent that additional computerized or manual systems may also be employed in accordance with the invention in order to achieve its full implementation as a system, apparatus or method.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, in the claims and equivalents thereof, which disclose and recite, systems, methods, elements and features, all of which may be employed with the invention described herein.

What is claimed is:

1. A system for providing remote game play, comprising:

a) a plurality of gaming data collection devices for collecting gaming data from the play of a live table game, the plurality of gaming data collection devices including an automated card shuffling device with card detection capability for determining an order of playing cards included in a randomly shuffled deck of cards, a card recognition device for determining an identity of a playing card, and a control panel for operating a plurality of cameras for capturing video images of player positions at a physical gaming table and selecting the location of the player position being recorded during game play at the live table game, wherein the collected gaming data includes the order and identity of each playing card in a group of randomly-ordered physical playing cards the cards being randomly-ordered for use in the play of the live table game and video images of players participating in game play at the live table game;

b) one or more communication devices for receiving one or more user selections, the one or more user selections including a selection of the collected gaming data, and transmitting collected gaming data responsive to receiving the one or more user selections; and c) one or more processing devices for facilitating i) the transmission of the collected gaming data responsive to receiving the selection thereof, ii) the display of the collected gaming data on a display device and iii) the use of the collected gaming data in the play of one or both of the live table game and an independent game through the display device, wherein the processing device facilitates the display on the display device of one or both of a first user selectable feature and a second user selectable feature, wherein the identity of one or more playing cards is displayed on the display device prior to the identity of the one or more cards being revealed during the play of the live table game responsive to the one or more communication devices receiving a selection of the first selectable feature through the display device, and wherein the one or more playing cards are initially displayed in a face down position, partially lifted to reveal the identity of the playing card, and then displayed in a face up position in response to the one or more communication devices receiving the selection of the second selectable feature through the display device.

2. The system of claim 1, wherein the gaming data collection devices include a card dispensing shoe with card detection capability.

3. The system of claim 1, wherein the control panel includes a plurality of selection buttons corresponding to player positions at the physical gaming table.

4. The system of claim 1, wherein the card recognition device is embedded in the physical gaming table.

5. The system of claim 1, wherein the one or more communication devices includes a first communication device located proximal to the gaming data collection devices and a second communication device located remotely from the gaming data collection devices.

6. The system of claim 1, wherein the second communication device and display device are mounted in a unitary housing.

7. The system of claim 1, wherein the order of at least a portion of the playing cards included in the collected gaming data are randomized using a random number generator responsive to the one or more communication devices receiving the selection of the second selectable feature through the display device.

8. The system of claim 1, wherein the order of the playing cards included in the collected gaming data is changed by causing a contiguous proximal portion of the group to be moved to distal position relative to the remainder of the group responsive to the one or more communication devices receiving the selection of the second selectable feature through the display device.

9. The system of claim 1, wherein the order and identify of each playing card in the group is collected prior to use in the play of the live table game.

10. A method for providing remote game play, comprising the steps of:

a) Collecting gaming data from the play of a live table game through a plurality of gaming data collection devices, the plurality of gaming data collection devices including an automated card shuffling device with card detection capability for determining an order of playing cards included in a randomly shuffled deck of cards, a card recognition device for determining an identity of a playing card, and a control panel for operating a plurality of cameras for capturing video images of player positions at a physical gaming table and selecting the location of the player position being recorded during game play at the live table game, wherein the collected gaming data includes the order and identity of each playing card in a group of randomly-ordered physical playing cards the cards being randomly-ordered for use in the play of the live table game and video images of players participating in game play at the live table game;

b) Receiving one or more user selections through one or more communication devices, the one or more user selections including a selection of the collected gaming data, and transmitting collected gaming data responsive to receiving the one or more user selections; and c) One or more processing devices facilitating the steps of i) transmitting the collected gaming data responsive to receiving the selection thereof, ii) displaying the collected gaming data on a display device and iii) using the collected gaming data in the play of one or both of the live table game and an independent game through the display device, wherein the processing device facilitates the display on the display device of one or both of a first user selectable feature and a second user selectable feature, wherein the identity of one or more playing cards is displayed on the display device prior to the identity of the one or more cards being revealed during the play of the live table game responsive to the one or more communication devices receiving a selection of the first selectable feature through the display device, and wherein the one or more playing cards are initially displayed in a face down position, partially lifted to reveal the identity of the playing card, and then displayed in a face up position in response to the one or more communication devices receiving the selection of the second selectable feature through the display device.

11. The method of claim 10, wherein the step of changing the order of the playing cards further comprises randomizing the order using a random number generator.

12. The method of claim 10, wherein the step of changing the order of the playing cards further comprises causing a contiguous proximal portion of the group to be moved to distal position relative to the remainder of the group.

13. The method of claim 12, further comprising the steps of displaying an indicator on the display device identifying the size of the contiguous proximal portion of the group to be moved responsive to receiving the selection of the second selectable feature.

14. The method of claim 10, further comprising the steps of capturing an image of a player position at the gaming table upon receiving a selection from the control panel.

15. The method of claim 10, wherein the gaming data further comprises multimedia data collected from the play of the live table game, wherein the multimedia data includes video, audio, and game play data.

16. A system for providing remote game play, comprising:

a) a physical gaming table for playing a live table game;

b) a plurality of gaming data collection devices for collecting gaming data from the play of the live table game, the plurality of gaming data collection devices including an automated card shuffling device with card detection capability for determining an order of playing cards included in a randomly shuffled deck of cards, a card recognition device coupled to the physical gaming table for determining an identity of a playing card, and a control panel for operating a plurality of cameras for capturing video images of player positions at the physical gaming table and selecting the location of the player position being recorded during game play at the live table game, wherein the collected gaming data includes video and audio recorded during the play of the live table game, and the order and identity of each playing card in a group of randomly-ordered physical playing cards the cards being randomly-ordered for use in the play of the live table game;

c) one or more communication devices for receiving one or more user selections, the one or more user selections including a selection of the collected gaming data, and transmitting collected gaming data responsive to receiving the one or more user selections; and d) one or more processing devices for facilitating i) the transmission of the collected gaming data responsive to receiving the selection thereof, ii) the recreation of the collected gaming data on a remote device including a display device and an audio playback device and iii) the use of the collected gaming data in the play of the live table game through the remote device, wherein the one or more processing devices facilitate the display of a user selectable feature on the remote device, wherein the identity of one or more playing cards is displayed on the display device prior to the identity of the one or more cards being revealed during the play of the live table game responsive to the one or more communication devices receiving a selection of the user selectable feature through the display device, the one or more playing cards are initially displayed in a face down position, partially lifted to reveal the identity of the playing card, and then displayed in a face up position in response.

17. The system of claim 16, wherein the one or more communication devices include one or more communication devices for receiving video and audio data from the remote device and one or more communication devices for broadcasting the video and audio data received from the remote device during the play of the live table game.

18. The system of claim 16, wherein the one or more gaming data collection devices includes CCTV camera.

19. The system of claim 18, further comprising the control panel for including a plurality of selection buttons corresponding to player positions at the physical gaming table.

20. The system of claim 18, wherein the control panel is embedded in the physical gaming table.

* * * * *